(12) United States Patent
Hirose et al.

(10) Patent No.: US 9,083,054 B2
(45) Date of Patent: Jul. 14, 2015

(54) LITHIUM ION SECONDARY BATTERY, LITHIUM ION SECONDARY BATTERY NEGATIVE ELECTRODE, BATTERY PACK, ELECTRIC VEHICLE, ELECTRICITY STORAGE SYSTEM, POWER TOOL, AND ELECTRONIC APPARATUS

(75) Inventors: Takakazu Hirose, Fukushima (JP); Takashi Fujinaga, Fukushima (JP); Isao Koizumi, Fukushima (JP); Norihiro Shimoi, Miyagi (JP); Kenichi Kawase, Fukushima (JP)

(73) Assignee: SONY CORPORATION, Tokyo (JP)

( * ) Notice: Subject to any disclaimer, the term of this patent is extended or adjusted under 35 U.S.C. 154(b) by 408 days.

(21) Appl. No.: 13/527,284

(22) Filed: Jun. 19, 2012

(65) Prior Publication Data

US 2012/0328945 A1 Dec. 27, 2012

(30) Foreign Application Priority Data

Jun. 24, 2011 (JP) ................. 2011-141002

(51) Int. Cl.
*H01M 10/052* (2010.01)
*H01M 2/16* (2006.01)
(Continued)

(52) U.S. Cl.
CPC ........... *H01M 10/052* (2013.01); *B60L 3/0046* (2013.01); *B60L 3/0069* (2013.01); *B60L 11/1879* (2013.01); *C01G 45/1228* (2013.01); *C01G 53/42* (2013.01); *C01G 53/50* (2013.01); *H01M 2/1673* (2013.01); *H01M 4/131* (2013.01); *H01M 4/362* (2013.01); *H01M 4/366* (2013.01); *H01M 4/483* (2013.01); *H01M 4/587* (2013.01); *H01M 4/625* (2013.01); *H01M 10/0587* (2013.01); *C01P 2002/52* (2013.01); *C01P 2002/54* (2013.01); *C01P 2004/80* (2013.01); *C01P 2006/40* (2013.01); *H01M 2/34* (2013.01); *H01M 4/0404* (2013.01); *H01M 4/0471* (2013.01); *H01M 4/1391* (2013.01); *H01M 4/485* (2013.01); *H01M 4/624* (2013.01);
(Continued)

(58) Field of Classification Search
USPC ......... 429/219–224, 228, 231.5, 231.6, 231.8
See application file for complete search history.

(56) References Cited

U.S. PATENT DOCUMENTS 6,210,835 B1 4/2001 Arai
2006/0134516 A1* 6/2006 Im et al. .................... 429/218.1
(Continued)

FOREIGN PATENT DOCUMENTS

JP 2997741 1/2000
JP 2001-185127 7/2001
(Continued)

OTHER PUBLICATIONS

Japanese Office Action for corresponding JP2011-141002 issued on Mar. 4, 2015.

*Primary Examiner* — Muhammad Siddiquee
(74) *Attorney, Agent, or Firm* — K&L Gates LLP

(57) ABSTRACT

A lithium ion secondary battery is provided with a positive electrode, a negative electrode containing an active material, and an electrolytic solution, wherein the active material includes a core portion capable of occluding and releasing lithium ions, an amorphous or low-crystalline coating portion disposed on at least a part of the surface of the core portion, and a fibrous carbon portion disposed on at least a part of the surface of the coating portion, and the coating portion contains Si and O as constituent elements, while the atomic ratio y (O/Si) of O relative to Si satisfies $0.5 \leq y \leq 1.8$.

23 Claims, 11 Drawing Sheets

(51) Int. Cl.

| | | |
|---|---|---|
| *H01M 4/131* | (2010.01) | |
| *H01M 4/36* | (2006.01) | |
| *H01M 4/48* | (2010.01) | |
| *H01M 4/587* | (2010.01) | |
| *H01M 10/0587* | (2010.01) | |
| *C01G 45/12* | (2006.01) | |
| *C01G 53/00* | (2006.01) | |
| *B60L 3/00* | (2006.01) | |
| *B60L 11/18* | (2006.01) | |
| *H01M 2/34* | (2006.01) | |
| *H01M 4/04* | (2006.01) | |
| *H01M 4/1391* | (2010.01) | |
| *H01M 4/485* | (2010.01) | |
| *H01M 4/62* | (2006.01) | |
| *H01M 10/48* | (2006.01) | |
| *H01M 4/02* | (2006.01) | |

(52) U.S. Cl.
CPC ............ *H01M 10/48* (2013.01); *H01M 10/486* (2013.01); *H01M 2004/021* (2013.01); *H01M 2220/20* (2013.01); *Y02E 60/122* (2013.01); *Y02T 10/7005* (2013.01); *Y02T 10/705* (2013.01); *Y02T 10/7011* (2013.01)

(56) References Cited

U.S. PATENT DOCUMENTS

| | | |
|---|---|---|
| 2007/0020521 A1 | 1/2007 | Obrovac et al. |
| 2007/0111100 A1 | 5/2007 | Bito et al. |
| 2007/0190416 A1 | 8/2007 | Yamada et al. |
| 2008/0160409 A1 | 7/2008 | Ishida et al. |
| 2009/0004564 A1 | 1/2009 | Ishida et al. |
| 2009/0053608 A1 | 2/2009 | Choi et al. |
| 2009/0104536 A1 | 4/2009 | Kogetsu et al. |
| 2009/0142665 A1 | 6/2009 | Sheem et al. |
| 2009/0162750 A1* | 6/2009 | Kawakami et al. ........ 429/218.1 |
| 2010/0040949 A1* | 2/2010 | Nanno et al. ................... 429/209 |
| 2010/0165555 A1* | 7/2010 | Tobiyama et al. ....... 361/679.01 |
| 2010/0319944 A1* | 12/2010 | Schmehl ......................... 173/47 |
| 2011/0115441 A1 | 5/2011 | Matsuyama et al. |
| 2011/0166733 A1* | 7/2011 | Yu et al. ........................... 701/22 |
| 2012/0040242 A1* | 2/2012 | Kurasawa et al. ............. 429/211 |

FOREIGN PATENT DOCUMENTS

| | | |
|---|---|---|
| JP | 2002-042806 | 2/2002 |
| JP | 2002-170561 A | 6/2002 |
| JP | 2004-349056 A | 12/2004 |
| JP | 2005-085717 A | 3/2005 |
| JP | 2005-183264 | 7/2005 |
| JP | 2005-340223 A | 12/2005 |
| JP | 2006-114454 | 4/2006 |
| JP | 2006-164954 | 6/2006 |
| JP | 2006-244984 A | 9/2006 |
| JP | 2007-165078 | 6/2007 |
| JP | 2007-165300 | 6/2007 |
| JP | 2007-234255 | 9/2007 |
| JP | 2007-242590 A | 9/2007 |
| JP | 2007-329001 A | 12/2007 |
| JP | 2008-177346 | 7/2008 |
| JP | 2008-199767 A | 8/2008 |
| JP | 2008-251369 | 10/2008 |
| JP | 2008-282819 | 11/2008 |
| JP | 2009-503786 A | 1/2009 |
| JP | 2009-070825 | 4/2009 |
| JP | 2009-076373 | 4/2009 |
| JP | 2009-164104 | 7/2009 |
| JP | 2009-205950 | 9/2009 |
| JP | 2009-212074 | 9/2009 |
| JP | 2011-109824 A | 6/2011 |
| WO | 2006-067891 A1 | 6/2006 |
| WO | 2007/010922 | 1/2007 |

* cited by examiner

LITHIUM ION SECONDARY BATTERY, LITHIUM ION SECONDARY BATTERY NEGATIVE ELECTRODE, BATTERY PACK, ELECTRIC VEHICLE, ELECTRICITY STORAGE SYSTEM, POWER TOOL, AND ELECTRONIC APPARATUS

CROSS REFERENCES TO RELATED APPLICATIONS

The present application claims priority to Japanese Priority Patent Application JP 2011-141002 filed in the Japan Patent Office on Jun. 24, 2011, the entire content of which is hereby incorporated by reference.

BACKGROUND

The present disclosure relates to a lithium ion secondary battery negative electrode containing a negative electrode active material which can occlude and release lithium ions, a lithium ion secondary battery including the negative electrode, and a battery pack, an electric vehicle, an electricity storage system, a power tool, and an electronic apparatus, which include the secondary battery.

In recent years, electronic apparatuses typified by cellular phones, personal digital assistants (PDA), and the like have become widespread, and further miniaturization, weight reduction, and extension in life thereof have been desired intensely. Along with this, batteries, in particular secondary batteries, which are small and lightweight and which can obtain a high energy density, have been developed as power sources. Recently, application of these secondary batteries to not only the above-described electronic apparatuses, but also various uses typified by battery packs, electric vehicles e.g., electric cars, electricity storage systems, e.g., home electricity servers, and power tools, e.g., electric drills, has been studied.

Secondary batteries based on various charge and discharge principles have been proposed widely. Among them, a lithium ion secondary battery through the use of occlusion and release of lithium has a potential. This is because an energy density higher than those of a lead battery, a nickel cadmium battery, and the like can be obtained.

The lithium ion secondary battery is provided with an electrolytic solution in addition to a positive electrode and a negative electrode, and the negative electrode contains a negative electrode active material capable of occluding and releasing lithium ions. As for the negative electrode active material, carbon materials, e.g., graphite, have been used widely. Meanwhile, a further increase in battery capacity has been desired recently. Consequently, use of Si has been studied. The theoretical capacity of Si (4.199 mAh/g) is especially larger than the theoretical capacity of graphite (372 mAh/g) and, therefore, a significant increase in battery capacity can be expected.

However, if Si is used as the negative electrode active material, cracking occurs mainly in the vicinity of the surface layer of the negative electrode active material easily because of significant expansion and shrinkage of the negative electrode active material during charge and discharge. When the negative electrode active material is cracked, a highly-reactive fresh surface (active surface) is generated and, thereby, the surface area of the negative electrode active material (reaction area) increases. Consequently, a decomposition reaction of the electrolytic solution occurs on the fresh surface and, in addition, the electrolytic solution is consumed to form a coating film derived from the electrolytic solution on the fresh surface. Therefore, the battery characteristics, e.g., cycle characteristics, are degraded easily.

In order to improve the battery characteristics, e.g., cycle characteristics, various studies on the configuration of the lithium ion secondary battery have been made.

Concretely, in order to improve the cycle characteristics and the safety, Si and amorphous $SiO_2$ are deposited at the same time by using a sputtering method (refer to Japanese Unexamined Patent Application Publication No. 2001-185127, for example). In order to obtain excellent battery capacity and performance of safety, an electrically conductive material layer (carbon material) is disposed on surfaces of $SiO_x$ particles (refer to Japanese Unexamined Patent Application Publication No. 2002-042806, for example). In order to improve high-rate charge and discharge characteristics and cycle characteristics, a negative electrode active material layer is disposed in such a way that Si and O are contained and the oxygen ratio increases in the side near to a negative electrode collector (refer to Japanese Unexamined Patent Application Publication No. 2006-164954, for example). In order to improve the cycle characteristics, a negative electrode active material layer is disposed in such a way that Si and O are contained, the average oxygen content as a whole becomes 40 atomic percent or less, and the average oxygen content increases in the side near to a negative electrode collector (refer to Japanese Unexamined Patent Application Publication No. 2006-114454, for example). In this case, the difference between the average oxygen content in the side near to the negative electrode collector and the average oxygen content in the side far from the negative electrode collector is specified to be 4 atomic percent to 30 atomic percent.

In order to improve initial charge and discharge characteristics and the like, a nanocomposite containing a Si phase, $SiO_2$, and an $M_yO$ metal oxide is used (refer to Japanese Unexamined Patent Application Publication No. 2009-070825, for example). In order to improve cycle characteristics, powdered $SiO_x$ ($0.8 \le x \le 1.5$, particle diameter range of 1 μm to 50 μm) and a carbonaceous material are mixed and fired at 800° C. to 1,600° C. for 3 hours to 12 hours (refer to Japanese Unexamined Patent Application Publication No. 2008-282819, for example). In order to reduce an initial charge and discharge time, a negative electrode active material represented by $Li_aSiO_x$ ($0.5 \le a-x \le 1.1$ and $0.2 \le x \le 1.2$) is used (refer to International Publication No. 2007/010922, for example). In this case, Li is evaporated on an active material precursor containing Si and O. In order to improve charge and discharge cycle characteristics, the composition of $SiO_x$ is controlled in such a way that the molar ratio of the amount of O relative to the amount of Si in a negative electrode active material becomes 0.1 to 1.2 and the difference between a maximum value of the molar ratio of the amount of O relative to the amount of Si and a minimum value thereof in the vicinity of the interface between the negative electrode active material and a collector becomes 0.4 or less (refer to Japanese Unexamined Patent Application Publication No. 2008-251369, for example). In order to improve load characteristics, a Li-containing porous metal oxide ($Li_xSiO$, where $2.1 \le x \le 4$) is used (refer to Japanese Unexamined Patent Application Publication No. 2008-177346, for example).

In order to improve charge and discharge cycle characteristics, a hydrophobized layer of a silane compound, a siloxane compound, or the like is disposed on a thin film containing Si (refer to Japanese Unexamined Patent Application Publication No. 2007-234255, for example). In order to improve cycle characteristics, an electrically conductive powder, in which the surface of $SiO_x$ ($0.5 \le x < 1.6$) is covered with a graphite coating film, is used (refer to Japanese Unexamined Patent Application Publication No. 2009-212074, for example). In this case, it is specified that broad peaks appear at 1,330 cm$^{-1}$ and 1,580 cm$^{-1}$ in the raman shift of a raman spectrum with respect to the graphite coating film and the intensity ratio $I_{1330}/I_{1580}$ thereof satisfies $1.5 < I_{1330}/I_{1580} < 3$. In order to improve a battery capacity and cycle characteristics, a powder containing 1 percent by mass to 30 percent by mass of particles having a structure, in which Si microcrystals (size of crystal=1 nm to 500 nm) are dispersed in $SiO_2$, is used (refer to Japanese Unexamined Patent Application Publication No. 2009-205950, for example). In this case, regarding the particle size distribution on the basis of a laser diffraction-scattering particle size distribution measuring method, the cumulative 90% diameter (D90) of the powder is specified to be 50 µm or less and the particle diameter is specified to be less than 2 µm. In order to improve cycle characteristics, $SiO_x$ ($0.3 \leq x \leq 1.6$) is used and, in addition, a pressure of 3 kgf/cm$^2$ or more is applied to an electrode unit during charge and discharge (refer to Japanese Unexamined Patent Application Publication No. 2009-076373, for example). In order to improve overcharge characteristics, overdischarge characteristics, and the like, a Si oxide, in which the atomic ratio of Si to O is 1:y ($0 < y < 2$), is used (refer to Japanese Patent No. 2997741, for example).

In addition, in order to electrochemically accumulate or release large amounts of lithium ions, an amorphous metal oxide is disposed on the surfaces of primary particles of Si or the like (refer to Japanese Unexamined Patent Application Publication No. 2009-164104, for example). The Gibbs free energy in oxidation of the metal to form this metal oxide is smaller than the Gibbs free energy in oxidation of Si or the like. In order to realize a high capacity, a high efficiency, a high operating voltage, and a long life, use of a negative electrode material, in which the oxidation number of a Si atom satisfies a predetermined condition, has been proposed (refer to Japanese Unexamined Patent Application Publication No. 2005-183264, for example). This negative electrode material contains Si with an oxidation number of 0, a Si compound having a Si atom with an oxidation number of +4, and a Si lower oxide with an oxidation number of more than 0 and less than +4.

In order to suppress an increase in impedance of a whole negative electrode, use of a composite negative electrode active material including Si-containing particles, carbon nanofibers attached to the surfaces of the Si-containing particles, and a catalyst element, e.g., Cu, to facilitate growth of the carbon nanofibers has been proposed (refer to Japanese Unexamined Patent Application Publication No. 2007-165078, for example).

SUMMARY

Regarding electronic apparatuses and the like, the performance have been enhanced and the functionality have been expanded more and more. The frequency of use thereof has increased and, therefore, the lithium ion secondary battery tends to be charged and discharged frequently. Consequently, there is a need for further improvement in battery characteristics of the lithium ion secondary battery.

Accordingly, it is desirable to provide a lithium ion secondary battery negative electrode, a lithium ion secondary battery, a battery pack, an electric vehicle, an electricity storage system, a power tool, and an electronic apparatus, wherein excellent battery characteristics are exhibited.

A lithium ion secondary battery negative electrode according to an embodiment of the present disclosure contains an active material, wherein the active material includes a core portion capable of occluding and releasing lithium ions, an amorphous or low-crystalline coating portion disposed on at least a part of the surface of the core portion, and a fibrous carbon portion disposed on at least a part of the surface of the coating portion, and the coating portion contains Si and O as constituent elements, while the atomic ratio y (O/Si) of O relative to Si satisfies $0.5 \leq y \leq 1.8$. A lithium ion secondary battery according to an embodiment of the present disclosure is provided with an electrolytic solution together with a positive electrode and a negative electrode, and the negative electrode has the same configuration as that of the above-described lithium ion secondary battery negative electrode. Furthermore, an electronic apparatus, a power tool, a battery pack, an electric vehicle, and an electricity storage system according to embodiments of the present disclosure include the lithium ion secondary battery according to an embodiment of the present disclosure.

Regarding the lithium ion secondary battery negative electrode or the lithium ion secondary battery according to embodiments of the present disclosure, the active material includes the amorphous or low-crystalline coating portion disposed on the surface of the core portion and the fibrous carbon portion disposed on the surface of the coating portion. This coating portion contains Si and O as constituent elements, while the atomic ratio y (O/Si) of O relative to Si satisfies $0.5 \leq y \leq 1.8$. Therefore, excellent battery characteristics can be obtained. The above-described characteristics, e.g., the cycle characteristic, can be improved by the electronic apparatus, the power tool, the battery pack, the electric vehicle, and the electricity storage system including the lithium ion secondary battery according to embodiments of the present disclosure.

Additional features and advantages are described herein, and will be apparent from the following Detailed Description and the figures.

DETAILED DESCRIPTION

Figure 1:
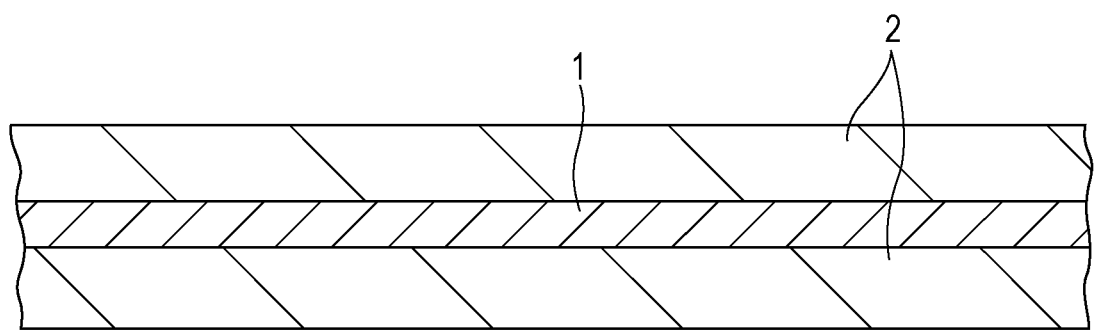
FIG. 1 is a sectional view showing the configuration of a lithium ion secondary battery negative electrode according to an embodiment of the present disclosure.
Figure 2:
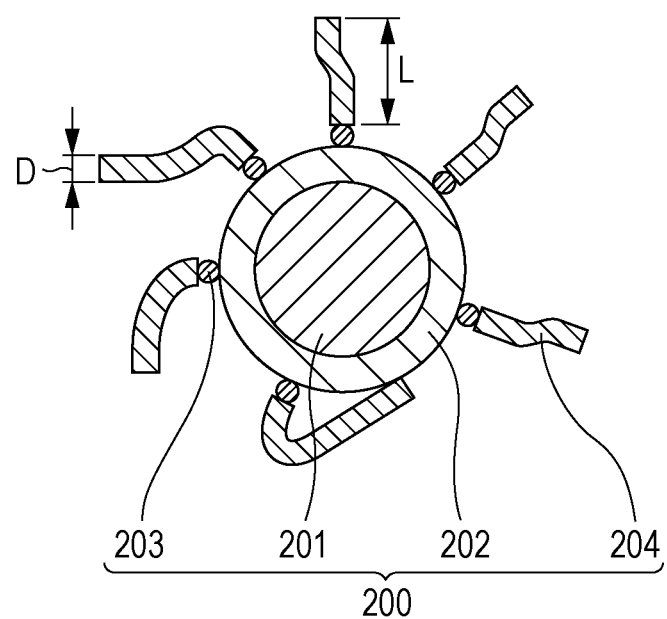
FIG. 2 is a sectional view schematically showing the configuration of a negative electrode active material.

The embodiments according to the present disclosure will be described below in detail with reference to the drawings. In this regard, explanations will be made in the following order.
1. Lithium ion secondary battery negative electrode
2. Lithium ion secondary battery
   2-1. Prism type
   2-2. Cylinder type
   2-3. Laminate film type
3. Use of lithium ion secondary battery
   3-1. Battery pack
   3-2. Electric vehicle
   3-3. Electricity storage system
   3-4. Power tool
1. Lithium Ion Secondary Battery Negative Electrode FIG. 1 shows the configuration of a cross-section of a lithium ion secondary battery negative electrode according to an embodiment of the present disclosure (hereafter simply referred to as a "negative electrode"). FIG. 2 schematically shows the configuration of a cross-section of an active material contained in a negative electrode (negative electrode active material).

Whole Configuration of Negative Electrode

The negative electrode has, for example, a negative electrode active material layer 2 on a negative electrode collector 1, as shown in FIG. 1. In this negative electrode, the negative electrode active material layer 2 may be disposed on both surfaces of the negative electrode collector 1, or be disposed on only one surface. In this regard, the negative electrode collector 1 is not necessarily disposed.

Negative Electrode Collector

The negative electrode collector 1 is formed from, for example, an electrically conductive material excellent in electrochemical stability, electrical conductivity, and mechanical strength. Examples of such electrically conductive materials include Cu, Ni, and stainless steel. Among them, a material which does not form an intermetallic compound with Li and which forms an alloy with the negative electrode active material layer 2 is preferable.

It is preferable that this negative electrode collector 1 contains C and S as constituent elements. This is because the physical strength of the negative electrode collector 1 is improved and, thereby, the negative electrode collector 1 is not deformed easily even when the negative electrode active material layer 2 is expanded or shrunk during charge and discharge. Examples of such negative electrode collectors 1 include metal foil doped with C and S. Although the contents of C and S are not specifically limited, it is preferable that both are 100 ppm or less because higher effects are obtained.

The surface of the negative electrode collector 1 may be roughened or not be roughened. The negative electrode collector 1 not subjected to surface roughening is, for example, rolled metal foil, and the negative electrode collector 1 subjected to surface roughening is, for example, metal foil subjected to an electrolysis treatment or a sandblast treatment. The electrolysis treatment refers to a method in which fine particles are formed on the surface of metal foil or the like by using an electrolysis method in an electrolytic bath and, thereby, an unevenness is disposed. The metal foil produced by the electrolysis method is generally called electrolytic foil (for example, electrolytic Cu foil).

Most of all, it is preferable that the surface of the negative electrode collector 1 is roughened because the adhesion of the negative electrode active material layer 2 to the negative electrode collector 1 is improved through an anchor effect. The surface roughness (for example, a ten-point average roughness Rz) of the negative electrode collector 1 is not specifically limited. However, it is preferable that the surface roughness is maximized in order to improve the adhesion of the negative electrode active material layer 2 through the anchor effect. Meanwhile, if the surface roughness is too large, on the contrary, the adhesion of the negative electrode active material layer 2 may be reduced.

Negative Electrode Active Material Layer

The negative electrode active material layer 2 includes a plurality of particulate negative electrode active materials 200, as shown in FIG. 2, capable of occluding and releasing lithium ions and, as necessary, other materials, e.g., a negative electrode binder or a negative electrode electrically conductive agent, may be included.

The negative electrode active material 200 includes, for example, a core portion 201, a coating portion 202, an electrically conductive portion 203, and a fibrous carbon portion 204. The configuration of the negative electrode active material 200 may be examined by, for example, SEM.

Core Portion

The core portion 201 is a key part of the negative electrode active material 200 capable of occluding and releasing lithium ions. The composition of the core portion 201 is not specifically limited insofar as lithium ions are occluded and released. Most of all, it is preferable that the core portion 201 contains at least one of Si and Sn as a constituent element because a high energy density is obtained. The core portion 201 may contain a simple substance of Si, a compound of Si, an alloy of Si, or at least two types thereof. The same goes for Sn, that is, any one of a simple substance, a compound, or an alloy may be employed, as described above. In this regard, "simple substance" refers to a simple substance in the strictly general sense of the word (very small amounts of impurities (elements other than oxygen) may be contained) and, therefore, does not necessarily indicate that the purity is 100%.

The alloy of Si contains, for example, at least one type of element of Sn, Ni, Cu, Fe, Co, Mn, Zn, In, Ag, Ti, Ge, Bi, Sb, Cr, and the like together with Si. The compound of Si contains, for example, at least one type of element of C, O, and the like together with Si. Furthermore, the compound of Si may contain, for example, at least one type of element of a series of elements explained with respect to the alloy of Si. Examples of alloys or compounds of Si include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), and LiSiO.

The alloy of Sn contains, for example, at least one type of element of Si, Ni, Cu, Fe, Co, Mn, Zn, In, Ag, Ti, Ge, Bi, Sb, Cr, and the like together with Sn. The compound of Sn contains, for example, at least one type of element of C, O, and the like together with Sn. Furthermore, the compound of Sn may contain, for example, at least one type of element of a series of elements explained with respect to the alloy of Sn. Examples of alloys or compounds of Sn include $SnO_w$ ($0<w\leq2$), $SnSiO_3$, $LiSnO$, $Mg_2Sn$, SnCo, SnCoTi, and SnFeCo.

Among them, it is preferable that the core portion 201 contains, for example, Si and O as constituent elements, while the atomic ratio x (O/Si) of O relative to Si satisfies $0\leq x<0.5$. This is because the core portion 201 occludes and releases lithium ions easily during charge and discharge and, in addition, an irreversible capacity is reduced, so as to obtain a high battery capacity, as compared with that in the case where the atomic ratio x is out of the range (0.5≤x).

As is clear from the above-described composition (atomic ratio x), the material for forming the core portion 201 may be a simple substance of Si (x=0), or be $SiO_x$ (0<x<0.5). However, it is preferable that x is minimized, and it is more preferable that x=0 is satisfied (simple substance of Si). This is because a higher energy density is obtained and, furthermore, degradation of the core portion 201 is suppressed, so that discharge capacity is not reduced from an initial stage of the charge and discharge cycle.

The core portion 201 may be any one of crystalline (high-crystalline), low-crystalline, and amorphous, preferably high-crystalline or low-crystalline, and more preferably high-crystalline. This is because the core portion 201 occludes and releases lithium ions easily during charge and discharge, so as to obtain a high battery capacity, and furthermore, the core portion 201 is not expanded or shrunk easily during charge and discharge. In particular, it is preferable that regarding the core portion 201, the half-width (2θ) of a diffraction peak resulting from a (111) crystal face of Si obtained by X-ray diffraction is 20° or less and the crystallite size resulting from the (111) crystal face is 10 nm or more because higher effects are obtained.

Although the median diameter of the core portion 201 is not specifically limited, most of all, 0.3 μm to 20 μm is preferable. This is because the core portion 201 occludes and releases lithium ions easily during charge and discharge, and cracking of the core portion 201 does not occur easily. For details, if the median diameter is less than 0.3 μm, the total surface area of the core portion 201 becomes too large and, thereby, expansion and shrinkage may occur easily during charge and discharge. On the other hand, if the median diameter is larger than 20 μm, cracking of the core portion 201 may occur easily during charge and discharge.

The core portion 201 may contain at least one type of other element (excluding Si and Sn) as a constituent element together with Si and Sn.

Concretely, it is preferable that the core portion 201 contains at least one element M2 of Fe and Al. The proportion (M2/(Si+O)) of M2 relative to Si and O is preferably 0.01 atomic percent to 50 atomic percent because the electrical resistance of the core portion 201 is reduced and the diffusibility of lithium ions is improved.

In the core portion 201, at least a part of M2 may be present independently (isolated state) of Si and O, or form an alloy or a compound with at least one of Si and O. The composition of the core portion 201 containing M2 (bonding state of M2 and the like) may be examined by, for example, EDX. Regarding the bonding state and the examination method, the same goes for M3 and M4 described later.

In particular, it is preferable that the core portion 201 contains Al because the core portion 201 becomes low-crystalline, so that the core portion 201 is not expanded or shrunk easily during charge and discharge and, in addition, the diffusibility of lithium ions is further improved. Regarding the core portion 201 containing Al, it is preferable that the half-width (2θ) of a diffraction peak resulting from a (111) crystal face of Si obtained by X-ray diffraction is 0.6° or more. The crystallite size resulting from the above-described (111) crystal face is preferably 90 nm or less. In the case where the half-width is examined, it is preferable that the coating portion 202 is removed through dissolution with HF or the like and, thereafter, the core portion 201 is analyzed.

For details, in the case where the core portion 201 does not contain Al and the core portion 201 is high-crystalline, core portion 201 is expanded and shrunk easily during charge and discharge. On the other hand, in the case where the core portion 201 contains Al, the core portion 201 is not expanded or shrunk easily during charge and discharge regardless of whether the core portion 201 is high-crystalline or low-crystalline. In this case, if the core portion 201 is low-crystalline, not only expansion and shrinkage of the core portion 201 are suppressed, but also the diffusibility of lithium ions is improved.

It is preferable that the core portion 201 contains at least one element M3 of Cr and Ni as a constituent element. The proportion (M3/(Si+O)) of M3 relative to Si and O is preferably 1 atomic percent to 50 atomic percent. This is because the electrical resistance of the core portion 201 is reduced and the diffusibility of lithium ions is improved in this case as well.

It is preferable that the core portion 201 contains at least one type of element M4 selected from the group consisting of B, Mg, Ca, Ti, V, Mn, Co, Cu, Ge, Y, Zr, Mo, Ag, In, Sn, Sb, Ta, W, Pb, La, Ce, Pr, and Nd as a constituent element. The proportion (M4/(Si+O)) of M4 relative to Si and O is preferably 0.01 atomic percent to 30 atomic percent because the electrical resistance of the core portion 201 is reduced and the diffusibility of lithium ions is improved in this case as well.

Coating Portion

The coating portion 202 is disposed on at least a part of the surface of the core portion 201. Therefore, the coating portion 202 may cover a part of the surface of the core portion 201 or cover the whole of the surface. In the case of the former, the coating portion 202 may be interspersed on a plurality of places of the surface of the core portion 201, so as to cover the surface.

The coating portion 202 contains Si and O as constituent elements, while the atomic ratio y (O/Si) of O relative to Si satisfies 0.5≤y≤1.8. Even in the case where charge and discharge are repeated, degradation of the negative electrode active material 200 is suppressed. Consequently, the core portion 201 is chemically and physically protected by the coating portion 202, while comings and goings of lithium ions with respect to the core portion 201 are ensured.

For details, in the case where the coating portion 202 is interposed between the core portion 201 and the electrolytic solution, the highly-reactive core portion 201 does not come into contact with the electrolytic solution easily and, thereby, a decomposition reaction of the electrolytic solution is suppressed. In this case, if the coating portion 202 is formed from a material of the same series (material containing Si as a constituent element in common) as the material for the core portion 201, the adhesion of the coating portion 202 to the core portion 201 is enhanced.

The coating portion 202 has flexibility (high deformability) and, therefore, even when the core portion 201 is expanded or shrunk during charge and discharge, the coating portion 202 is expanded or shrunk (extended or contracted) following it easily. Consequently, the coating portion 202 is not damaged (fracture or the like) easily even when the core portion 201 is expanded or shrunk, so that the coating state of the core portion 201 with the coating portion 202 is maintained even when charge and discharge are repeated. Therefore, a fresh surface is not exposed easily even when cracking of the core portion 201 occurs during charge and discharge and, in addition, the fresh surface does not come into contact with an electrolytic solution easily, so that a decomposition reaction of the electrolytic solution is suppressed.

As is clear from the above-described composition (atomic ratio y), the material for forming the coating portion 202 is $SiO_y$. The atomic ratio y satisfies preferably $0.7 \leq y \leq 1.3$, and more preferably $y=1.2$ because higher effects are obtained.

The coating portion 202 is noncrystalline (amorphous) or low-crystalline. This is because lithium ions are diffused easily as compared with that in the case where the coating portion 202 is crystalline (high-crystalline) and, thereby, the core portion 201 occludes and releases lithium ions smoothly even when the surface of the core portion 201 is covered with the coating portion 202.

Most of all, it is preferable that the coating portion 202 is amorphous because the flexibility of the coating portion 202 is improved, so that the coating portion 202 follows expansion and shrinkage of the core portion 201 easily during charge and discharge. Furthermore, the coating portion 202 do not trap lithium ions easily, so that comings and goings of lithium ions with respect to the core portion 201 are not hindered easily.

The term "low-crystalline" refers to that the material for forming the coating portion 202 includes both an amorphous region and crystal regions (crystal grains) and is different from the term "noncrystalline" which refers to that only an amorphous region is included. In many cases, the crystal grains are interspersed in the amorphous region. In order to examine whether the coating portion 202 is low-crystalline or not, the coating portion 202 may be observed with, for example, a high-angle annular dark field scanning transmission electron microscope (HAADF STEM) or the like. In the case where it is ascertained from a TEM photograph that the amorphous region and the crystal regions are present in a mixed state, the coating portion 202 is determined to be low-crystalline. In the case where the amorphous region and the crystal regions are present in a mixed state, the crystal region is observed as a region having a particulate outline (crystal grain). In the inside of the crystal grain, a stripe pattern (crystal lattice stripe) resulting from the crystallinity is observed and, therefore, the crystal grain can be distinguished from the amorphous region.

The coating portion 202 may be a single layer or a multilayer. Most of all, a multilayer is preferable because the coating portion 202 is not damaged easily even when the core portion 201 is expanded or shrunk during charge and discharge. For details, if the coating portion 202 is a single layer, the internal stress of the coating portion 202 is not relaxed easily depending on the thickness thereof, so that the coating portion 202 may be damaged (cracking, peeling, and the like) under the influence of the core portion 201 expanded or shrunk during charge and discharge. On the other hand, regarding the multilayered coating portion 202, the internal stress is relaxed through a function of fine interstices, which are generated between the layers, as gaps to relax the stress, so that the coating portion 202 is not damaged easily. In this regard, the whole coating portion 202 may be multilayered or only a part thereof may be multilayered.

The average thickness of the coating portion 202 is not specifically limited. However, it is preferable that the thickness is minimized, and 1 nm to 3,000 nm is more preferable because the core portion 201 occludes and releases lithium ions easily and, in addition, the coating portion 202 exerts a protective function effectively. For details, if the average thickness is less than 1 nm, the coating portion 202 may not protect the core portion 201 easily. On the other hand, if the average thickness is more than 10,000 nm, the electrical resistance increases and, in addition, the core portion 201 may not occlude and release lithium ions easily during charge and discharge. This is because in the case where the material for forming the coating portion 202 is $SiO_y$, although $SiO_y$ occludes lithium ions easily, $SiO_y$ has a property of not releasing the lithium ions, which have been occluded once, easily.

The average thickness of the coating portion 202 is calculated in the procedure described below. Initially, one negative electrode active material 200 is observed with SEM. In order to measure the thickness of the coating portion 202, it is preferable that the magnification in this observation is the magnification at which the boundary between the core portion 201 and the coating portion 202 can be examined (determined) visually. Subsequently, the thicknesses of the coating portion 202 are measured at randomly chosen 10 points, and the average value thereof (average thickness per negative electrode active material 200) is calculated. In this case, preferably, the measurement positions are selected in such a way that the measurement positions are not concentrated in the vicinity of a specific place and are distributed as wide as possible. Then, the above-described operation to calculate the average value is repeated until the number of negative electrode active materials 200 observed with SEM reaches 100. Finally, the average value (average value of the average thicknesses) of 100 average values calculated with respect to the negative electrode active materials 200 (average thickness per negative electrode active material 200) is calculated, so as to determine the average thickness of the coating portion 202.

The average coverage of the core portion 201 with the coating portion 202 is not specifically limited, but is preferably maximized. Most of all, 30% to 100% is more preferable because the protective function of the coating portion 202 is further enhanced.

The average coverage with the coating portion 202 is calculated in the procedure described below. Initially, in the same manner as that in the case where the average thickness is calculated, one negative electrode active material 200 is observed with SEM. It is preferable that the magnification in this observation is the magnification at which the portion covered with the coating portion 202 in the core portion 201 and a portion not covered with the coating portion 202 can be distinguished visually. Subsequently, the length of the portion covered with the coating portion 202 of the outer edge (outline) of the core portion 201 and the length of the portion not covered with the coating portion 202 are measured. Thereafter, coverage (coverage per negative electrode active material 200: %)=(length of portion covered with coating portion 202/ length of outer edge of core portion 201)×100 is calculated. Then, the above-described operation to calculate the coverage is repeated until the number of negative electrode active materials 200 observed with SEM reaches 100. Finally, the average value of 100 average values calculated with respect to the negative electrode active materials 200 (coverage per negative electrode active material 200) is calculated, so as to determine the average coverage with the coating portion 202.

It is preferable that the coating portion 202 adjoins the core portion 201. However, a natural oxide film ($SiO_2$) may be interposed on the surface of the core portion 201. The natural oxide film is produced through, for example, oxidation of the vicinity of the surface layer of the core portion 201 in the air. In the case where the core portion 201 is present at the center of the negative electrode active material 200 and, in addition, the coating portion 202 is present outside the core portion 201, presence of the natural oxide film hardly exerts an influence on the functions of the core portion 201 and the coating portion 202.

In order to ascertain that the negative electrode active material 200 includes the core portion 201 and the coating portion 202, the negative electrode active material 200 may be analyzed by, for example, X-ray photoelectron spectroscopy (XPS) or energy dispersive X-ray analysis (EDX), besides the above-described SEM observation.

In this case, the compositions of the core portion 201 and the coating portion 202 can be examined by, for example, measuring the degrees of oxidation (atom x, y) of the center portion and the surface layer portion of the negative electrode active material 200. In this regard, in order to examine the composition of the core portion 201 covered with the coating portion 202, the coating portion 202 may be removed through dissolution with HF or the like.

A detailed procedure of measurement of the degree of oxidation is, for example, as described below. Initially, the negative electrode active material 200 (the core portion 201 covered with the coating portion 202) is quantitated by using a combustion method, so as to calculate the amount of Si and the amount of O in the whole. Subsequently, the coating portion 202 is removed through washing with HF, and the core portion 201 is quantitated by using a combustion method, so as to calculate the amount of Si and the amount of O. Finally, the amount of Si and the amount of O in the coating portion 202 are calculated by subtracting the amount of Si and the amount of O in the core portion 201 from the amount of Si and the amount of O in the whole. In this manner, the amounts of Si and the amounts of O in the core portion 201 and the coating portion 202 are determined and, thereby, the individual degrees of oxidation can be determined. Alternatively, the degree of oxidation may be measured by using an uncovered core portion 201 together with the core portion 201 covered with the coating portion 202 instead of removal of the coating portion 202 through washing.

The coating portion 202 may further contain at least one type of other element, as a constituent element, together with Si and O.

Concretely, it is preferable that the coating portion 202 contains Fe as a constituent element because the electrical resistance of the coating portion 202 is reduced. The proportion (Fe/(Si+O)) of Fe relative to the coating portion 202 is not specifically limited, but is preferably 0.005 percent by weight to 0.5 percent by weight. This is because not only the electrical resistance of the core portion 201 is reduced, but also the diffusibility of lithium ions is improved.

In the coating portion 202, at least a part of Fe may be present independently (isolated state) of Si and O, or form an alloy or a compound with at least one of Si and O. The same goes for M1 and the like described later. The composition of the core portion 201 containing Fe (bonding state of Fe and the like) may be examined by, for example, EDX.

The coating portion 202 may contain at least one type of element M1 selected from the group consisting of Li, C, Mg, Al, Ca, Ti, Cr, Mn, Fe, Co, Ni, Cu, Ge, Zr, Mo, Ag, Sn, Ba, W, Ta, Na, and K as a constituent element. The proportion (M1/(Si+O)) of M1 relative to Si and O is preferably 20 atomic percent or less. This is because the electrical resistance of the coating portion 202 is reduced. Meanwhile, in the case where the coating portion 202 contains Al, the coating portion 202 becomes low-crystalline, so that the coating portion 202 is not expanded or shrunk easily during charge and discharge and, in addition, the diffusibility of lithium ions is further improved.

As a matter of course, in the case where the coating portion 202 contains Fe, M1 may be further contained.

In the case where the coating portion 202 contains an element M1, it is preferable that a compound (Si-M1-O) of Si, O, and M1 is formed in the coating portion 202 because an irreversible capacity is reduced. In general, $SiO_y$ improves the cycle characteristics and the like, but tends to decrease the battery capacity because of an increase in irreversible capacity. However, if Si-M1-O is formed, the irreversible capacity is reduced. Consequently, the irreversible capacity is reduced and, in addition, the electrical resistance of the negative electrode active material 200 is reduced.

In this regard, it is preferable that at least a part of M1 forms Si-M1-O in the coating portion 202 because the above-described advantage is obtained even in this case. The remainder of M1 may be present as an isolated simple substance, form an alloy with Si, or form a compound with O. At least two types thereof may be present together.

For details, in the case where at least a part of Si and at least a part of O are bonded, the bonding states (valences) of the Si atom relative to the O atom include zero valence ($Si^{0+}$), monovalence ($Si^{1+}$), divalence ($Si^{2+}$), trivalence ($Si^{3+}$), and tetravalence ($Si^{4+}$). Presence or absence of Si atoms in the respective bonding states and the abundance ratios (atomic ratios) thereof may be examined by, for example, analyzing the negative electrode active material with XPS. In the case where the outermost layer of the negative electrode active material is oxidized ($SiO_2$ is formed) unintentionally, it is preferable that analysis is performed after $SiO_2$ is removed through dissolution with HF or the like.

In the case where Si-M1-O is formed in the coating portion 202, among the bonding states of zero valence to tetravalence, the abundance ratio of the tetravalence, at which an irreversible capacity is generated easily during charge and discharge and the resistance is high, is reduced relatively and, in addition, the abundance ratio of zero valence, at which the tendency reverse to that of the tetravalence is exhibited, increases relatively. Consequently, even when the coating portion 202 is disposed on the surface of the core portion 201, an irreversible capacity resulting from the presence of the coating portion 202 is not generated easily.

It is preferable that the coating portion 202 can occlude and release lithium ions in the same manner as the core portion 201 because lithium ions are occluded and released by the core portion 201 easily.

Electrically Conductive Portion and Fibrous Carbon Portion

The electrically conductive portion 203 functions as a catalyst to grow the fibrous carbon portion 204 from the surface of the coating portion 202 and is disposed on at least a part of the surface of the coating portion 202. Therefore, the electrically conductive portion 203 may cover only a part of the coating portion 202 or cover the whole. In the former case, the electrically conductive portion 203 may be interspersed at a plurality of places.

The electrically conductive portion 203 contains at least one type selected from the group consisting of Cu, Fe, Co, and Ni as a constituent element, and any one of a simple substance, a compound, and an alloy may be employed.

The electrically conductive portion 203 may be particulate, in the shape of a film, or in the state of a mixture thereof. FIG. 2 shows the case where the electrically conductive portion 203 is particulate. The median diameter of the particulate electrically conductive portion 203 is not specifically limited and is, for example, 10 nm to 200 nm.

The fibrous carbon portion 204 is, for example, a carbon material grown from the electrically conductive portion 203 serving as a base point, and is joined to the surface of the coating portion 202 with the electrically conductive portion 203 therebetween. The negative electrode active material 200 includes the fibrous carbon portion 204 because negative electrode active materials 200 are connected to each other easily with the fibrous carbon portion 204 therebetween and, thereby, the electrical resistance of the negative electrode active material 200 is reduced significantly. That is, tact points (electrical connection points) are formed easily between the negative electrode active materials 200, so that current paths are generated easily between the negative electrode active materials 200. The number of the fibrous carbon portions 204 is not specifically limited, but is preferably maximized. This is because contact points are formed easily between the negative electrode active materials 200.

The fibrous carbon portion 204 is a so-called carbon nanowire and the type of the material for formation thereof (carbon material) is not specifically limited. The fibrous carbon portion 204 is formed by, for example, thermal decomposition of a hydrocarbon gas, carbonization of fiber cellulose through a high-temperature treatment, and the like. In particular, it is preferable that at least a part of the fibrous carbon portion 204 is graphitized because the electrical resistance of the negative electrode active material 200 is further reduced.

The shape of the fibrous carbon portion 204 is not specifically limited insofar as the whole is in the shape of a long slender fiber. For example, the fibrous carbon portion 204 may be extended in a straight line, curved, branched into at least two parts, in the shape of a tube, in the shape of a coil, or mixtures thereof.

The average length of the fibrous carbon portion 204 is not specifically limited. In particular, 50 nm to 50,000 nm is preferable because fibrous carbon portions 204 of different negative electrode active materials 200 come into contact with each other easily, so that the electrical resistance of the negative electrode active material 200 is further reduced. For details, if the average length is less than 50 nm, the structural stability of the fibrous carbon portion 204 may be reduced, and if the length is more than 50,000 nm, on the contrary, the battery capacity may be reduced.

The average length of the fibrous carbon portion 204 is calculated in the procedure described below. Initially, one negative electrode active material 200 is observed with SEM. It is preferable that the magnification in this observation is the magnification at which a plurality of fibrous carbon portions 204 disposed in one negative electrode active material 200 can be distinguished. Subsequently, the lengths L of the fibrous carbon portions 204 are measured at randomly chosen 10 points, and the average value thereof (average length L per fibrous carbon portions 204) is calculated. In this case, preferably, the measurement positions are selected in such a way that the measurement positions are not concentrated in the vicinity of a specific place and are distributed as wide as possible. Then, the above-described operation to calculate the average value is repeated until the number of negative electrode active materials 200 observed with SEM reaches 100. Finally, the average value (average value of the average lengths L) of 100 average values calculated with respect to the negative electrode active materials 200 (average length L per fibrous carbon portions 204) is calculated, so as to determine the average length of the fibrous carbon portion 204.

The average diameter of the length of the fibrous carbon portion 204 is not specifically limited. In particular, 5 nm to 500 nm is preferable because the fibrous carbon portion 204 functions as a current path easily, so that electrical resistance of the negative electrode active material 200 is further reduced.

The average diameter of the fibrous carbon portion 204 is calculated in the procedure described below. Initially, one negative electrode active material 200 is observed with SEM. It is preferable that the magnification in this observation is the magnification at which a plurality of fibrous carbon portions 204 disposed in one negative electrode active material 200 can be distinguished. Subsequently, the diameter D of the fibrous carbon portions 204 are measured at randomly chosen 10 points, and the average value thereof (average diameter D per fibrous carbon portions 204) is calculated. In this case, preferably, the measurement positions are selected in such a way that the measurement positions are not concentrated in the vicinity of a specific place and are distributed as wide as possible. Then, the above-described operation to calculate the average value is repeated until the number of negative electrode active materials 200 observed with SEM reaches 100. Finally, the average value (average value of the average diameters D) of 100 average values calculated with respect to the negative electrode active materials 200 (average diameter D per fibrous carbon portions 204) is calculated, so as to determine the average diameter of the fibrous carbon portion 204.

The proportion (fibrous carbon portion/(core portion+coating portion)) of the fibrous carbon portion 204 relative to the core portion 201 and the coating portion 202 is not specifically limited, but 1 percent by weight to 20 percent by weight is preferable. This is because the electrical resistance of the negative electrode active material 200 is reduced, while occlusion and release of lithium ions by the negative electrode active material 200 are maintained.

In the case where the coating portion 202 contains at least one type of Fe and M1 as a constituent element, the negative electrode active material 200 may not include the electrically conductive portion 203. This is because Fe or the like exerts the same function as the function of the electrically conductive portion and, thereby, the fibrous carbon portion 204 can be grown, where Fe or the like in the coating portion 202 serves as a base point. However, the coating portion 202 may contain Fe or the like and, in addition, the negative electrode active material 200 may include the electrically conductive portion 203.

Additional Electrically Conductive Portion

The negative electrode active material 200 may contain the additional electrically conductive portion on the surface of the coating portion 202. The additional electrically conductive portion is disposed on at least a part of the surface (excluding regions provided with the electrically conductive portion 203 and the fibrous carbon portion 204) of the coating portion 202 and has an electrical resistance lower than that of the core portion 201 and the coating portion 202. This is because the core portion 201 does not come into contact with an electrolytic solution easily, so that a decomposition reaction of the electrolytic solution is suppressed and, in addition, the electrical resistance of the negative electrode active material 200 is further reduced. The additional electrically conductive portion contains at least one type of, for example, a carbon material, a metal material, and an inorganic compound. Examples of the carbon materials include graphite. Examples of the metal materials include Fe, Cu, and Al. Examples of the inorganic materials include $SiO_2$. Most of all, the carbon material or the metal material is preferable, and the carbon material is more preferable because the electrical resistance of the negative electrode active material 200 is further reduced. Meanwhile, the average coverage and the average thickness of the additional electrically conductive portion are optional and procedures for calculating them are the same as the procedures with respect to the coating portion 202.

The negative electrode binder contains at least one type of, for example, synthetic rubber and polymer materials. Examples of synthetic rubber include styrene butadiene based rubber, fluorine based rubber, and ethylene propylene diene. Examples of polymer materials include polyvinylidene fluoride, polyimide, polyamide, polyamide imide, polyacrylic acid, potassium polyacrylate, sodium polyacrylate, polymaleic acid, and copolymers thereof. In addition to them, examples of polymer materials include carboxymethyl cellulose, styrene butadiene rubber, and polyvinyl alcohol.

The negative electrode electrically conductive agent contains at least one type of carbon materials, e.g., graphite, carbon black, acetylene black, and Ketjen black. The negative electrode electrically conductive agent may be a metal material, an electrically conductive polymer, or the like insofar as the material has the electrical conductivity.

The negative electrode active material 2 may contain other types of negative electrode active materials, as necessary, together with the above-described negative electrode active material 200 including the core portion 201 and the coating portion 202.

The above-described other negative electrode active material is, for example, a carbon material because the electrical resistance of the negative electrode active material layer 2 is reduced and, in addition, the negative electrode active material layer 2 is not expanded or shrunk easily during charge and discharge. Examples of the carbon materials include graphitizable carbon, nongraphitizable carbon having an interlayer spacing of (002) planes of 0.37 nm or more, and graphite having an interlayer spacing of (002) planes of 0.34 nm or less. More concretely, various types of thermal decomposition carbon, various types of coke, glassy carbon fibers, organic polymer compound fired bodies, various types of activated carbon, various types of carbon black, and the like are mentioned. Among them, various types of coke include pitch coke, needle coke, petroleum coke, and the like. The organic polymer compound fired bodies refer to materials produced by firing and carbonizing phenol resins, furan resins, and the like at appropriate temperatures. The shape of the carbon material may be any one of a fiber, a sphere, a particle, and a scale. The content of the carbon material in the negative electrode active material layer 2 is not specifically limited, although 60 percent by weight or less is preferable, and 10 percent by weight to 60 percent by weight is further preferable.

Alternatively, the other negative electrode active materials may be metal oxides or polymer compounds. Examples of metal oxides include iron oxide, ruthenium oxide, and molybdenum oxide. Examples of polymer compounds include polyacetylene, polyaniline, and polypyrrole.

The negative electrode active material layer 2 is formed by a coating method, a firing method (sintering method), or at least two types of the methods. The coating method is a method in which, for example, a negative electrode active material is mixed with a negative electrode binder and the like and, thereafter, the resulting mixture is dispersed into an organic solvent or the like, so as to be applied. The firing method refers to a method in which, for example, coating is performed in the same procedure as the coating method and, thereafter, a heat treatment is performed at a temperature higher than the melting point of the negative electrode binder and the like. As for the firing method, techniques in related art may be used. Examples thereof include an atmosphere firing method, a reaction firing method, and a hot press firing method.

Method for Manufacturing Negative Electrode

The negative electrode is formed in the procedure described below, for example. The materials for forming the negative electrode collector 1 and the negative electrode active material layer 2 are explained above in detail and, therefore, the explanations thereof will be omitted appropriately.

Initially, the particulate (powdered) core portion 201 having the above-described composition is obtained by using, for example, a gas atomizing method, a water atomizing method, or a melt-pulverization method.

Subsequently, the coating portion 202 having the above-described composition is formed on the surface of the core portion 201 by using, for example, a vapor phase growth method, e.g., an evaporation method or a sputtering method. In the case where the material for forming the coating portion 202 is deposited by using the vapor phase growth method, as described above, the coating portion 202 tends to become amorphous. In this case, the material for forming the coating portion 202 may be deposited while being heated through induction heating, resistance heating, electron beam heating, or the like, or the coating portion 202 may be heated after formation in such a way that the coating portion 202 becomes low-crystalline. The degree of low crystallinity is controlled in accordance with, for example, conditions, e.g., the temperature and the time of heating. Moisture in the coating portion 202 is removed and, in addition, the adhesion of the coating portion 202 to the core portion 201 is improved because of the heat treatment.

In particular, in the case where the vapor phase growth method is used, not only the material for forming the coating portion 202 is heated, but also a base for film formation is heated, so that Si-M1-O is formed in the coating portion 202 easily. The base temperature is preferably 200° C. or higher and lower than 900° C., for example. Meanwhile, in formation of the coating portion 202, the abundance ratio of the bonding state of a Si atom relative to an O atom can be controlled by adjusting the amounts of introduction of $O_2$, $H_2$, and the like introduced into a chamber and adjusting the temperature of the core portion 201. Consequently, the core portion 201 is covered with the coating portion 202 and, thereby, the negative electrode active material 200 is obtained.

Then, a solution of a metal salt containing a metal element, which is a constituent element of the electrically conductive portion, is prepared. The resulting solution is fed to the surface of the coating portion 202, so as to deposit the metal salt. This metal salt can be selected in accordance with the type of the metal element and is at least one type of, for example, nickel nitrate, cobalt nitrate, iron nitrate, copper nitrate, iron acetate, nickel acetate, cobalt acetate, and copper acetate. The solvent of the solution is at least one type of, for example, water, ethanol, hexane, and isopropyl alcohol. Subsequently, reduction is performed by using $H_2$ or the like, so that a particulate or a film-shaped electrically conductive portion 203 is formed on the surface of the coating portion 202.

Finally, a hydrocarbon gas, e.g., methane, is thermally decomposed by using the electrically conductive portion 203 as a catalyst and, thereby, a fibrous carbon material is grown from the electrically conductive portion 203, so as to form the fibrous carbon portion 204. Consequently, the negative electrode active material 200 is obtained.

In the case where the negative electrode active material 200 is formed, the additional electrically conductive portion may be formed on the surface of the coating portion 202 by using the vapor phase growth method, e.g., an evaporation method, a sputtering method, or a chemical vapor deposition (CVD) method, a wet-coating method, or the like.

In the case where the evaporation method is used, for example, the electrically conductive portion is formed by blowing a vapor to the surface of the negative electrode active material 200 directly. In the case where the sputtering method is used, for example, the electrically conductive portion is formed by using a powder sputtering method while an Ar gas is introduced. In the case where the CVD method is used, for example, the electrically conductive portion is formed on the surface of the coating portion 202 by mixing a gas produced through sublimation of a metal chloride and a mixed gas of, $H_2$, $N_2$, and the like in such a way that the molar ratio of the metal chloride becomes 0.03 to 0.3 and, thereafter, performing heating to 1,000° C. or higher. In the case where the wet-coating is used, for example, the electrically conductive portion is formed on the surface of the coating portion 202 by adding an alkali solution to a slurry containing the negative electrode active material 200 while a metal-containing solution is added, so as to form a metal hydroxide, and thereafter, performing a reduction treatment with $H_2$ at 450° C. In the case where a carbon material is used as the material for forming the electrically conductive portion, the electrically conductive portion is formed on the surface of the coating portion 202 by putting the negative electrode active material 200 into a chamber, introducing an organic gas into the chamber and, thereafter, performing a heat treatment for 5 hours under the condition of 10,000 Pa and 1,000° C. or higher. The type of this organic gas is not specifically limited insofar as carbon is generated through heat-decomposition, and examples thereof include methane, ethane, ethylene, acetylene, and propane.

Then, the negative electrode active material 200 and other materials, e.g., a negative electrode binder, are mixed, so as to form a negative electrode mix, and a negative electrode mix slurry is produced through dissolution into a solvent, e.g., an organic solvent. Finally, the negative electrode active material layer 2 is formed by applying the negative electrode mix slurry to the surface of the negative electrode collector 1 and performing drying. As necessary, the negative electrode active material layer 2 may be compression-formed or heated (fired) thereafter.

Operations and Advantages of Present Embodiment

According to this negative electrode, the negative electrode active material 200 includes the amorphous or low-crystalline coating portion 202 disposed on the surface of the core portion 201 and the fibrous carbon portion 204 disposed on the surface of the coating portion 202. The coating portion 202 contains Si and O as constituent elements, while the atomic ratio y of O relative to Si satisfies $0.5 \le y \le 1.8$. Consequently, the core portion 201 occludes and releases lithium ions smoothly and easily and, in addition, the core portion 201 is protected by the coating portion 202 in such a way that a fresh surface is not exposed during charge and discharge while smooth occlusion and release are maintained. Moreover, different negative electrode active materials 200 are electrically connected to each other through the fibrous carbon portions 204, so that the electrical resistance of the negative electrode active material 200 is reduced significantly. Consequently, improvements in battery performances of a lithium ion secondary battery including the negative electrode, concretely, improvements in cycle characteristics, initial charge and discharge characteristics, and load characteristics, are facilitated.

In particular, still higher advantages are obtained when the average length of the fibrous carbon portion 204 is 50 nm to 50,000 nm, the average diameter is 5 nm to 500 nm, or the proportion of the fibrous carbon portion 204 relative to the core portion 201 and the coating portion 202 is 1 percent by weight to 20 percent by weight.

2. Lithium Ion Secondary Battery

Next, a lithium ion secondary battery including the above-described lithium ion secondary battery negative electrode (hereafter simply referred to as a "secondary battery") will be described.

2-1. Prism Type

Figure 3:
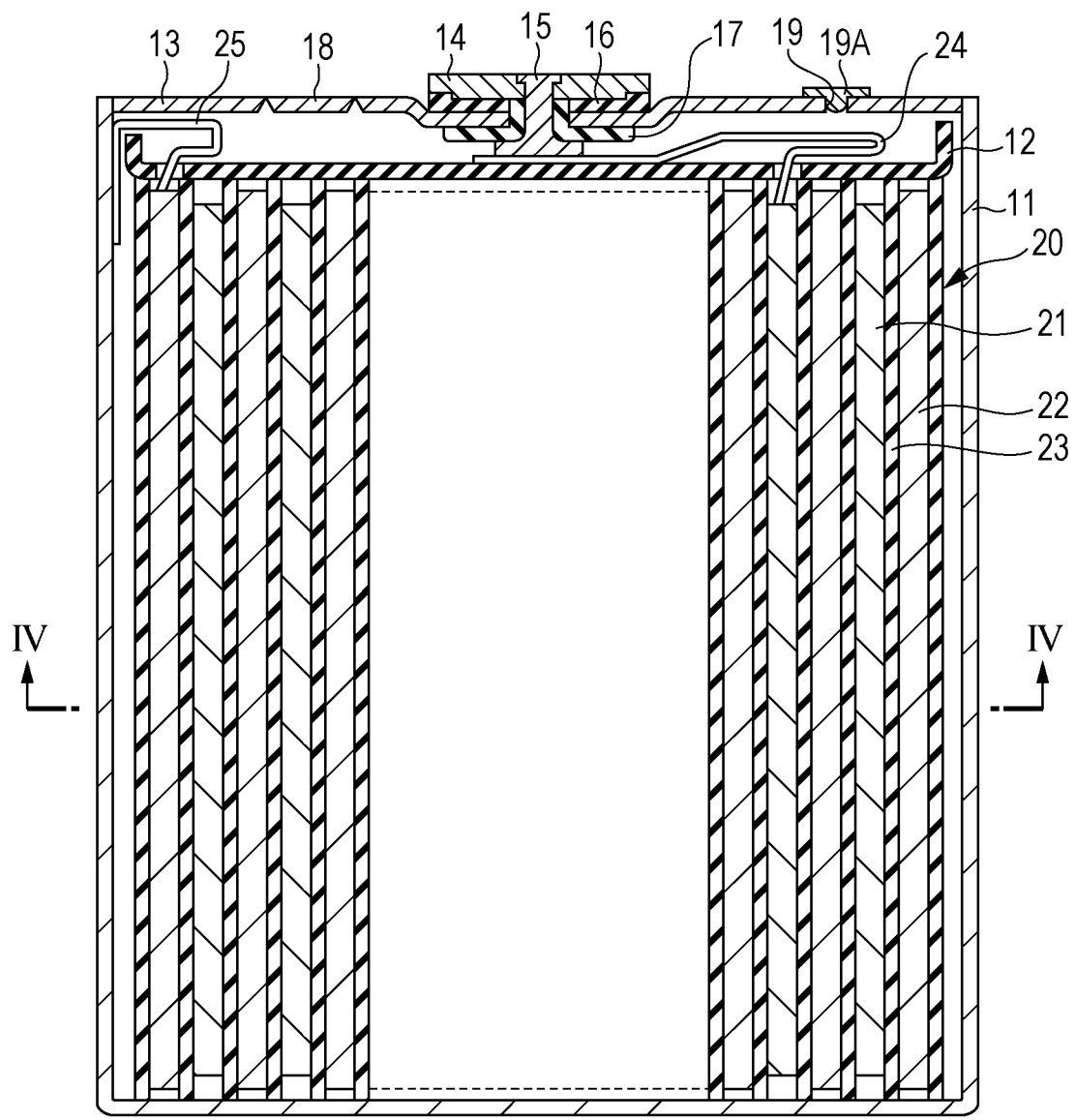
FIG. 3 is a sectional view showing the configuration of a lithium ion secondary battery (prism type) according to an embodiment of the present disclosure.
Figure 4:
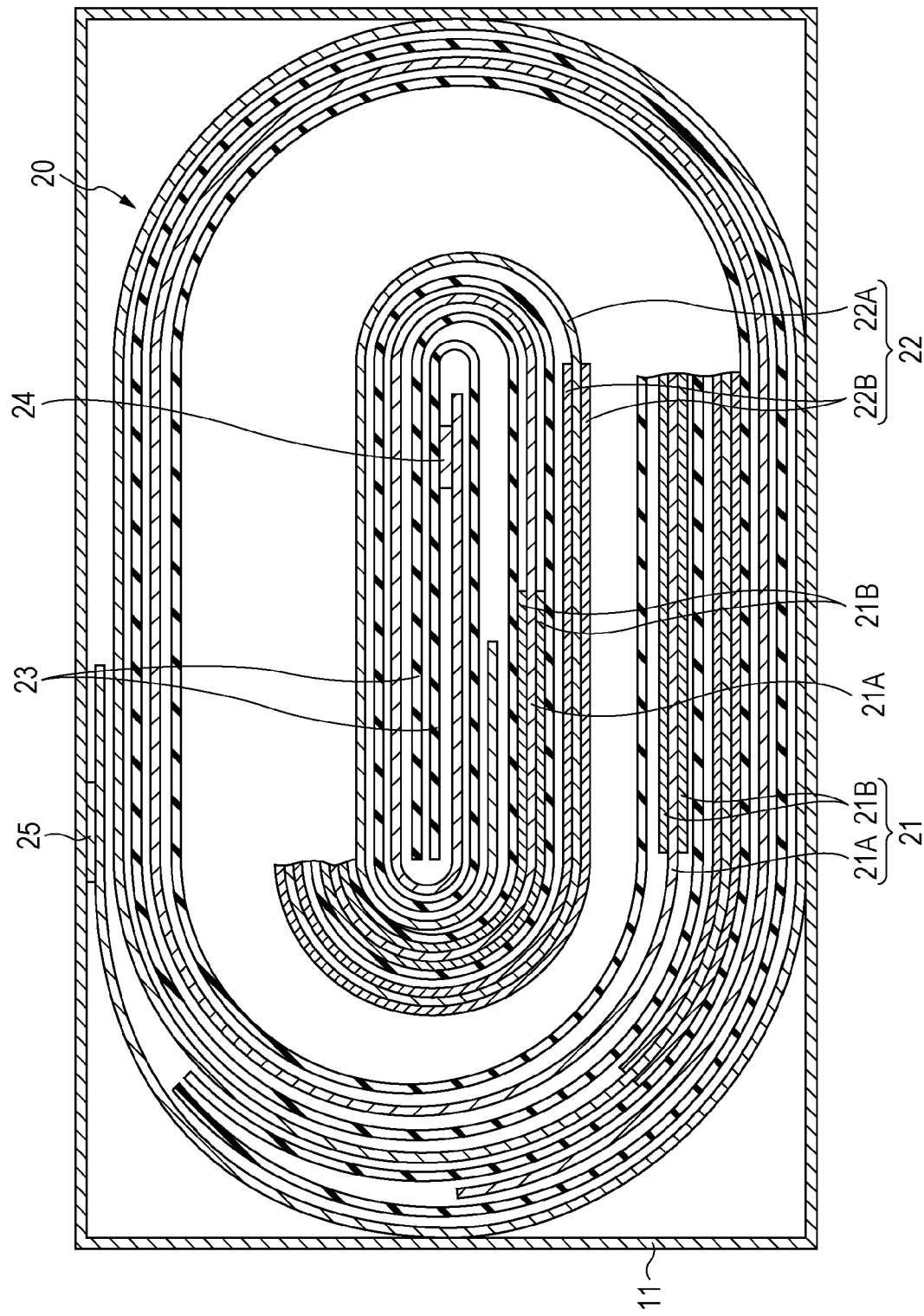
FIG. 4 is a sectional view of a section of the lithium ion secondary battery shown in FIG. 3, taken along a line IV-IV.
Figure 5:
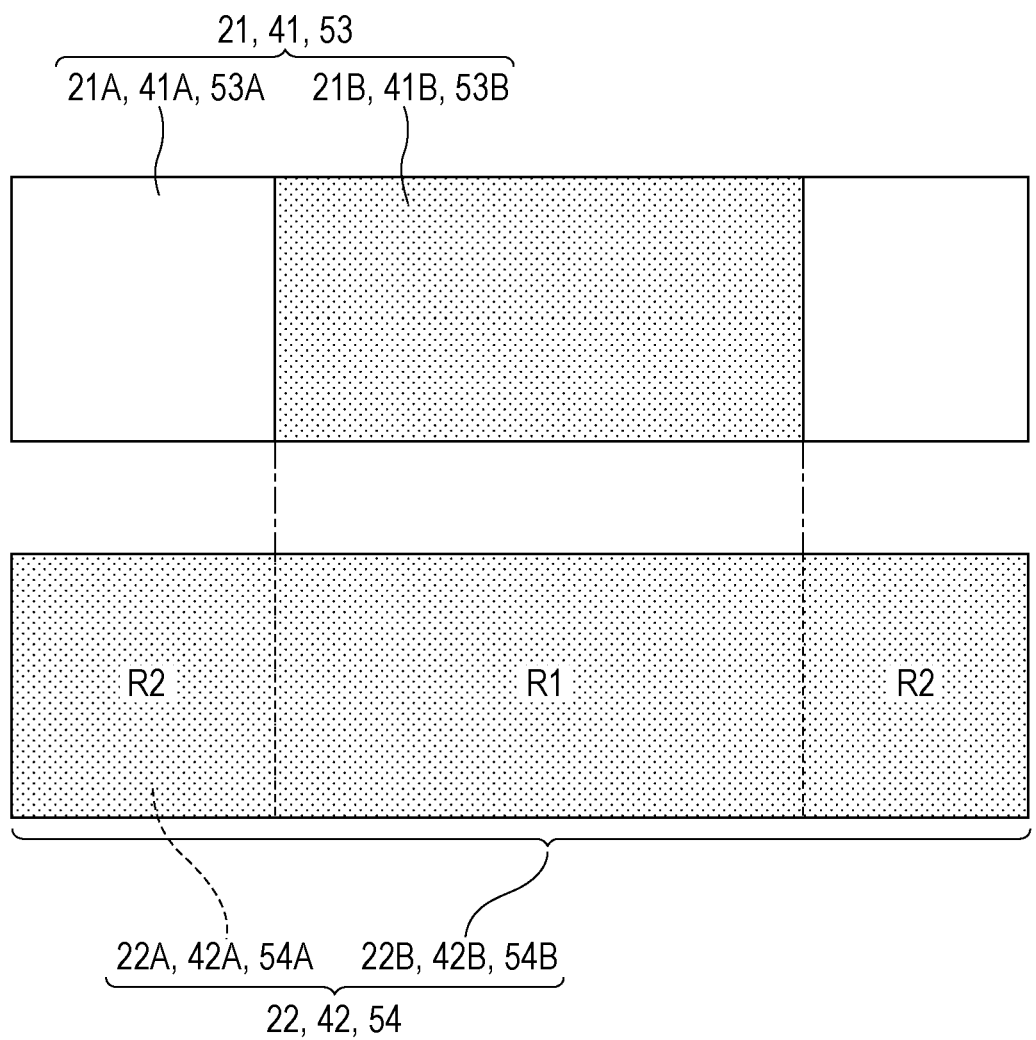
FIG. 5 is a plan view schematically showing the configurations of the positive electrode and the negative electrode shown in FIG. 4.

FIG. 3 and FIG. 4 show the cross-sectional configuration of a prism type secondary battery. FIG. 4 shows a cross-section taken along a line IV-IV shown in FIG. 3. FIG. 5 shows the two-dimensional configurations of the positive electrode 21 and the negative electrode 22 shown in FIG. 4.

Whole Configuration of Secondary Battery

Regarding the prism type secondary battery, mainly a battery element 20 is held in the inside of a battery can 11. The battery element 20 is a rolled laminate in which the positive electrode 21 and the negative electrode 22 are stacked and rolled with a separator 23 therebetween, and has a flat shape in accordance with the shape of the battery can 11.

The battery can 11 is, for example, a prism type outer case member. As shown in FIG. 4, this prism type outer case member has a rectangular or nearly rectangular (including a curve partly) cross-sectional shape in the longitudinal direction and, therefore, is applied to a prism type battery in the shape of not only a rectangle, but also an oval. That is, the prism type outer case member is a container-shaped member of a rectangular type with a bottom or an elliptical type with a bottom, the member having an opening portion in the shape of a rectangle or nearly in the shape of a rectangle (in the shape of an ellipse) in which arcs are bonded with straight lines. FIG. 4 shows the case where the battery can 11 has a rectangular cross-sectional shape.

The battery can 11 may be formed from an electrically conductive material, e.g., Fe, Al, or an alloy thereof, and have a function as an electrode terminal. Most of all, Fe harder than Al is preferable in order to suppress expansion of the battery can 11 through the use of hardness (hard-to-deform property) during charge and discharge. In the case where the battery can 11 is formed from Fe, the surface thereof may be plated with Ni or the like.

The battery can 11 has a hollow structure, in which one end portion is opened and the other end portion is closed, and is sealed with an insulating plate 12 and a battery lid 13 disposed at the open end portion. The insulating plate 12 is disposed between the battery element 20 and the battery lid 13 and is formed from, for example, an insulating material, e.g., polypropylene. The battery lid 13 may be formed from, for example, the same material as that for the battery can 11 and have the function as an electrode terminal as with the battery can 11.

A terminal plate 14 serving as a positive electrode terminal is disposed outside the battery lid 13. The terminal plate 14 is electrically insulated from the battery lid 13 with an insulating case 16 therebetween. The insulating case 16 is formed from an insulating material, e.g., polypropylene terephthalate. A through hole is disposed nearly at the center of the battery lid 13. A positive electrode pin 15 is inserted into the through hole in such a way as to be electrically connected to the terminal plate 14 and be electrically insulated from the battery lid 13 with a gasket 17 therebetween. The gasket 17 is formed from, for example, an insulating material and the surface thereof is coated with asphalt.

A rupture valve 18 and an injection hole 19 are disposed in the vicinity of the outer edge of the battery lid 13. The rupture valve 18 is electrically connected to the battery lid 13. In the case where the internal pressure of the battery becomes a predetermined value or more because of internal short-circuit or heating from the outside, the rupture valve 18 is detached from the battery lid 13 to release the internal pressure. The injection hole 19 is blocked with, for example, a seal member 19A formed from a stainless steel ball.

A positive electrode lead 24 formed from an electrically conductive material, e.g., Al, is attached to an end portion (for example, inside termination portion) of the positive electrode 21. In addition, a negative electrode lead 25 formed from an electrically conductive material, e.g., Ni, is attached to an end portion (for example, outside termination portion) of the negative electrode 22. The positive electrode lead 24 is welded to one end of the positive electrode pin 15 and is electrically connected to the terminal plate 14. The negative electrode lead 25 is welded to the battery can 11 and is electrically connected to the battery can 11.

Positive Electrode

The positive electrode 21 has, for example, positive electrode active material layers 21B on both surfaces of a positive electrode collector 21A. However, the positive electrode active material layer 21B may be disposed on only one surface of the positive electrode collector 21A.

The positive electrode collector 21A is formed from, for example, an electrically conductive material, e.g., Al, Ni, or stainless steel.

The positive electrode active material layer 21B contains at least one type of positive electrode material, which serves as a positive electrode active material and which can occlude and release lithium ions and, as necessary, other materials, e.g., a positive electrode binder or a positive electrode electrically conductive agent, may be contained. In this regard, details of the positive electrode binder or the positive electrode electrically conductive agent are, for example, the same as those described above with respect to the negative electrode binder or the negative electrode electrically conductive agent.

As for the positive electrode material, a Li-containing compound is preferable because a high energy density is obtained. Examples of Li-containing compounds include composite oxides containing Li and a transition metal element as constituent elements and phosphoric acid compounds containing Li and a transition metal element as constituent elements. In particular, it is preferable that the transition metal element is at least one type selected from the group consisting of Co, Ni, Mn, and Fe. This is because a higher voltage is obtained. The Li-containing compound is represented by, for example, a chemical formula, $Li_xM11O_2$ or $Li_yM12PO_4$. In the formula, M11 or M12 represents at least one type of transition metal element. The values of x and y are different depending on the charge and discharge state, and usually satisfy $0.05 \leq x \leq 1.10$ and $0.05 \leq y \leq 1.10$. In particular, in the case where the positive electrode material contains Ni or Mn, the volume stability factor tends to increase.

Examples of composite oxides containing Li and a transition metal element include $Li_xCoO_2$, $Li_xNiO_2$, and LiNi based composite oxides represented by Formula (1). Examples of phosphoric acid compounds containing Li and a transition metal element include $LiFePO_4$ and $LiFe_{1-u}Mn_uPO_4$ (u<1)). This is because a high battery capacity is obtained and, in addition, excellent cycle characteristics are obtained. The positive electrode materials may be materials other than those described above. Examples thereof include materials represented by $Li_xM14_yO_2$ (M14 represents Ni and at least one type of M13 shown in Formula (1), x>1 is satisfied, and y is selected optionally).

$$LiNi_{1-x}M13_xO_2 \qquad (1)$$

(M13 represents at least one type selected from the group consisting of Co, Mn, Fe, Al, V, Sn, Mg, Ti, Sr, Ca, Zr, Mo, Tc, Ru, Ta, W, Re, Y, Cu, Zn, Ba, B, Cr, Si, Ga, P, Sb, and Nb, and x satisfies 0.005<x<0.5.)

Besides them, examples of positive electrode materials include oxides, disulfides, chalcogenides, and electrically conductive polymers. Examples of oxides include titanium oxide, vanadium oxide, and manganese dioxide. Examples of disulfides include titanium disulfide and molybdenum sulfide. Examples of chalcogenides include niobium selenide. Examples of electrically conductive polymers include sulfur, polyaniline, and polythiophene.

Negative Electrode

The negative electrode 22 has the same configuration as that of the above-described lithium ion secondary battery negative electrode and includes, for example, negative electrode active material layers 22B on both surfaces of a negative electrode collector 22A. The configurations of the negative electrode collector 22A and the negative electrode active material layer 22B are the same as the configurations of the negative electrode collector 1 and the negative electrode active material layer 2, respectively. It is preferable that the chargeable capacity of a negative electrode material capable of occluding and releasing lithium ions is larger than the discharge capacity of the positive electrode 21 in order to prevent unintentional deposition of Li metal during charge and discharge.

As shown in FIG. 5, the positive electrode active material layer 21B is disposed on a part (for example, a central region in the longitudinal direction) of the surface of the positive electrode collector 21A. On the other hand, the negative electrode active material layer 22B is disposed all over the negative electrode collector 22A, for example. Consequently, the negative electrode active material layer 22B is disposed in a region facing the positive electrode active material layer 21B (facing region R1) and a region not facing the layer 21B (non-facing region R2) in the negative electrode collector 22A. In this case, the part disposed in the facing region R1 in the negative electrode active material layer 22B is involved in charge and discharge, but the part disposed in the non-facing region R2 is hardly involved in charge and discharge. In FIG. 5, the positive electrode active material layer 21B and the negative electrode active material layer 22B are shaded.

As described above, the negative electrode active material 200 (refer to FIG. 2) contained in the negative electrode active material layer 22B includes the core portion 201 and the coating portion 202. In this regard, the negative electrode active material layer 22B may be deformed or damaged because of expansion and shrinkage during charge and discharge and, therefore, the state of formation of the core portion 201 and the coating portion 202 may be changed from the state at the formation of the negative electrode active material layer 22B. However, in the non-facing region R2, an influence of charge and discharge is hardly exerted, and the formation state of the negative electrode active material layer 22B is maintained. Consequently, it is preferable that a series of parameters described above, e.g., presence or absence and the compositions (atomic ratios x and y) of the core portion 201 and the coating portion 202 and the configuration of the fibrous carbon portion (average length, proportion, and the like), are examined with respect to the negative electrode active material layer 22B in the non-facing region R2. This is because presence or absence and the compositions of the core portion 201 and the coating portion 202 and the like can be examined with a high degree of reproducibility and accuracy independently of the history of charge and discharge (presence or absence of charge and discharge, the number of times, and the like).

The maximum utilization factor at a full charge state of the negative electrode 22 (hereafter simply referred to as a "negative electrode utilization factor") is not specifically limited and may be set optionally in accordance with the ratio of the capacity of the positive electrode 21 to the capacity of the negative electrode 22.

The above-described "negative electrode utilization factor" is represented by utilization factor $Z (\%)=(X/Y)\times100$, where X represents the amount of occlusion of lithium ions per unit area at the full charge state of the negative electrode 22 and Y represents the amount of lithium ions, which can be occluded electrochemically, per unit area of the negative electrode 22.

The amount X of occlusion is obtained in the procedure described below, for example. Initially, a secondary battery is charged until the full charge state is reached. Thereafter, the secondary battery is disassembled and a part opposite to the positive electrode 21 of the negative electrode 22 (inspection negative electrode) is cut. Subsequently, an evaluation battery including metal lithium as a counter electrode is assembled by using the inspection negative electrode. Finally, discharge from the evaluation electrode is performed, the discharge capacity at initial discharge is measured and, thereafter, the amount X of occlusion is calculated by dividing the discharge capacity by the area of the inspection negative electrode. In this case, the "discharge" refers to energization in the direction of release of lithium ions from the inspection negative electrode. For example, constant-current discharge is performed at a current density of $0.1$ mA/cm$^2$ until the battery voltage reaches $1.5$ V.

Meanwhile, the amount Y of occlusion is obtained by, for example, performing constant-current constant-voltage charge of the above-described discharged evaluation battery until the battery voltage reaches $0$ V, measuring the charge capacity and, thereafter, performing calculation to divide the charge capacity by the area of the inspection negative electrode. In this case, the "charge" refers to energization in the direction of occlusion of lithium ions by the inspection negative electrode. For example, constant-voltage charge is performed from a current density of $0.1$ mA/cm$^2$ at the battery voltage of $0$ V until the current density reaches $0.02$ mA/cm$^2$.

The negative electrode utilization factor is preferably 35% to 80% because excellent cycle characteristics, initial charge and discharge characteristics, and negative electrode characteristics are obtained.

Separator

The separator 23 isolates the positive electrode 21 from the negative electrode 22, and passes lithium ions while preventing an occurrence of short-circuit resulting from contact of the two electrodes. The separator 23 is formed from, for example, a porous film composed of a synthetic resin or ceramic, and a layered film, in which at least two types of porous films are stacked, may be employed. Examples of synthetic resins include polytetrafluoroethylene, polypropylene, and polyethylene.

Electrolytic Solution

The separator 23 is impregnated with an electrolytic solution which is a liquid electrolyte. The electrolytic solution is produced by dissolving an electrolyte salt into a solvent and may contain other materials, e.g., additives, as necessary.

The solvent contains at least one type of nonaqueous solvent, e.g., an organic solvent. Examples of nonaqueous solvents include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methyl pyrrolidinone, N-methyl oxazolidinone, N,N'-dimethylimidazolidinone, nitromethane, nitroethane, sulfolane, trimethyl phosphoric acid, and dimethyl sulfoxide. This is because excellent battery capacity, cycle characteristics, storage characteristic, and the like are obtained.

Most of all, at least one type of ethylene carbonate, propylene carbonate, dimethyl carbonate, diethyl carbonate, and ethyl methyl carbonate are preferable. This is because more excellent characteristics are obtained. In this case, a combination of a high-viscosity (high-dielectric constant) solvent (for example, relative dielectric constant $\in\geq 30$), e.g., ethylene carbonate or propylene carbonate, and a low-viscosity solvent (for example, viscosity≤1 mPa·s), e.g., dimethyl carbonate, ethyl methyl carbonate, or diethyl carbonate, is more preferable. This is because the dissociation property of the electrolyte salt and the mobility of ion are improved.

In particular, it is preferable that the nonaqueous solvent contains at least one of a halogenated chain carbonate ester and a halogenated cyclic carbonate ester. This is because a stable coating film is formed on the surface of the negative electrode 22 during charge and discharge and, thereby, a decomposition reaction of the electrolytic solution is suppressed. The halogenated chain carbonate ester refers to a chain carbonate ester containing a halogen as a constituent element (at least one hydrogen is substituted with halogen). The halogenated cyclic carbonate ester refers to a cyclic carbonate ester containing a halogen as a constituent element (at least one H is substituted with halogen).

The type of halogen is not specifically limited, although F, Cl, and Br are preferable, and F is more preferable. This is because effects higher than the effects of other halogens are obtained. The number of halogens is preferably 2 as compared with 1, and may be 3 or more because a capability to form a protective film is enhanced and, in addition, a stronger and more stable coating film is formed, so that a decomposition reaction of the electrolytic solution is further suppressed.

Examples of halogenated chain carbonate esters include fluoromethyl methyl carbonate, bis(fluoromethyl) carbonate, and difluoromethyl methyl carbonate. Examples of halogenated cyclic carbonate esters include 4-fluoro-1,3-dioxolan-2-on and 4,5-difluoro-1,3-dioxolan-2-on. The halogenated cyclic carbonate esters include geometrical isomers. The contents of the halogenated chain carbonate ester and the halogenated cyclic carbonate ester are, for example, 0.01 percent by weight to 50 percent by weight.

It is preferable that the nonaqueous solvent contains an unsaturated carbon bond cyclic carbonate ester because a stable coating film is formed on the surface of the negative electrode 22 during charge and discharge, so that a decomposition reaction of the electrolytic solution is suppressed. The unsaturated carbon bond cyclic carbonate ester refers to a cyclic carbonate ester including at least one unsaturated carbon bond (an unsaturated carbon bond is introduced somewhere). Examples of unsaturated carbon bond cyclic carbonate esters include vinylene carbonate and vinyl ethylene carbonate. The content of the unsaturated carbon bond cyclic carbonate ester in the nonaqueous solvent is, for example, 0.01 percent by weight to 10 percent by weight.

It is preferable that the nonaqueous solvent contains sultone (cyclic sulfonic acid ester) because the chemical stability of the electrolytic solution is enhanced. Examples of sultone include propane sultone and propene sultone. The content of sultone in the nonaqueous solvent is, for example, 0.5 percent by weight to 5 percent by weight.

Furthermore, it is preferable that the nonaqueous solvent contains an acid anhydride because the chemical stability of the electrolytic solution is enhanced. Examples of acid anhydrides include carboxylic acid anhydrides, disulfonic acid anhydrides, and carboxylic-sulfonic anhydrides. Examples of carboxylic acid anhydrides include succinic anhydride, glutaric anhydride, and maleic anhydride. Examples of disulfonic acid anhydrides include ethane disulfonic acid anhydride and propane disulfonic acid anhydride. Example of carboxylic-sulfonic anhydrides include sulfobenzoic acid anhydride, sulfopropionic acid anhydride, and sulfobutyric acid anhydride. The content of the acid anhydride in the nonaqueous solvent is, for example, 0.5 percent by weight to 5 percent by weight.

The electrolyte salt contains, for example, at least one type of light-metal salt, e.g., a lithium salt. Examples of the lithium salts include $LiPF_6$, $LiBF_4$, $LiClO_4$, $LiAsF_6$, $LiB(C_6H_5)_4$, $LiCH_3SO_3$, $LiCF_3SO_3$, $LiAlCl_4$, $Li_2SiF_6$, $LiCl$, and $LiBr$, and other types of Li salts may be employed. This is because excellent battery capacity, cycle characteristics, storage characteristics, and the like are obtained.

Among them, at least one type selected from the group consisting of $LiPF_6$, $LiBF_4$, $LiClO_4$, and $LiAsF_6$ is preferable, $LiPF_6$ or $LiBF_4$ is preferable, and $LiPF_6$ is more preferable. This is because the internal resistance is reduced, so that further excellent characteristics are obtained.

The content of the electrolyte salt relative to the solvent is preferably 0.3 mol/kg or more and 3.0 mol/kg or less because high ionic conductivity is obtained.

Action of Secondary Battery

In this prism type secondary battery, for example, lithium ions released from the positive electrode 21 during charge are occluded by the negative electrode 22 through the electrolytic solution. Furthermore, for example, lithium ions released from the negative electrode 22 during discharge are occluded by the positive electrode 21 through the electrolytic solution.

Method for Manufacturing Secondary Battery

This secondary battery is produced in the procedure described below, for example.

Initially, the positive electrode 21 is produced. The positive electrode active material and, as necessary, the positive electrode binder, the positive electrode electrically conductive agent, and the like are mixed, so as to produce a positive electrode mix. The resulting positive electrode mix is dispersed into an organic solvent or the like, so as to produce a paste-like positive electrode mix slurry. The positive electrode mix slurry is applied to the positive electrode collector 21A by using a coating apparatus, e.g., a doctor blade or a bar coater, and drying is performed, so as to form the positive electrode active material layer 21B. The positive electrode active material layer 21B is compression-formed by using a roll press machine or the like, while heating is performed, as necessary. In this case, compression forming may be repeated a plurality of times.

Subsequently, the negative electrode active material layer 22B is formed on the negative electrode collector 22A in the same production procedure as that for the above-described lithium ion secondary battery negative electrode, so as to produce the negative electrode 22.

Then, the battery element 20 is produced. The positive electrode lead 24 is attached to the positive electrode collector 21A by a welding method or the like and, in addition, the negative electrode lead 25 is attached to the negative electrode collector 22A. The positive electrode 21 and the negative electrode 22 are stacked with the separator 23 therebetween and they are rolled in the longitudinal direction. The rolled body is formed into a flat shape.

Finally, a secondary battery is assembled. The battery element 20 is held into the inside of the battery can 11, and the insulating plate 12 is placed on the battery element 20. The positive electrode lead 24 is attached to the positive electrode pin 15 by the welding method or the like and, in addition, the negative electrode lead 25 is attached to the battery can 11. In this case, the battery lid 13 is fixed to the open end portion of the battery can 11 by a laser welding method or the like. An electrolytic solution is injected into the inside of the battery can 11 from the injection hole 19, so as to be impregnated into the separator 23 and, thereafter, the injection hole 19 is blocked with the seal member 19A.

Operations and Advantages of Secondary Battery

According to this prism type secondary battery, the negative electrode 22 has the same configuration as that of the above-described lithium ion secondary battery negative electrode and, therefore, the same operations are obtained. Consequently, battery characteristics excellent in cycle characteristics, initial charge and discharge characteristics, load characteristic, and the like are obtained. The advantages other than them are the same as those of the lithium ion secondary battery negative electrode.

2-2. Cylinder Type

Figure 6:
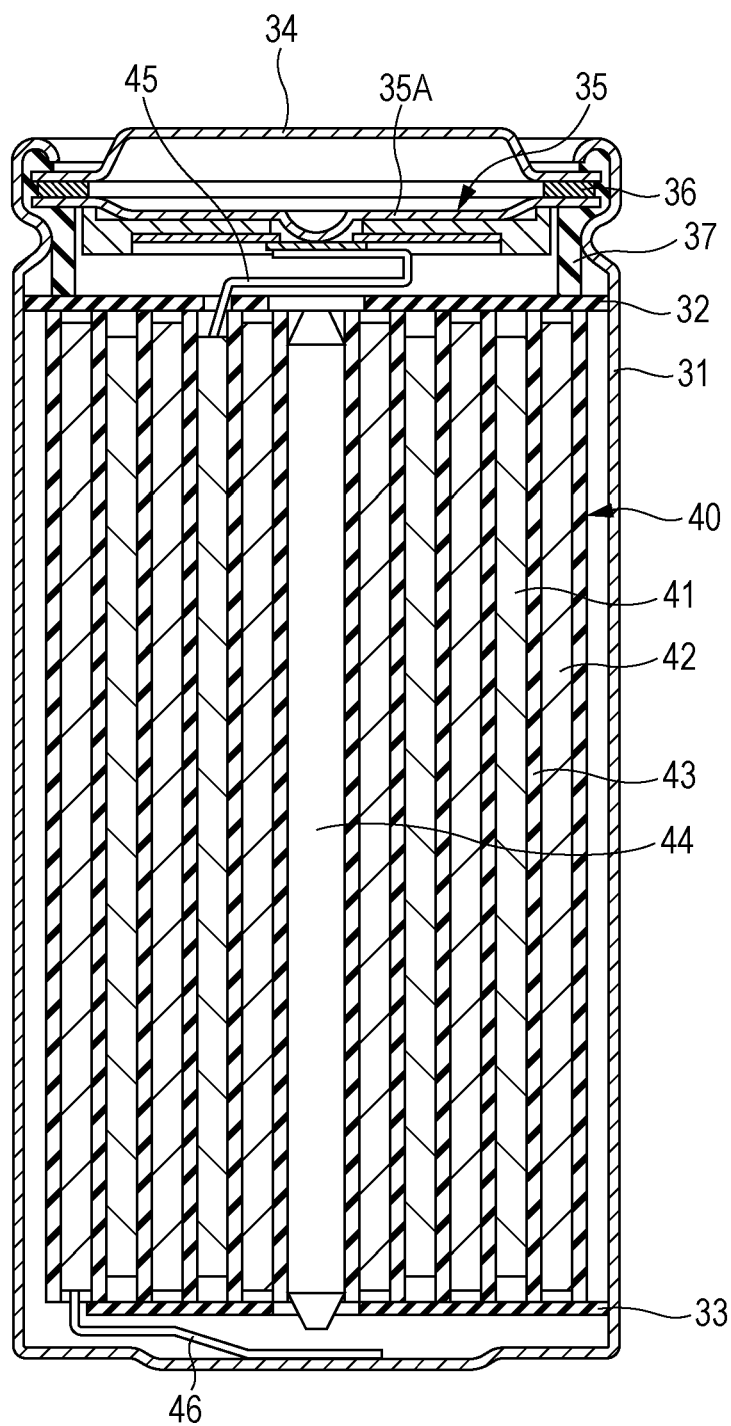
FIG. 6 is a sectional view showing the configuration of a lithium ion secondary battery (cylinder type) according to an embodiment of the present disclosure.
Figure 7:
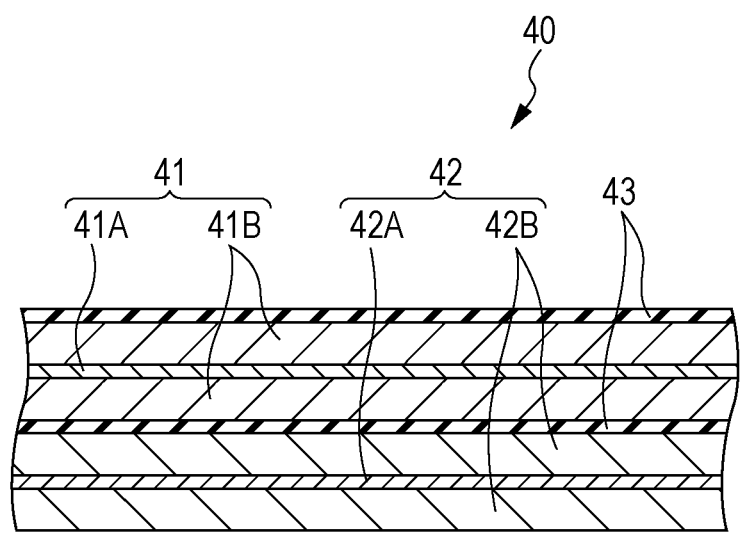
FIG. 7 is a magnified sectional view showing a part of the rolled electrode assembly shown in FIG. 6.

FIG. 6 and FIG. 7 show the cross-sectional configuration of a cylinder type secondary battery. FIG. 7 shows a part of the rolled electrode assembly 40 shown in FIG. 6 under magnification. Hereafter the constituents of the above-described prism type secondary battery will be referred appropriately.

Configuration of Secondary Battery

Regarding the cylinder type secondary battery, mainly a rolled electrode assembly 40 and a pair of insulating plates 32 and 33 are held in the inside of a battery can 31 nearly in the shape of a hollow circular cylinder. The rolled electrode assembly 40 is a rolled laminate in which a positive electrode 41 and a negative electrode 42 are stacked and rolled with a separator 43 therebetween.

The battery can 31 has a hollow structure, in which one end portion is closed and the other end is opened, and is formed from, for example, the same material as the material for the battery can 11. The pair of insulating plates 32 and 33 sandwich the rolled electrode assembly 40 from above and below and are arranged in such a way as to extend perpendicularly to the rolling circumferential surface.

A battery lid 34, a safety valve mechanism 35, and a positive temperature coefficient element (PTC element) 36 are attached to the open end portion of the battery can 31 by swaging with a gasket 37 therebetween, so that the battery can 31 is sealed. The battery lid 34 is formed from, for example, the same material as the material for the battery can 31. The safety valve mechanism 35 and the positive temperature coefficient element 36 are disposed inside the battery lid 34 and the safety valve mechanism 35 is electrically connected to the battery lid 34 with the positive temperature coefficient element 36 therebetween. Regarding the safety valve mechanism 35, in the case where the internal pressure becomes a predetermined value or more because of internal short-circuit, heating from the outside, or the like, a disk plate 35A is inverted and, thereby, electrical connection between the battery lid 34 and the rolled electrode assembly 40 is cut. The positive temperature coefficient element 36 prevents irregular heat generation, which results from a large current, by an increase in resistance in accordance with a temperature increase. The gasket 37 is formed from, for example, an insulating material and the surface thereof may be coated with asphalt.

A center pin 44 may be inserted at the center of the rolled electrode assembly 40. A positive electrode lead 45 formed from an electrically conductive material, e.g., Al, is connected to the positive electrode 41. In addition, a negative electrode lead 46 formed from an electrically conductive material, e.g., Ni, is connected to the negative electrode 42. The positive electrode lead 45 is, for example, welded to the safety valve mechanism 35 and is electrically connected to the battery lid 34. The negative electrode lead 46 is, for example, welded to the battery can 31 and, in addition, is electrically connected to the battery can 31.

The positive electrode 41 has, for example, positive electrode active material layers 41B on both surfaces of a positive electrode collector 41A. The negative electrode 42 has the same configuration as that of the above-described lithium ion secondary battery negative electrode and has, for example, negative electrode active material layers 42B on both surfaces of a negative electrode collector 42A. The configurations of the positive electrode collector 41A, the positive electrode active material layer 41B, the negative electrode collector 42A, the negative electrode active material layer 42B, and the separator 43 are the same as the configurations of the positive electrode collector 21A, the positive electrode active material layer 21B, the negative electrode collector 22A, the negative electrode active material layer 22B, and the separator 23, respectively. The composition of the electrolytic solution impregnated into the separator 43 is the same as the composition of the electrolytic solution in the prism type secondary battery.

Action of Secondary Battery

In this cylinder type secondary battery, for example, lithium ions released from the positive electrode 41 during charge are occluded by the negative electrode 42 through the electrolytic solution. Furthermore, for example, lithium ions released from the negative electrode 42 during discharge are occluded by the positive electrode 41 through the electrolytic solution.

Method for Manufacturing Secondary Battery

This cylinder type secondary battery is produced in the procedure described below, for example. Initially, in the same production procedure as for the positive electrode 21 and the negative electrode 22, the positive electrode 41 is produced by forming the positive electrode active material layers 41B on both surfaces of the positive electrode collector 41A and, in addition, the negative electrode 42 is produced by forming the negative electrode active material layers 42B on both surfaces of the negative electrode collector 42A. Then, the positive electrode lead 45 is attached to the positive electrode 41 by the welding method or the like and the negative electrode lead 46 is attached to the negative electrode 42. The positive electrode 41 and the negative electrode 42 are stacked and rolled with the separator 43 therebetween, so as to produce the rolled electrode assembly 40. Thereafter, the center pin 44 is inserted into the rolling center. The rolled electrode assembly 40 is held into the inside of the battery can 31 while being sandwiched between a pair of insulating plates 32 and 33. In this case, the positive electrode lead 45 is attached to the safety valve mechanism 35 by the welding method and, in addition, the end portion of the negative electrode lead 46 is attached to the battery can 31. Subsequently, the electrolytic solution is injected into the inside of the battery can 31, so as to be impregnated into the separator 43. Finally, the battery lid 34, the safety valve mechanism 35, and the positive temperature coefficient element 36 are attached to the open end portion of the battery can 31 and they are swaged with the gasket 37 therebetween.

Operations and Advantages of Secondary Battery

According to this cylinder type secondary battery, the negative electrode 42 has the same configuration as that of the above-described lithium ion secondary battery negative electrode and, therefore, the same advantages as those of the prism type secondary battery are obtained.

2-3. Laminate Film Type

Figure 8:
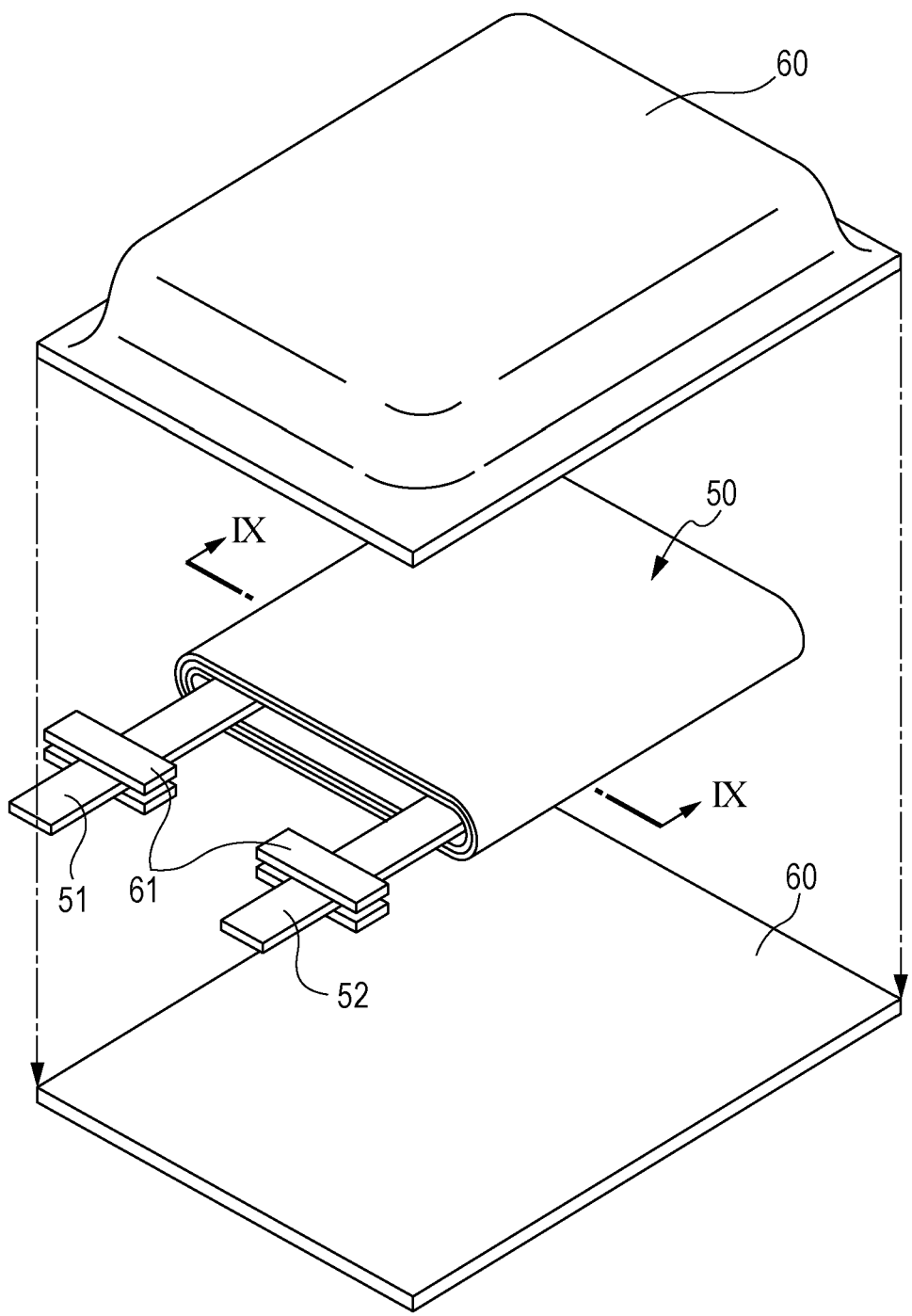
FIG. 8 is an exploded perspective view showing the configuration of a lithium ion secondary battery (laminate film type) according to an embodiment of the present disclosure.
Figure 9:
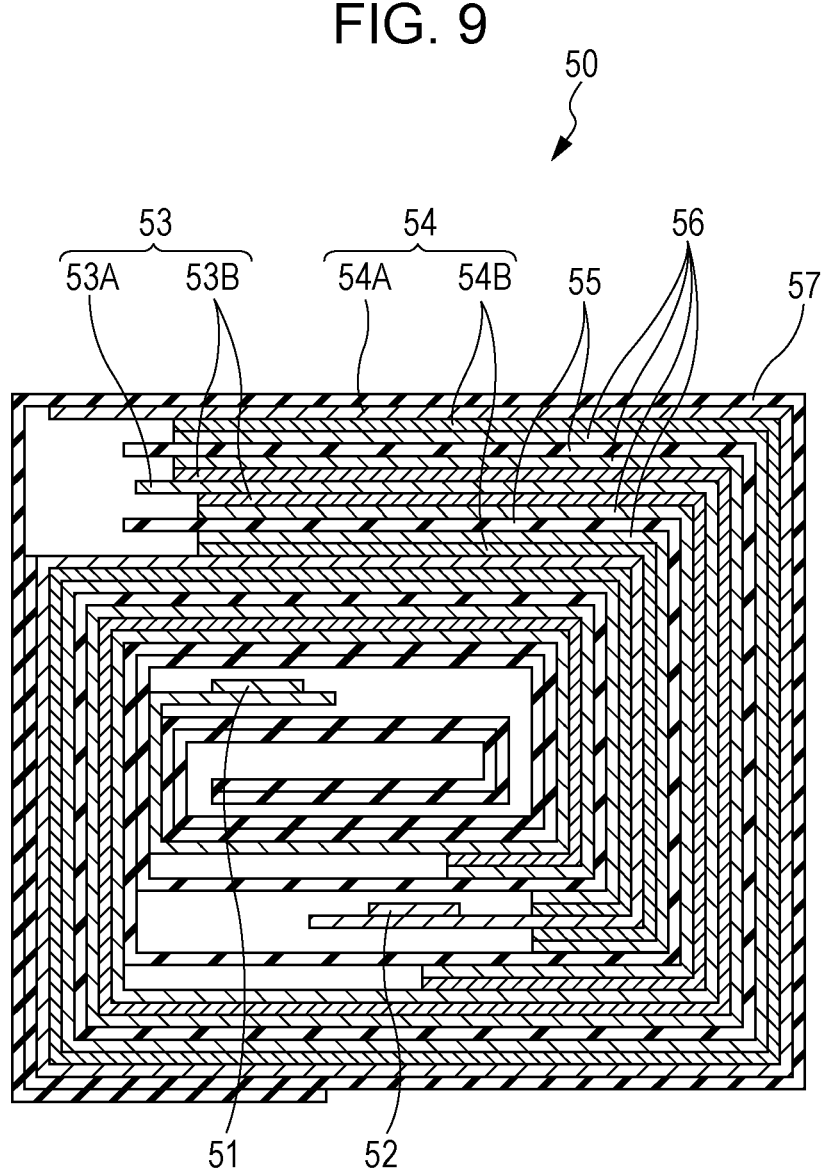
FIG. 9 is a sectional view of a section of the rolled electrode assembly shown in FIG. 8, taken along a line IX-IX.

FIG. 8 is an exploded perspective view showing the configuration of a laminate film type secondary battery. FIG. 9 is a magnified sectional view of a section of the rolled electrode assembly 50 shown in FIG. 8, taken along a line IX-IX.

Configuration of Secondary Battery

Regarding the laminate film type secondary battery, mainly a rolled electrode assembly 50 is held in the inside of a film-shaped outer case member 60. The rolled electrode assembly 50 is a rolled laminate in which a positive electrode 53 and a negative electrode 54 are stacked and rolled with a separator 55 and an electrolyte layer 56 therebetween. A positive electrode lead 51 is attached to the positive electrode 53 and a negative electrode lead 52 is attached to the negative electrode 54. The outermost circumferential portion of the rolled electrode assembly 50 is protected by a protective tape 57.

The positive electrode lead 51 and the negative electrode lead 52 are led in the same direction from the inside of the outer case member 60 toward the outside. The positive electrode lead 51 is formed from, for example, an electrically conductive material, e.g., Al, and the negative electrode lead 52 is formed from, for example, an electrically conductive material, e.g., Cu, Ni, or stainless steel. These materials are in the shape of, for example, a thin sheet or a net.

The outer case member 60 is, for example, a laminate film in which a fusion layer, a metal layer, and a surface protective layer are stacked in that order. Regarding the laminate film, for example, the outer edge portions of the fusion layers of two films are mutually fused or bonded with an adhesive or the like in such a way that the fusion layer faces the rolled electrode assembly 50. The fusion layer is a film of, for example, polyethylene or polypropylene. The metal layer is, for example, Al foil. The surface protective layer is a film of, for example, nylon or polyethylene terephthalate.

Among them, as for the outer case member 60, an aluminum laminate film, in which a polyethylene film, aluminum foil, and a nylon film are stacked in that order, is preferable. However, the outer case member 60 may be a laminate film having other layered structure or be a polymer film of polypropylene or the like or a metal film.

An adhesion film 61 to prevent the entry of outside air is inserted between the outer case member 60 and the positive electrode lead 51 and between the outer case member 60 and the negative electrode lead 52. The adhesion film 61 is formed from a material having the adhesion to the positive electrode lead 51 and the negative electrode lead 52. Examples of such materials include polyolefin resins, e.g., polyethylene, polypropylene, modified polyethylene, and modified polypropylene.

The positive electrode 53 has, for example, positive electrode active material layers 53B on both surfaces of a positive electrode collector 53A. The negative electrode 54 has the same configuration as that of the above-described lithium ion secondary battery negative electrode and has, for example, negative electrode active material layers 54B on both surfaces of a negative electrode collector 54A. The configurations of the positive electrode collector 53A, the positive electrode active material layer 53B, the negative electrode collector 54A, and the negative electrode active material layer 54B are the same as the configurations of the positive electrode collector 21A, the positive electrode active material layer 21B, the negative electrode collector 22A, and the negative electrode active material layer 22B, respectively. The configuration of the separator 55 is the same as the configuration of the separator 23.

The electrolyte layer 56 is a layer in which an electrolytic solution is held by a polymer compound and may contain other materials, e.g., an additive, as necessary. The electrolyte layer 56 is a so-called gel electrolyte. The gel electrolyte is preferable because a high ionic conductivity (for example, 1 mS/cm or more at room temperature) is obtained and, in addition, leakage of the electrolyte is prevented.

The polymer compound includes at least one of, for example, polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethyl methacrylate, polyacrylic acid, polymethacrylic acid, styrene-butadiene rubber, nitrile-butadiene rubber, polystyrene, polycarbonate, and copolymers of vinylidene fluoride and hexafluoropyrene. Among them, polyvinylidene fluoride and copolymers of vinylidene fluoride and hexafluoropyrene are preferable because of electrochemical stability.

The composition of the electrolytic solution is the same as that of, for example, the electrolytic solution in the prism type secondary battery. However, regarding the electrolyte layer 56, which is a gel electrolyte, the solvent of the electrolytic solution refers to a wide concept including not only liquid solvents, but also materials having the ionic conductivity capable of dissociating electrolyte salts. Therefore, in the case where a polymer compound having the ionic conductivity is used, the polymer compound concerned is included in the solvent.

Meanwhile, an electrolytic solution may be used instead of the gel electrolyte layer 56. In this case, the electrolytic solution is impregnated into the separator 55.

Action of Secondary Battery

In this laminate film type secondary battery, for example, lithium ions released from the positive electrode 53 during charge are occluded by the negative electrode 54 through the electrolyte layer 56. Furthermore, for example, lithium ions released from the negative electrode 54 during discharge are occluded by the positive electrode 53 through the electrolyte layer 56.

Method for Manufacturing Secondary Battery

This laminate film type secondary battery provided with the gel electrolyte layer 56 is produced in three types of procedures described below, for example.

Regarding a first procedure, initially, the positive electrode 53 and the negative electrode 54 are produced in the same production procedure as for the positive electrode 21 and the negative electrode 22. In this case, the positive electrode active material layers 53B are formed on both surfaces of the positive electrode collector 53A to produce the positive electrode 53 and, in addition, the negative electrode active material layers 54B are formed on both surfaces of the negative electrode collector 54A to form the negative electrode 54. Subsequently, a precursor solution containing the electrolytic solution, the polymer compound, an organic solvent, and the like is prepared, and the resulting precursor solution is applied to the positive electrode 53 and the negative electrode 54 to form the gel electrolyte layers 56. Then, the positive electrode lead 51 is attached to the positive electrode collector 53A by the welding method or the like and the negative electrode lead 52 is attached to the negative electrode collector 54A. The positive electrode 53 and the negative electrode 54 provided with the electrolyte layer 56 are stacked and rolled with the separator 55 therebetween, so as to produce the rolled electrode assembly 50. Thereafter, a protective tape is stuck to the outermost circumference portion of the assembly. Finally, the rolled electrode assembly 50 is sandwiched between two film-shaped outer case members 60, and the outer edge portions of the outer case members 60 are mutually stuck by a heat-fusion method or the like, so that the rolled electrode assembly 50 is sealed in the outer case members 60. In this case, adhesion films 61 are inserted between the positive electrode lead 51 and the outer case member 60 and between the negative electrode lead 52 and the outer case member 60.

Regarding a second procedure, initially, the positive electrode lead 51 is attached to the positive electrode 53 and, in addition, the negative electrode lead 52 is attached to the negative electrode 54. The positive electrode 53 and the negative electrode 54 are stacked and rolled with the separator 55 therebetween, so as to produce a rolled body serving as a precursor of the rolled electrode assembly 50. Thereafter, a protective tape 57 is stuck to the outermost circumference portion of the rolled body. The resulting rolled body is sandwiched between two film-shaped outer case members 60, all outer edge portions excluding one side of the outer case members 60 are mutually stuck by a heat-fusion method or the like, and the rolled body is held into the inside of the bag-shaped outer case members 60. Then, an electrolyte composition containing an electrolytic solution, a monomer serving as a raw material for the polymer compound, a polymerization initiator and, as necessary, other materials, e.g., a polymerization inhibitor, is prepared and injected into the inside of the bag-shaped outer case members 60. The opening portion of the outer case members 60 is sealed by the heat-fusion method or the like. Finally, the monomer is heat-polymerized to produce a polymer compound, so that the gel electrolyte layer 56 is formed.

Regarding a third procedure, initially, in the same production procedure as the above-described second procedure, the rolled body is produced and is held into the inside of the bag-shaped outer case members 60 except that a separator 55 having both surfaces coated with a polymer compound is used. Examples of the polymer compounds applied to the separator 55 include polymers (homopolymers, copolymers, multicomponent copolymers, and the like) containing vinylidene fluoride as a component. Concrete examples include polyvinylidene fluoride, binary copolymers containing vinylidene fluoride and hexafluoropropylene as components, and ternary copolymers containing vinylidene fluoride, hexafluoropropylene, and chlorotrifluoroethylene as components. At least one type of other polymer compound may be used in combination with the polymer containing vinylidene fluoride as a component. Subsequently, an electrolytic solution is prepared and is injected into the inside of the outer case members 60 and the opening portion of the outer case members 60 is sealed by the heat-fusion method or the like. Finally, the outer case members 60 are heated while a load is applied, so that the separator 55 is allowed to adhere to the positive electrode 53 and the negative electrode 54 with the polymer compound therebetween. Consequently, the electrolytic solution is impregnated into the polymer compound and, thereby, the electrolyte layer 56 is formed through gelation of the polymer compound.

Regarding the third procedure, expansion of the battery is suppressed as compared with the first procedure. Furthermore, regarding the third procedure, the monomer serving as the raw material for the polymer compound, the organic solvent, and the like hardly remain in the electrolyte layer 56 and, thereby, the process to form the polymer compound is controlled favorably, as compared with that in the second procedure. Consequently, sufficient adhesion is obtained between the positive electrode 53, the negative electrode 54, and the separator 55 and the electrolyte layer 56.

3. Use of Lithium Ion Secondary Battery

Next, application examples of the above-described lithium ion secondary battery will be described.

Uses of the lithium ion secondary battery are not specifically limited insofar as the uses are a machine, an apparatus, an instrument, a device, a system (an aggregate of a plurality of apparatuses and the like), in which the lithium ion secondary battery can be used as a driving power supply, an electricity storage source to accumulate electricity, and the like. In the case where the lithium ion secondary battery is used as a power supply, the power supply may be a main power supply (power supply used preferentially) or an auxiliary power supply (power supply used instead of a main power supply or by switching from a main power supply). The type of the main power supply is not limited to the lithium ion secondary battery.

Examples of uses of the lithium ion secondary battery include portable electronic apparatuses, e.g., video cameras, digital steel cameras, cellular phones, notebook-size personal computers, cordless phones, headphone stereos, portable radios, portable televisions, and personal digital assistants, portable life instruments, e.g., electric shavers, memory devices, e.g., backup power supplies and memory cards, power tools, e.g., electric drills and electric saws, battery packs used as power supplies of notebook-size personal computers, medical electronic apparatuses, e.g., pacemakers and hearing aids, electric vehicles, e.g., electric cars (including hybrid cars), and electricity storage systems, e.g., home battery systems to accumulate electricity in preparation for emergency. As a matter of course, uses other than the above-described uses may be mentioned.

Most of all, it is effective that the lithium ion secondary battery is applied to battery packs, electric vehicles, electricity storage systems, power tools, electronic apparatuses, and the like. This is because battery characteristics can be improved effectively by using the lithium ion secondary battery according to an embodiment of the present disclosure, although excellent battery characteristics are desired. In this regard, the battery pack is a power supply including the lithium ion secondary battery and is a so-called assembled battery or the like. The electric vehicle is a vehicle which is actuated (moved) by using the lithium ion secondary battery as a driving power source and may be a car provided with a driving power supply other than the lithium ion secondary battery in combination (hybrid car or the like), as described above. The electricity storage system is a system in which the lithium ion secondary battery is used as an electricity storage source. For example, regarding home electricity storage system, an electric power is accumulated in the lithium ion secondary battery serving as the electricity storage source, and the electric power is consumed as necessary, so that home electronics appliances can be used. The power tool is a tool in which a movable portion (for example, a drill and the like) is moved by using the lithium ion secondary battery as a driving power supply. The electronic apparatuses are apparatuses which perform various functions by using the lithium ion secondary battery as a driving power supply.

Some application examples of the lithium ion secondary battery will be described concretely. The configuration of each application example described below is no more than an example and, therefore, modifications may be made appropriately.

3-1. Battery Pack

Figure 10:
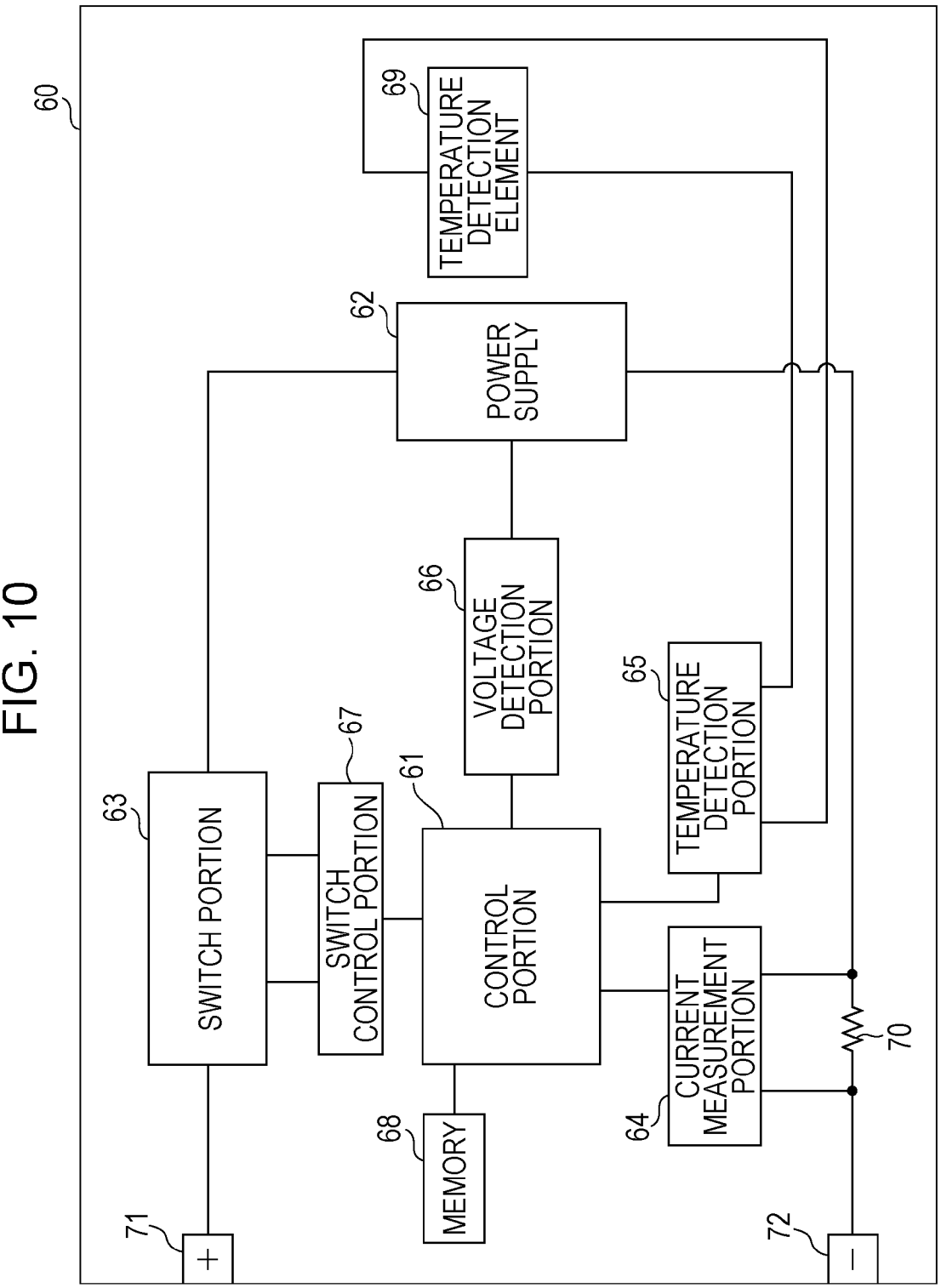
FIG. 10 is a block diagram showing the configuration of an application example (battery pack) of a lithium ion secondary battery.

FIG. 10 shows a block configuration of a battery pack. As shown in FIG. 10, this battery pack is provided with, for example, a control portion 61, a power supply 62, a switch portion 63, a current measurement portion 64, a temperature detection portion 65, a voltage detection portion 66, a switch control portion 67, a memory 68, a temperature detection element 69, a current detection resistance 70, a positive electrode terminal 71, and a negative electrode terminal 72 in the inside of a case 60 formed from a plastic material or the like.

The control portion 61 controls the actions (including the usage state of the power supply 62) of the whole battery pack, and includes, for example, a central processing unit (CPU). The power supply 62 includes at least one lithium ion secondary battery (not shown in the drawing). This power supply 62 is, for example, an assembled battery including at least two lithium ion secondary batteries, where the connection system may be series, parallel, or a mixed type of the two. In an example, the power supply 62 includes six lithium ion secondary batteries connected in such a way that three sets of parallel batteries are connected in series.

The switch portion 63 switches the usage state of the power supply 62 (connection or disconnection between the power supply 62 and outside apparatuses) in response to the instructions from the control portion 61. This switch portion 63 includes, for example, a charge control switch, a discharge control switch, a charge diode, and a discharge diode (they are not shown in the drawing). The charge control switch and the discharge control switch are, for example, semiconductor switches, e.g., a field-effect transistor (MOSFET) by using a metal oxide semiconductor.

The current measurement portion 64 measures the current by using the current detection resistance 70 and outputs the measurement results to the control portion 61. The temperature detection portion 65 measures the temperature by using temperature detection element 69 and outputs the measurement results to the control portion 61. The results of the temperature measurement are used, for example, in the case where the control portion 61 performs charge and discharge control when irregular heat generation occurs and in the case where the control portion 61 performs correction processing in calculation of the remaining capacity. The voltage detection portion 66 measures the voltage of the lithium ion secondary battery in the power supply 62, and performs analog/digital (A/D) conversion of the measured voltage, so as to supply the results to the control portion 61.

The switch control portion 67 controls the action of the switch portion 63 in accordance with signals input from the current measurement portion 64 and the voltage detection portion 66.

The switch control portion 67 controls in such a way that, for example, in the case where the battery voltage reaches the overcharge detection voltage, the switch portion 63 (charge control switch) is cut and a charge current is not passed through a current path of the power supply 62. Consequently, regarding the power supply 62, only discharge is possible through the discharge diode. Furthermore, the switch control portion 67 interrupts the charge current when a large current passes during charging.

The switch control portion 67 controls in such a way that, for example, in the case where the battery voltage reaches the overdischarge detection voltage, the switch portion 63 (discharge control switch) is cut and a discharge current is not passed through a current path of the power supply 62. Consequently, regarding the power supply 62, only charge is possible through the charge diode. Furthermore, the switch control portion 67 interrupts the discharge current when a large current passes during discharge.

Regarding the lithium ion secondary battery, for example, the overcharge detection voltage is 4.20 V±0.05 V, and the overdischarge detection voltage is 2.4 V±0.1 V.

The memory 68 is, for example, EEPROM, which is nonvolatile memory. Regarding the memory 68, for example, the numerical values calculated in the control portion 61 and information (for example, the internal resistance in an initial state) of the lithium ion secondary battery, which are measured at a stage in the production process, and the like have been stored. In the case where a full charge capacity of the lithium ion secondary battery is stored in the memory 68, the control portion 61 can grasp the information, e.g., the remaining capacity.

The temperature detection element 69 is, for example, a thermistor to measure the temperature of the power supply 62 and output the measurement results to the control portion 61.

A positive electrode terminal 71 and a negative electrode terminal 72 are terminals connected to an external apparatus (for example, a notebook-size personal computer) operated by using the battery pack or an external apparatus (for example, a charger) used for charging the battery pack. Charge and discharge of the power supply 62 is performed through the positive electrode terminal 71 and the negative electrode terminal 72.

3-2. Electric Vehicle

Figure 11:
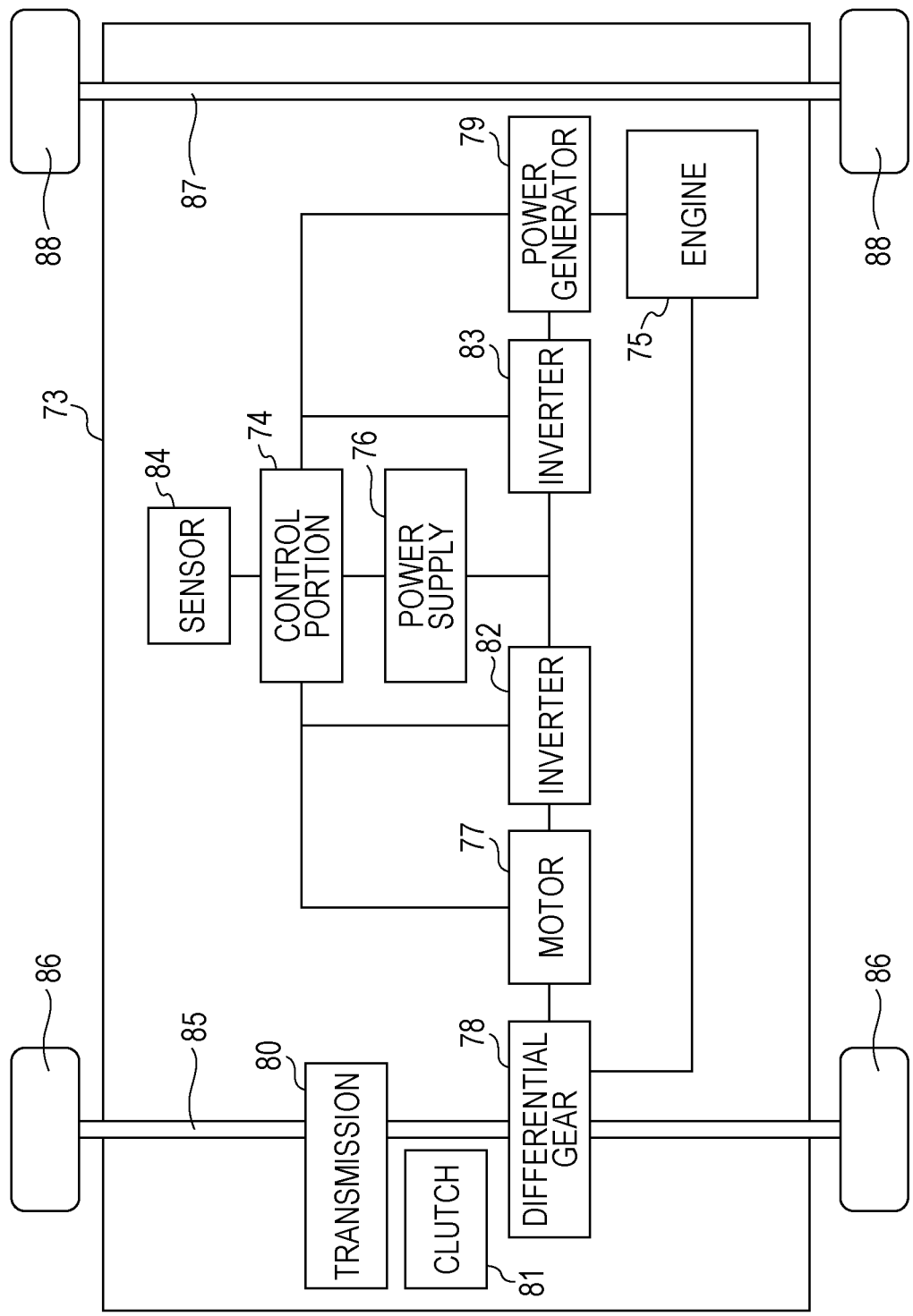
FIG. 11 is a block diagram showing the configuration of an application example (electric vehicle) of a lithium ion secondary battery.

FIG. 11 shows a block configuration of a hybrid car which is an example of the electric vehicle. As shown in FIG. 11, this electric vehicle is equipped with control portion 74, an engine 75, a power supply 76, a driving motor 77, a differential gear 78, a power generator 79, a transmission 80, a clutch 81, inverters 82 and 83, and various sensors 84 in the inside of a metal case 73. Besides them, the electric vehicle is equipped with, for example, a front-wheel driving shaft 85 connected to the differential gear 78 and the transmission 80, front wheels 86, a rear-wheel driving shaft 87, and rear wheels 88.

This electric vehicle can be moved while any one of the engine 75 and the motor 77 serves as a driving source. The engine 75 is a main power source and is, for example, a gasoline engine or the like. In the case where the engine 75 serves as the power source, the driving force (torque) from the engine 75 is transferred to the front wheels 86 or the rear wheels 88 through, for example, the differential gear 78, the transmission 80, and the clutch 81, which are included in a driving portion. The torque of the engine 75 is also transferred to the power generator 79, and the power generator 79 generates an alternating current power by the torque. The resulting alternating current power is converted to a direct current power through the inverter 83 and is accumulated into the power supply 76. Meanwhile, in the case where the motor 77, which is a conversion portion, serves as a power source, the electric power (direct current power) supplied from the power supply 76 is converted to an alternating current power through the inverter 82, and the motor 77 is driven by the alternating current power. The driving force (torque) converted from the electric power by the motor 77 is transferred to the front wheels 86 or the rear wheels 88 through, for example, the differential gear 78, the transmission 80, and the clutch 81, which are included in a driving portion.

Furthermore, regarding deceleration of the electric vehicle due to a brake mechanism, although not shown in the drawing, the resistance at the time of the deceleration may be transferred to the motor 77 as a torque, and an alternating current power may be generated by the motor 77 on the basis of the torque. It is preferable that this alternating current power is converted to a direct current power through the inverter 82, and the regenerative direct current power is accumulated into the power supply 76.

The control portion 74 controls the actions of the whole electric vehicle and includes, for example, CPU and the like. The power supply 76 includes at least one lithium ion secondary battery (not shown in the drawing). This power supply 76 may be connected to an external power supply, may accumulate an electric power by being supplied with the electric power from the external power supply. The various sensors 84 are used for controlling the engine revolution number of the engine 75, controlling the degree of opening of a throttle valve (throttle opening), although not shown in the drawing, and the like. The various sensors 84 include a speed sensor, an acceleration sensor, an engine revolution number sensor, and the like.

In the above description, the hybrid car has been explained as an electric vehicle. However, the electric vehicle may be a vehicle actuated by using only the power supply 76 and the motor 77 without using the engine 75 (electric car).

3-3. Electricity Storage System

Figure 12:
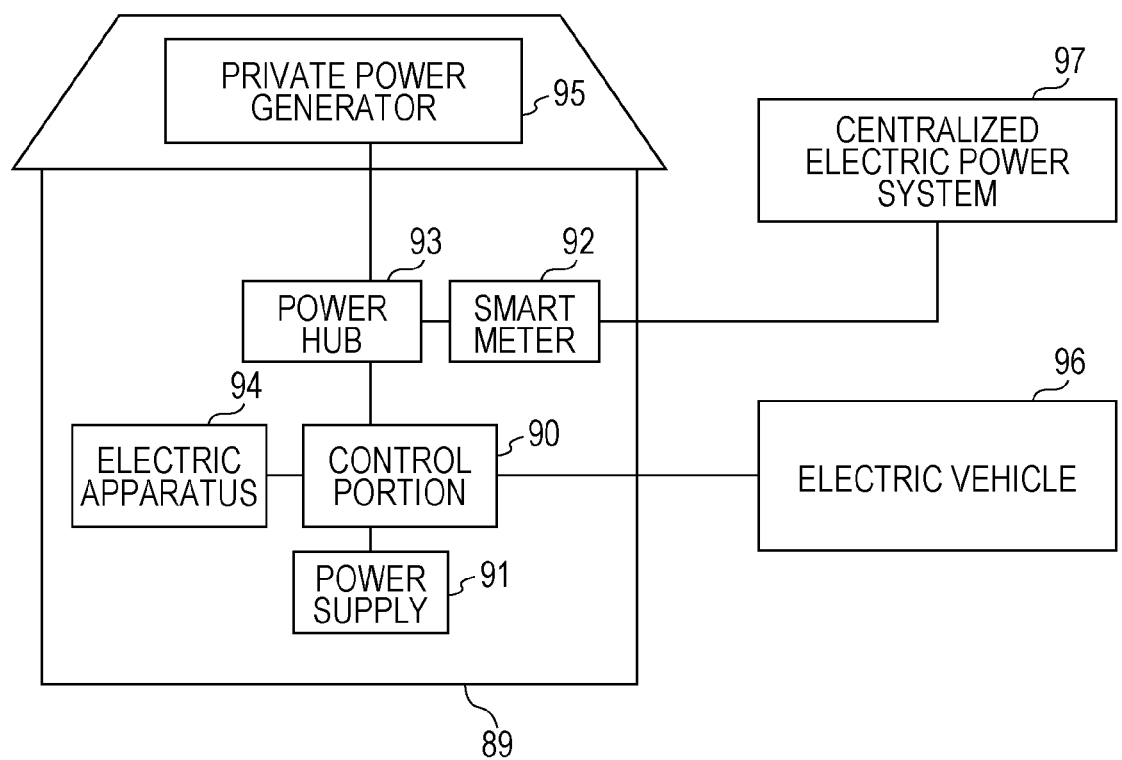
FIG. 12 is a block diagram showing the configuration of an application example (electricity storage system) of a lithium ion secondary battery.

FIG. 12 shows a block configuration of an electricity storage system. As shown in FIG. 12, this electricity storage system is provided with, for example, a control portion 90, a power supply 91, a smart meter 92, and a power hub 93 in the inside of a house 89, e.g., a general housing or a commercial building.

Here, the power supply 91 is connected to, for example, an electric apparatus 94 disposed in the inside of the house 89 and, in addition, can be connected to an electric vehicle 96 stopped outside the house 89. Furthermore, the power supply 91 is connected to, for example, a private power generator 95 disposed in the house 89 through the power hub 93 and, in addition, can be connected to an external centralized electric power system 97 through the smart meter 92 and the power hub 93.

The electric apparatus 94 include, for example, at least one of home electronics appliances, e.g., a refrigerator, an air conditioner, a television, and a water heater. The private power generator 95 is, for example, at least one type of a photovoltaic power generator and a wind power generator. The electric vehicle 96 is, for example, at least one type of an electric car, an electric motorbike, and a hybrid car. The centralized electric power system 97 is, for example, at least one type of the thermal power plant, the nuclear power plant, the hydraulic power plant, and a wind power plant.

The control portion 90 controls the actions (including the usage state of the power supply 91) of the whole electricity storage system, and includes, for example, CPU. The power supply 91 includes at least one lithium ion secondary battery (not shown in the drawing). The smart meter 92 is, for example, a network-compatible wattmeter disposed in the house 89 in the electric power user side and can communicate with the electric power supply side. Consequently, for example, the smart meter 92 controls the balance between the supply and the demand in the house 89 while communicating with the outside, as necessary, in order that energy can be supplied efficiently and stably.

In this electricity storage system, for example, an electric power is accumulated into the power supply 91 from the centralized electric power system 97 serving as an external power supply through the smart meter 92 and the power hub 93 and, in addition, an electric power is accumulated into the power supply 91 from the photovoltaic power generator 95 serving as an independent power supply through the power hub 93. The electric power accumulated in the power supply 91 is supplied to the electric apparatus 94 or the electric vehicle 96, as necessary, in response to the instruction of the control portion 90. Therefore, the electric apparatus 94 can be operated and, in addition, the electric vehicle 96 can be charged. That is, the electricity storage system is a system to make accumulation and supply of the electric power in the house 89 possible by using the power supply 91.

The electric power accumulated in the power supply 91 can be used optionally. Therefore, for example, it is possible that a low-rate power is accumulated into the power supply 91 from the centralized electric power system 97 at night, and the electric power accumulated in the power supply 91 is used during daytime in which the electric power rate is high.

The above-described electricity storage system may be disposed on a house basis (a household basis) or be disposed on a plurality of hoses basis (a plurality of households basis).

3-4. Power Tool

Figure 13:
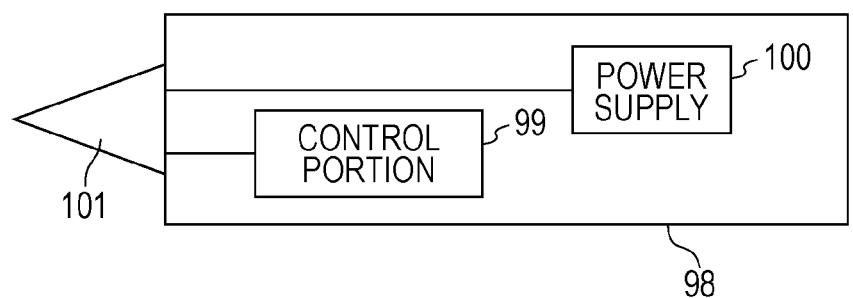
FIG. 13 is a block diagram showing the configuration of an application example (power tool) of a lithium ion secondary battery.

FIG. 13 shows a block configuration of a power tool. As shown in FIG. 13, this power tool is, for example, an electric drill and is provided with a control portion 99 and a power supply 100 in the inside of a tool main body 98 formed from a plastic material or the like. For example, a drill portion 101, which is a movable portion, is attached operatively (rotatably) to the tool main body 98.

The control portion 99 controls the actions (including the usage state of the power supply 100) of the whole power tool, and includes, for example, CPU. The power supply 100 includes at least one lithium ion secondary battery (not shown in the drawing). The control portion 99 actuates the drill portion 101 by supplying an electric power from the power supply 100, as necessary, in accordance with an operation of an action switch, although not shown in the drawing.

EXAMPLES

The examples according to the present disclosure will be described in detail.

Examples 1-1 to 1-14

The laminate film type secondary battery shown in FIG. 8 and FIG. 9 was produced in the procedure described below.

Initially, the positive electrode 53 was produced. A positive electrode mix was prepared by mixing 91 parts by mass of positive electrode active material ($LiCoO_2$), 6 parts by mass of positive electrode electrically conductive agent (graphite), and 3 parts by mass of positive electrode binder (polyvinylidene fluoride: PVDF). The resulting positive electrode mix was dispersed into an organic solvent (N-methyl-2-pyrrolidone: NMP), so as to produce a paste-like positive electrode mix slurry. The resulting positive electrode mix slurry was applied to both surfaces of the positive electrode collector 53A by using a coating apparatus, and drying was performed, so as to form the positive electrode active material layer 53B. As for this positive electrode collector 53A, band-shaped Al foil (thickness=12 μm) was used. The positive electrode active material layer 53B was compression-formed by using a roll press machine. In this regard, the thickness of the positive electrode active material layer 53B was adjusted in such a way that a Li metal was not deposited on the negative electrode 54 at the time of full charge.

Subsequently, the negative electrode 54 was produced. The core portion ($SiO_x$) was obtained by a gas atomizing method. Thereafter, as necessary, a single layer coating portion ($SiO_y$) was formed on the surface of the core portion by using a powder evaporation method. The compositions (atomic ratios x and y) of the core portion and the coating portion are as shown in Table 1. In this case, the half-width of the coating portion was specified to be 0.6°, the crystallite size was specified to be 90 nm, and the median diameter was specified to be 4 μm. The average thickness of the coating portion was specified to be 200 nm and the average coverage was specified to be 70%.

In the case where the core portion was obtained, the atomic ratio x was controlled by adjusting the amount of introduction of oxygen in melt-solidification of the raw material (Si). In the case where the coating portion was formed, the atomic ratio y was controlled by adjusting the amount of introduction of $O_2$ or $H_2$ in deposition of the raw material (Si). Regarding the powder evaporation method, a deflection type electron beam evaporation source was used. In addition, the deposition speed was specified to be 2 nm/sec and a vacuum state at a pressure of $1\times10^{-3}$ Pa was employed by using a turbo molecular pump.

As necessary, the core portion provided with the coating portion was dipped into an aqueous solution of iron acetate to deposit iron acetate on the surface thereof and, thereafter, the electrically conductive portion (Fe or the like) was formed through reduction with $H_2$ or the like. A hydrocarbon gas, e.g., methane, was thermally decomposed by using the electrically conductive portion as a catalyst and, thereby, a carbon material was grown from the electrically conductive portion, so as to form the fibrous carbon portion. The average length, the average diameter, and the proportion (proportion of C) are as shown in Table 1. In this case, the average length was measured while the thermal decomposition temperature, the type of the hydrocarbon gas, or the pressure in the treatment chamber was adjusted.

After the negative electrode active material and a precursor of the negative electrode binder was mixed at a dry weight ratio of 80:20, a paste-like negative electrode mix was produced by performing dilution with NMP. In this case, a polyamic acid containing NMP and N,N-dimethylacetamide (DMAC) was used. The resulting negative electrode mix slurry was applied to both surfaces of the negative electrode collector 54A by using a coating apparatus, and drying was performed. As for this negative electrode collector 54A, rolled Cu foil (thickness=15 μm, ten-point average roughness Rz<0.5 μm) was used. In order to enhance the binding property, the coating film was hot-pressed and, thereafter, firing was performed at 400° C. for 1 hour in a vacuum atmosphere. Consequently, negative electrode binder (polyamide imide) was formed, so that the negative electrode active material layer 54B containing the negative electrode active material and the negative electrode binder was formed. In this regard, the thickness of the negative electrode active material layer 54B was adjusted in such a way that the negative electrode utilization factor became 65%.

Then, the electrolytic solution was prepared by dissolving an electrolyte salt ($LiPF_6$) into the solvent (ethylene carbonate (EC) and diethyl carbonate (DEC)). In this case, the composition of the solvent was specified to be EC:DEC=50:50 on a weight ratio basis, and the content of the electrolyte salt relative to the solvent was specified to be 1 mol/kg.

Finally, the secondary battery was assembled. The Al positive electrode lead 51 was welded to one end of the positive electrode collector 53A and, in addition, the Ni negative electrode lead 52 was welded to one end of the negative electrode collector 54A. The positive electrode 53, the separator 55, the negative electrode 54, and the separator 55 were stacked in that order and were rolled in the longitudinal direction, so as to produce the rolled body serving as the precursor of the rolled electrode assembly 50. The rolling end portion was fixed with a protective tape 57 (adhesive tape). In this case, as for the separator 55, a layered film (thickness=20 μm) was used, in which a film primarily containing porous polyethylene was sandwiched between films primarily containing porous polypropylene. The rolled body was sandwiched between the outer case members 60 and, thereafter, the outer edge portions excluding one side of the outer case members 60 were mutually heat-fused, so that the rolled body was held in the bag-shaped outer case members 60. In this case, as for the outer case member 60, an aluminum laminate film was used, in which a nylon film (thickness=30 μm), Al foil (thickness=40 μm), and a non-stretched polypropylene film (thickness=30 μm) were stacked in that order from the outside. The electrolytic solution was injected from the opening portion of the outer case members 60, so as to be impregnated into the separator 55 and, thereby, the rolled electrode assembly 50 was produced. The opening portion of the outer case members 60 was sealed through heat fusion in a vacuum atmosphere.

The cycle characteristics, the initial charge and discharge characteristics, and the load characteristics of the secondary battery were examined and the results shown in Table 1 were obtained.

Regarding examination of the cycle characteristics, initially, in order to stabilize the battery state, one cycle of charge and discharge was performed in an atmosphere at 23° C. Thereafter, charge and discharge were performed again and a discharge capacity was measured. Subsequently, charge and discharge were performed until the total number of cycles reached 100 and the discharge capacity was measured. Finally, cycle maintenance factor (%)=(discharge capacity at 100th cycle/discharge capacity at 2nd cycle)×100 was calculated. At the time of charge, charge was performed at a constant-current density of 3 mA/cm² until the voltage reached 4.2 V and, thereafter, charge was performed at a constant-voltage of 4.2 V until the current density reached 0.3 mA/cm². At the time of discharge, discharge was performed at a constant-current density of 3 mA/cm² until the voltage reached 2.5 V.

Regarding examination of the initial charge and discharge characteristics, initially, in order to stabilize the battery state, one cycle of charge and discharge was performed. Thereafter, charge was performed again and a charge capacity was measured. Subsequently, discharge was performed and discharge capacity was measured. Finally, initial efficiency (%)=(discharge capacity/charge capacity)×100 was calculated. The atmosphere temperature and the charge and discharge condition were specified to be the same as those in the examination of the cycle characteristics.

Regarding examination of the load characteristics, initially, in order to stabilize the battery state, one cycle of charge and discharge was performed. Subsequently, charge and discharge at the 2nd cycle were performed and the discharge capacity was measured. Thereafter, charge and discharge at the 3rd cycle were performed and the discharge capacity was measured. Finally, load maintenance factor (%)=(discharge capacity at 3rd cycle/discharge capacity at 2nd cycle)×100 was calculated. The atmosphere temperature and the charge and discharge condition were specified to be the same as those in the examination of the cycle characteristics except that the current density in the discharge at the 2nd cycle was specified to be 0.2 mA/cm² and the current density in the discharge at the 3rd cycle was changed to 1 mA/cm².

TABLE 1

| Experimental example | Core portion Composition | x | Coating portion Composition | y | Electrically conductive portion | Fibrous carbon portion | | | Cycle maintenance factor (%) | Initial efficiency (%) | Load maintenance factor (%) |
|---|---|---|---|---|---|---|---|---|---|---|---|
| | | | | | | Average length (nm) | Average diameter (nm) | Proportion of C (wt %) | | | |
| 1-1 | $SiO_x$ | 0.1 | $SiO_y$ | 1.2 | Fe | 10 | 200 | 8 | 69.0 | 72.0 | 85.0 |
| 1-2 | | | | | | 50 | | | 75.0 | 80.0 | 91.0 |
| 1-3 | | | | | | 200 | | | 80.0 | 83.0 | 95.0 |
| 1-4 | | | | | | 1000 | | | 85.0 | 85.0 | 97.0 |
| 1-5 | | | | | | 5000 | | | 88.0 | 86.0 | 98.0 |
| 1-6 | | | | | | 10000 | | | 88.0 | 86.0 | 98.0 |
| 1-7 | | | | | | 50000 | | | 87.0 | 85.0 | 98.0 |
| 1-8 | | | | | | 80000 | | | 87.0 | 85.0 | 98.0 |
| 1-9 | $SiO_x$ | 0.1 | $SiO_y$ | 1.2 | Cu | 5000 | 200 | 8 | 87.0 | 86.0 | 98.0 |
| 1-10 | | | | | Co | | | | 87.5 | 86.0 | 98.0 |
| 1-11 | | | | | Ni | | | | 87.0 | 86.0 | 98.0 |
| 1-12 | $SiO_x$ | 0.1 | — | — | — | — | — | — | 43.0 | 90.0 | 97.0 |
| 1-13 | $SiO_x$ | 0.1 | $SiO_y$ | 1.2 | — | — | — | — | 65.0 | 43.0 | 77.0 |
| 1-14 | $SiO_x$ | 0.1 | — | — | Fe | 5000 | 200 | 8 | 45.0 | 90.0 | 98.0 |

In the case where the negative electrode active material included the coating portion and the fibrous carbon portion together with the core portion, a high cycle maintenance factor, a high initial efficiency, and a high load maintenance factor were obtained.

For details, in the case where the negative electrode active material included only the coating portion, the cycle maintenance factor increased, but the initial efficiency and the load maintenance factor decreased as compared with those in the case where the coating portion and the fibrous carbon portion were not included. Furthermore, when comparisons are made likewise, in the case where the negative electrode active material included only the fibrous carbon portion, the cycle maintenance factor and the load maintenance factor increased slightly, but the initial efficiency were not changed. Meanwhile, when comparisons are made likewise, in the case where the negative electrode active material included the coating portion and the fibrous carbon portion, the cycle maintenance factor increased significantly while a high initial efficiency and a high load maintenance factor were maintained. The advantageous tendency that the cycle maintenance factor increases while decreases in initial efficiency and load maintenance factor are suppressed and remain at minimum levels, as described above, is a specific tendency which is obtained for the first time by combination of the coating portion and the fibrous carbon portion.

In the case where the average diameter was 5 nm or more, side reactions resulting from the presence of the fibrous carbon portion were suppressed. Consequently, the cycle maintenance factor, the initial efficiency, and the load maintenance factor further increased and, in addition, when the average diameter was 500 nm or less, reduction in battery capacity was suppressed.

Experimental Examples 3-1 to 3-6

As shown in Table 3, the proportion of C was changed and various characteristics of the secondary battery were examined. In this case, the proportion of C was controlled by adjusting the thermal decomposition temperature, the type of the hydrocarbon gas, or the pressure in the treatment chamber.

TABLE 3

| Experimental example | Core portion Composition | x | Coating portion Composition | y | Electrically conductive portion | Fibrous carbon portion | | | Cycle maintenance factor (%) | Initial efficiency (%) | Load maintenance factor (%) |
| --- | --- | --- | --- | --- | --- | --- | --- | --- | --- | --- | --- |
| | | | | | | Average length (nm) | Average diameter (nm) | Proportion of C (wt %) | | | |
| 3-1 | SiO$_x$ | 0.1 | SiO$_y$ | 1.2 | Fe | 5000 | 200 | 0.5 | 67.0 | 73.0 | 90.0 |
| 3-2 | | | | | | | | 1 | 79.0 | 82.0 | 95.0 |
| 3-3 | | | | | | | | 5 | 85.0 | 85.0 | 97.0 |
| 3-4 | | | | | | | | 10 | 88.0 | 86.0 | 98.0 |
| 3-5 | | | | | | | | 20 | 88.0 | 85.0 | 98.0 |
| 3-6 | | | | | | | | 30 | 88.0 | 85.0 | 98.0 |

The above-described advantageous tendency was obtained not only in the case where the electrically conductive portion was Fe, but also in the case where the electrically conductive portion was Cu, Co, or Ni. Meanwhile, when the average length of the fibrous carbon portion was 50 nm or more, the cycle maintenance factor, the initial efficiency, and the load maintenance factor further increased and, in addition, when the average length was 50,000 nm or less, reduction in battery capacity was suppressed.

Experimental Examples 2-1 to 2-6

As shown in Table 2, the average diameter of the fibrous carbon portion was changed and various characteristics of the secondary battery were examined. In this case, the average diameter was controlled by adjusting the thermal decomposition temperature, the type of the hydrocarbon gas, or the pressure in the treatment chamber.

In the case where the proportion of C was 1 percent by weight or more, the cycle maintenance factor, the initial efficiency, and the load maintenance factor further increased and, in addition, when the proportion of C was 20 percent by weight or less, reduction in battery capacity was suppressed.

Experimental Examples 4-1 to 4-7

As shown in Table 4, the composition (atomic ratio y) of the coating portion was changed and various characteristics of the secondary battery were examined. In this case, the atomic ratio y was controlled by adjusting the amount of introduction of O$_2$ or H$_2$ in deposition of the raw material (Si).

TABLE 2

| Experimental example | Core portion Composition | x | Coating portion Composition | y | Electrically conductive portion | Fibrous carbon portion | | | Cycle maintenance factor (%) | Initial efficiency (%) | Load maintenance factor (%) |
| --- | --- | --- | --- | --- | --- | --- | --- | --- | --- | --- | --- |
| | | | | | | Average length (nm) | Average diameter (nm) | Proportion of C (wt %) | | | |
| 2-1 | SiO$_x$ | 0.1 | SiO$_y$ | 1.2 | Fe | 5000 | 1 | 8 | 68.0 | 70.0 | 88.0 |
| 2-2 | | | | | | | 5 | | 76.0 | 75.0 | 94.0 |
| 2-3 | | | | | | | 50 | | 82.0 | 81.0 | 96.0 |
| 2-4 | | | | | | | 100 | | 85.0 | 84.0 | 97.0 |
| 2-5 | | | | | | | 500 | | 88.0 | 85.0 | 98.0 |
| 2-6 | | | | | | | 750 | | 88.0 | 84.0 | 98.0 |

TABLE 4

| Experimental example | Core portion Composition | x | Coating portion Composition | y | Electrically conductive portion | Fibrous carbon portion | | | Cycle maintenance factor (%) | Initial efficiency (%) | Load maintenance factor (%) |
| | | | | | | Average length (nm) | Average diameter (nm) | Proportion of C (wt %) | | | |
| --- | --- | --- | --- | --- | --- | --- | --- | --- | --- | --- | --- |
| 4-1 | $SiO_x$ | 0.1 | $SiO_y$ | 0.2 | Fe | 5000 | 200 | 8 | 56.0 | 88.0 | 98.0 |
| 4-2 | | | | 0.5 | | | | | 76.0 | 87.6 | 98.0 |
| 4-3 | | | | 0.7 | | | | | 83.0 | 87.0 | 98.0 |
| 4-4 | | | | 1 | | | | | 84.0 | 86.8 | 98.0 |
| 4-5 | | | | 1.4 | | | | | 88.0 | 86.0 | 98.0 |
| 4-6 | | | | 1.8 | | | | | 88.0 | 84.0 | 98.0 |
| 4-7 | | | | 2 | | | | | 57.0 | 87.0 | 98.0 |

In the case where the atomic ratio y satisfied $0.5 \leq y \leq 1.8$, the cycle maintenance factor increased significantly.

Experimental Examples 5-1 to 5-9 and 6-1 to 6-10

As shown in Table 5 and Table 6, the average coverage and the average thickness of the coating portion were changed and various characteristics of the secondary battery were examined. In this case, in formation of the coating portion, the average coverage was controlled by changing the input electric power and the deposition time and, in addition, the average thickness was controlled by changing the deposition speed and the deposition time.

In the case where the average coverage was 30% or more, the cycle maintenance factor further increased. In the case where the average thickness was 1 nm to 10,000 nm, the initial efficiency further increased.

Experimental Examples 7-1 to 7-4

As shown in Table 7, Fe was contained in the coating portion and various characteristics of the secondary battery were examined. In this case, in formation of the coating portion, the proportion of Fe (Fe proportion) was controlled by co-evaporating a metal powder (Fe) together with a $SiO_y$ powder and, in addition, changing the amount of input of the metal powder.

TABLE 5

| Experimental example | Core portion Composition | x | Coating portion Composition | y | Electrically conductive portion | Fibrous carbon portion | | | Average coverage (%) | Cycle maintenance factor (%) | Initial efficiency (%) | Load maintenance factor (%) |
| | | | | | | Average length (nm) | Average diameter (nm) | Proportion of C (wt %) | | | | |
| --- | --- | --- | --- | --- | --- | --- | --- | --- | --- | --- | --- | --- |
| 5-1 | $SiO_x$ | 0.1 | $SiO_y$ | 1.2 | Fe | 5000 | 200 | 8 | 10 | 76.0 | 89.0 | 98.0 |
| 5-2 | | | | | | | | | 20 | 78.0 | 88.2 | 98.0 |
| 5-3 | | | | | | | | | 30 | 81.6 | 87.9 | 98.0 |
| 5-4 | | | | | | | | | 40 | 83.8 | 87.3 | 98.0 |
| 5-5 | | | | | | | | | 50 | 85.0 | 86.8 | 98.0 |
| 5-6 | | | | | | | | | 60 | 87.0 | 86.4 | 98.0 |
| 5-7 | | | | | | | | | 80 | 88.2 | 85.0 | 98.0 |
| 5-8 | | | | | | | | | 90 | 89.0 | 84.5 | 98.0 |
| 5-9 | | | | | | | | | 99 | 90.5 | 84.0 | 98.0 |

TABLE 6

| Experimental example | Core portion Composition | x | Coating portion Composition | y | Electrically conductive portion | Fibrous carbon portion | | | Average thickness (nm) | Cycle maintenance factor (%) | Initial efficiency (%) | Load maintenance factor (%) |
| | | | | | | Average length (nm) | Average diameter (nm) | Proportion of C (wt %) | | | | |
| --- | --- | --- | --- | --- | --- | --- | --- | --- | --- | --- | --- | --- |
| 6-1 | $SiO_x$ | 0.1 | $SiO_y$ | 1.2 | Fe | 5000 | 200 | 8 | 1 | 79.0 | 84.5 | 98.0 |
| 6-2 | | | | | | | | | 10 | 81.0 | 84.0 | 98.0 |
| 6-3 | | | | | | | | | 100 | 85.0 | 83.8 | 98.0 |
| 6-4 | | | | | | | | | 500 | 88.5 | 83.4 | 98.0 |
| 6-5 | | | | | | | | | 1000 | 89.0 | 82.5 | 98.0 |
| 6-6 | | | | | | | | | 2000 | 89.2 | 82.0 | 98.0 |
| 6-7 | | | | | | | | | 3000 | 89.3 | 81.5 | 98.0 |
| 6-8 | | | | | | | | | 5000 | 89.5 | 80.7 | 98.0 |
| 6-9 | | | | | | | | | 10000 | 90.0 | 80.2 | 98.0 |
| 6-10 | | | | | | | | | 15000 | 90.1 | 76.5 | 98.0 |

TABLE 7

| Experimental example | Core portion Composition | x | Coating portion Composition | y | Electrically conductive portion | Fibrous carbon portion Average length (nm) | Average diameter (nm) | Proportion of C (wt %) | Proportion of Fe (wt %) | Cycle maintenance factor (%) | Initial efficiency (%) | Load maintenance factor (%) |
|---|---|---|---|---|---|---|---|---|---|---|---|---|
| 7-1 | $SiO_x$ | 0.1 | $SiO_y$ | 1.2 | Fe | 10 | 200 | 8 | 0.005 | 88.0 | 86.5 | 98.0 |
| 7-2 | | | | | | | | | 0.05 | 88.0 | 86.8 | 98.0 |
| 7-3 | | | | | | | | | 0.1 | 88.0 | 87.0 | 98.0 |
| 7-4 | | | | | | | | | 0.5 | 88.0 | 87.3 | 98.0 |

In the case where the coating portion contained Fe, the cycle maintenance factor, the initial efficiency, and the load maintenance factor further increased and, in addition, when the proportion of Fe was 0.005 percent by weight to 0.5 percent by weight, a high cycle maintenance factor, a high initial efficiency, and a high load maintenance factor were obtained.

Experimental Examples 8-1 to 8-126

As shown in Table 8 to Table 13, at least one type of element M1 (Ni or the like) was contained in the coating portion and various characteristics of the secondary battery were examined. In this case, in formation of the coating portion, the proportion of M1 (M1 proportion) was controlled by co-evaporating a metal powder M1 together with a $SiO_y$ powder and, in addition, changing the amount of input of the metal powder.

TABLE 8

| Experimental example | Core portion Composition | x | Coating portion Composition | y | Electrically conductive portion | Fibrous carbon portion Average length (nm) | Average diameter (nm) | Proportion of C (wt %) | Proportion of Fe (wt %) | M1 | Proportion of M1 (at %) | Cycle maintenance factor (%) | Initial efficiency (%) | Load maintenance factor (%) |
|---|---|---|---|---|---|---|---|---|---|---|---|---|---|---|
| 8-1 | $SiO_x$ | 0.1 | $SiO_y$ | 1.2 | Fe | 10 | 200 | 8 | — | Ni | 1 | 88.0 | 87.3 | 98.0 |
| 8-2 | | | | | | | | | | | 5 | 88.1 | 87.5 | 98.0 |
| 8-3 | | | | | | | | | | | 10 | 88.3 | 87.6 | 98.0 |
| 8-4 | | | | | | | | | | | 20 | 88.5 | 87.7 | 98.0 |
| 8-5 | | | | | | | | | | | 30 | 88.7 | 87.7 | 98.0 |
| 8-6 | | | | | | | | | | | 50 | 88.8 | 87.7 | 98.0 |
| 8-7 | | | | | | | | | | | 60 | 88.8 | 87.7 | 98.0 |
| 8-8 | $SiO_x$ | 0.1 | $SiO_y$ | 1.2 | Fe | 10 | 200 | 8 | 0.05 | Ni | 10 | 89.0 | 88.0 | 98.0 |
| 8-9 | $SiO_x$ | 0.1 | $SiO_y$ | 1.2 | Fe | 10 | 200 | 8 | 0.1 | | | 89.1 | 88.2 | 98.0 |
| 8-10 | $SiO_x$ | 0.1 | $SiO_y$ | 1.2 | Fe | 10 | 200 | 8 | — | Al | 1 | 88.0 | 87.3 | 98.0 |
| 8-11 | | | | | | | | | | | 10 | 88.2 | 87.5 | 98.0 |
| 8-12 | | | | | | | | | | | 20 | 88.3 | 87.6 | 98.0 |
| 8-13 | | | | | | | | | | | 50 | 88.4 | 87.7 | 98.0 |
| 8-14 | | | | | | | | | | | 60 | 88.5 | 87.7 | 98.0 |
| 8-15 | $SiO_x$ | 0.1 | $SiO_y$ | 1.2 | Fe | 10 | 200 | 8 | 0.05 | Al | 10 | 88.6 | 88.0 | 96.0 |
| 8-16 | $SiO_x$ | 0.1 | $SiO_y$ | 1.2 | Fe | 10 | 200 | 8 | — | Fe | 10 | 88.3 | 87.6 | 97.0 |
| 8-17 | | | | | | | | | | | 20 | 88.3 | 87.7 | 98.0 |
| 8-18 | | | | | | | | | | | 50 | 88.8 | 87.7 | 98.0 |
| 8-19 | | | | | | | | | | | 60 | 88.6 | 88.0 | 98.0 |
| 8-20 | $SiO_x$ | 0.1 | $SiO_y$ | 1.2 | Fe | 10 | 200 | 8 | — | Cu | 10 | 88.3 | 87.7 | 98.0 |
| 8-21 | | | | | | | | | | | 20 | 88.3 | 87.8 | 98.0 |
| 8-22 | | | | | | | | | | | 50 | 88.5 | 87.9 | 98.0 |
| 8-23 | | | | | | | | | | | 60 | 88.6 | 88.0 | 98.0 |
| 8-24 | $SiO_x$ | 0.1 | $SiO_y$ | 1.2 | Fe | 10 | 200 | 8 | 0.05 | Cu | 10 | 88.7 | 88.3 | 98.0 |

TABLE 9

| Experimental example | Core portion Composition | x | Coating portion Composition | y | Electrically conductive portion | Fibrous carbon portion Average length (nm) | Average diameter (nm) | Proportion of C (wt %) | Proportion of Fe (wt %) | M1 | Proportion of M1 (at %) | Cycle maintenance factor (%) | Initial efficiency (%) | Load maintenance factor (%) |
|---|---|---|---|---|---|---|---|---|---|---|---|---|---|---|
| 8-25 | $SiO_x$ | 0.1 | $SiO_y$ | 1.2 | Fe | 10 | 200 | 8 | — | C | 10 | 88.2 | 87.6 | 98.0 |
| 8-26 | | | | | | | | | | | 20 | 88.3 | 87.8 | 98.0 |
| 8-27 | | | | | | | | | | | 50 | 88.6 | 87.9 | 98.0 |
| 8-28 | | | | | | | | | | | 60 | 88.7 | 88.1 | 98.0 |
| 8-30 | $SiO_x$ | 0.1 | $SiO_y$ | 1.2 | Fe | 10 | 200 | 8 | 0.05 | C | 10 | 88.7 | 88.3 | 98.0 |

TABLE 9-continued

| Experimental example | Core portion Composition | x | Coating portion Composition | y | Electrically conductive portion | Fibrous carbon portion Average length (nm) | Average diameter (nm) | Proportion of C (wt %) | Proportion of Fe (wt %) | M1 | Proportion of M1 (at %) | Cycle maintenance factor (%) | Initial efficiency (%) | Load maintenance factor (%) |
|---|---|---|---|---|---|---|---|---|---|---|---|---|---|---|
| 8-31 | $SiO_x$ | 0.1 | $SiO_y$ | 1.2 | Fe | 10 | 200 | 8 | — | Mg | 10 | 88.3 | 87.7 | 98.0 |
| 8-32 | | | | | | | | | | | 20 | 88.3 | 87.8 | 98.0 |
| 8-33 | | | | | | | | | | | 50 | 88.6 | 87.9 | 98.0 |
| 8-34 | | | | | | | | | | | 60 | 88.7 | 88.1 | 98.0 |
| 8-35 | $SiO_x$ | 0.1 | $SiO_y$ | 1.2 | Fe | 10 | 200 | 8 | 0.05 | Mg | 10 | 88.7 | 88.3 | 98.0 |
| 8-36 | $SiO_x$ | 0.1 | $SiO_y$ | 1.2 | Fe | 10 | 200 | 8 | — | Ca | 10 | 88.3 | 87.7 | 98.0 |
| 8-37 | | | | | | | | | | | 20 | 88.3 | 87.8 | 98.0 |
| 8-38 | | | | | | | | | | | 50 | 88.5 | 87.9 | 98.0 |
| 8-39 | | | | | | | | | | | 60 | 88.6 | 88.0 | 98.0 |
| 8-40 | $SiO_x$ | 0.1 | $SiO_y$ | 1.2 | Fe | 10 | 200 | 8 | 0.05 | Ca | 10 | 88.7 | 88.3 | 98.0 |
| 8-41 | $SiO_x$ | 0.1 | $SiO_y$ | 1.2 | Fe | 10 | 200 | 8 | — | Ti | 10 | 88.3 | 87.6 | 98.0 |
| 8-42 | | | | | | | | | | | 20 | 88.3 | 87.8 | 98.0 |
| 8-43 | | | | | | | | | | | 50 | 88.5 | 87.9 | 98.0 |
| 8-44 | | | | | | | | | | | 60 | 88.6 | 88.0 | 98.0 |
| 8-45 | $SiO_x$ | 0.1 | $SiO_y$ | 1.2 | Fe | 10 | 200 | 8 | 0.05 | Ti | 10 | 88.7 | 88.3 | 98.0 |
| 8-46 | $SiO_x$ | 0.1 | $SiO_y$ | 1.2 | Fe | 10 | 200 | 8 | — | Cr | 10 | 88.3 | 87.7 | 98.0 |
| 8-47 | | | | | | | | | | | 20 | 88.3 | 87.8 | 98.0 |
| 8-48 | | | | | | | | | | | 50 | 88.5 | 87.9 | 98.0 |
| 8-49 | | | | | | | | | | | 60 | 88.6 | 88.0 | 98.0 |
| 8-50 | $SiO_x$ | 0.1 | $SiO_y$ | 1.2 | Fe | 10 | 200 | 8 | 0.05 | Cr | 10 | 88.7 | 88.3 | 98.0 |

TABLE 10

| Experimental example | Core portion Composition | x | Coating portion Composition | y | Electrically conductive portion | Fibrous carbon portion Average length (nm) | Average diameter (nm) | Proportion of C (wt %) | Proportion of Fe (wt %) | M1 | Proportion of M1 (at %) | Cycle maintenance factor (%) | Initial efficiency (%) | Load maintenance factor (%) |
|---|---|---|---|---|---|---|---|---|---|---|---|---|---|---|
| 8-51 | $SiO_x$ | 0.1 | $SiO_y$ | 1.2 | Fe | 10 | 200 | 8 | — | Mn | 10 | 88.3 | 87.7 | 98.0 |
| 8-52 | | | | | | | | | | | 20 | 88.3 | 87.8 | 98.0 |
| 8-53 | | | | | | | | | | | 50 | 88.5 | 87.9 | 98.0 |
| 8-54 | | | | | | | | | | | 60 | 88.6 | 88.0 | 98.0 |
| 8-55 | $SiO_x$ | 0.1 | $SiO_y$ | 1.2 | Fe | 10 | 200 | 8 | 0.05 | Mn | 10 | 88.7 | 88.3 | 98.0 |
| 8-56 | $SiO_x$ | 0.1 | $SiO_y$ | 1.2 | Fe | 10 | 200 | 8 | — | Co | 10 | 88.3 | 87.7 | 98.0 |
| 8-57 | | | | | | | | | | | 20 | 88.3 | 87.8 | 98.0 |
| 8-58 | | | | | | | | | | | 50 | 88.5 | 87.9 | 98.0 |
| 8-59 | | | | | | | | | | | 60 | 88.6 | 88.0 | 98.0 |
| 8-60 | $SiO_x$ | 0.1 | $SiO_y$ | 1.2 | Fe | 10 | 200 | 8 | 0.05 | Cr | 10 | 88.7 | 88.3 | 98.0 |
| 8-61 | $SiO_x$ | 0.1 | $SiO_y$ | 1.2 | Fe | 10 | 200 | 8 | — | Ge | 10 | 88.3 | 87.7 | 98.0 |
| 8-62 | | | | | | | | | | | 20 | 88.3 | 87.8 | 98.0 |
| 8-63 | | | | | | | | | | | 50 | 88.6 | 87.9 | 98.0 |
| 8-64 | | | | | | | | | | | 60 | 88.7 | 88.1 | 98.0 |
| 8-65 | $SiO_x$ | 0.1 | $SiO_y$ | 1.2 | Fe | 10 | 200 | 8 | 0.05 | Ge | 10 | 88.7 | 88.3 | 98.0 |
| 8-66 | $SiO_x$ | 0.1 | $SiO_y$ | 1.2 | Fe | 10 | 200 | 8 | — | Zr | 10 | 88.2 | 87.6 | 98.0 |
| 8-67 | | | | | | | | | | | 20 | 88.2 | 87.7 | 98.0 |
| 8-68 | | | | | | | | | | | 50 | 88.5 | 87.8 | 98.0 |
| 8-69 | | | | | | | | | | | 60 | 88.6 | 88.0 | 98.0 |
| 8-70 | $SiO_x$ | 0.1 | $SiO_y$ | 1.2 | Fe | 10 | 200 | 8 | 0.05 | Zr | 10 | 88.6 | 88.2 | 98.0 |
| 8-71 | $SiO_x$ | 0.1 | $SiO_y$ | 1.2 | Fe | 10 | 200 | 8 | — | Mo | 10 | 88.1 | 87.5 | 98.0 |
| 8-72 | | | | | | | | | | | 20 | 88.2 | 87.7 | 98.0 |
| 8-73 | | | | | | | | | | | 50 | 88.4 | 87.8 | 98.0 |
| 8-74 | | | | | | | | | | | 60 | 88.5 | 87.9 | 98.0 |
| 8-75 | $SiO_x$ | 0.1 | $SiO_y$ | 1.2 | Fe | 10 | 200 | 8 | 0.05 | Mo | 10 | 88.6 | 88.2 | 98.0 |

TABLE 11

| Experimental example | Core portion Composition | x | Coating portion Composition | y | Electrically conductive portion | Fibrous carbon portion Average length (nm) | Average diameter (nm) | Proportion of C (wt %) | Proportion of Fe (wt %) | M1 | Proportion of M1 (at %) | Cycle maintenance factor (%) | Initial efficiency (%) | Load maintenance factor (%) |
|---|---|---|---|---|---|---|---|---|---|---|---|---|---|---|
| 8-76 | SiO$_x$ | 0.1 | SiO$_y$ | 1.2 | Fe | 10 | 200 | 8 | — | Ag | 10 | 88.1 | 87.5 | 98.0 |
| 8-77 | | | | | | | | | | | 20 | 88.1 | 87.6 | 98.0 |
| 8-78 | | | | | | | | | | | 50 | 88.3 | 87.7 | 98.0 |
| 8-79 | | | | | | | | | | | 60 | 88.4 | 87.8 | 98.0 |
| 8-80 | SiO$_x$ | 0.1 | SiO$_y$ | 1.2 | Fe | 10 | 200 | 8 | 0.05 | Ag | 10 | 88.5 | 88.1 | 98.0 |
| 8-81 | SiO$_x$ | 0.1 | SiO$_y$ | 1.2 | Fe | 10 | 200 | 8 | — | Sn | 10 | 88.0 | 87.4 | 98.0 |
| 8-82 | | | | | | | | | | | 20 | 88.1 | 87.6 | 98.0 |
| 8-83 | | | | | | | | | | | 50 | 88.3 | 87.7 | 98.0 |
| 8-84 | | | | | | | | | | | 60 | 88.4 | 87.8 | 98.0 |
| 8-85 | SiO$_x$ | 0.1 | SiO$_y$ | 1.2 | Fe | 10 | 200 | 8 | 0.05 | Sn | 10 | 88.5 | 88.1 | 98.0 |
| 8-86 | SiO$_x$ | 0.1 | SiO$_y$ | 1.2 | Fe | 10 | 200 | 8 | — | Ba | 10 | 88.0 | 87.4 | 98.0 |
| 8-87 | | | | | | | | | | | 20 | 88.1 | 87.6 | 98.0 |
| 8-88 | | | | | | | | | | | 50 | 88.3 | 87.7 | 98.0 |
| 8-89 | | | | | | | | | | | 60 | 88.4 | 87.8 | 98.0 |
| 8-90 | SiO$_x$ | 0.1 | SiO$_y$ | 1.2 | Fe | 10 | 200 | 8 | 0.05 | Ba | 10 | 88.5 | 88.1 | 98.0 |
| 8-91 | SiO$_x$ | 0.1 | SiO$_y$ | 1.2 | Fe | 10 | 200 | 8 | — | W | 10 | 88.2 | 87.6 | 98.0 |
| 8-92 | | | | | | | | | | | 20 | 88.2 | 87.7 | 98.0 |
| 8-93 | | | | | | | | | | | 50 | 88.4 | 87.8 | 98.0 |
| 8-94 | | | | | | | | | | | 60 | 88.5 | 87.9 | 98.0 |
| 8-95 | SiO$_x$ | 0.1 | SiO$_y$ | 1.2 | Fe | 10 | 200 | 8 | 0.05 | W | 10 | 88.6 | 88.2 | 98.0 |
| 8-96 | SiO$_x$ | 0.1 | SiO$_y$ | 1.2 | Fe | 10 | 200 | 8 | — | Ta | 10 | 88.2 | 87.6 | 98.0 |
| 8-97 | | | | | | | | | | | 20 | 88.3 | 87.8 | 98.0 |
| 8-98 | | | | | | | | | | | 50 | 88.5 | 87.9 | 98.0 |
| 8-99 | | | | | | | | | | | 60 | 88.6 | 88.0 | 98.0 |
| 8-100 | SiO$_x$ | 0.1 | SiO$_y$ | 1.2 | Fe | 10 | 200 | 8 | 0.05 | Ta | 10 | 88.7 | 88.3 | 98.0 |

TABLE 12

| Experimental example | Core portion Composition | x | Coating portion Composition | y | Electrically conductive portion | Fibrous carbon portion Average length (nm) | Average diameter (nm) | Proportion of C (wt %) | Proportion of Fe (wt %) | M1 | Proportion of M1 (at %) | Cycle maintenance factor (%) | Initial efficiency (%) | Load maintenance factor (%) |
|---|---|---|---|---|---|---|---|---|---|---|---|---|---|---|
| 8-101 | SiO$_x$ | 0.1 | SiO$_y$ | 1.2 | Fe | 10 | 200 | 8 | — | Na | 10 | 88.3 | 87.7 | 98.0 |
| 8-102 | | | | | | | | | | | 20 | 88.3 | 87.8 | 98.0 |
| 8-103 | | | | | | | | | | | 50 | 88.5 | 87.9 | 98.0 |
| 8-104 | | | | | | | | | | | 60 | 88.6 | 88.0 | 98.0 |
| 8-105 | SiO$_x$ | 0.1 | SiO$_y$ | 1.2 | Fe | 10 | 200 | 8 | 0.05 | Na | 10 | 88.7 | 88.3 | 98.0 |
| 8-106 | SiO$_x$ | 0.1 | SiO$_y$ | 1.2 | Fe | 10 | 200 | 8 | — | K | 10 | 88.2 | 87.6 | 98.0 |
| 8-107 | | | | | | | | | | | 20 | 88.2 | 87.7 | 98.0 |
| 8-108 | | | | | | | | | | | 50 | 88.4 | 87.8 | 98.0 |
| 8-109 | | | | | | | | | | | 60 | 88.5 | 87.9 | 98.0 |
| 8-110 | SiO$_x$ | 0.1 | SiO$_y$ | 1.2 | Fe | 10 | 200 | 8 | 0.05 | K | 10 | 88.6 | 88.2 | 98.0 |
| 8-111 | SiO$_x$ | 0.1 | SiO$_y$ | 1.2 | Fe | 10 | 200 | 8 | — | Ni + Sn | 5 + 5 | 88.2 | 87.6 | 98.0 |
| 8-112 | | | | | | | | | | | 10 + 10 | 88.2 | 87.7 | 98.0 |
| 8-113 | | | | | | | | | | | 25 + 25 | 88.5 | 87.8 | 98.0 |
| 8-114 | | | | | | | | | | | 30 + 30 | 88.6 | 88.0 | 98.0 |
| 8-115 | SiO$_x$ | 0.1 | SiO$_y$ | 1.2 | Fe | 10 | 200 | 8 | 0.05 | Ni + Sn | 5 + 5 | 88.6 | 88.2 | 98.0 |
| 8-116 | SiO$_x$ | 0.1 | SiO$_y$ | 1.2 | Fe | 10 | 200 | 8 | — | Ni + Li | 5 + 5 | 88.5 | 88.5 | 98.0 |
| 8-117 | | | | | | | | | | | 10 + 5 | 88.7 | 88.7 | 98.0 |
| 8-118 | | | | | | | | | | | 25 + 10 | 88.8 | 89.0 | 98.0 |
| 8-119 | | | | | | | | | | | 30 + 10 | 89.0 | 89.6 | 98.0 |
| 8-120 | SiO$_x$ | 0.1 | SiO$_y$ | 1.2 | Fe | 10 | 200 | 8 | 0.05 | Ni + Li | 5 + 5 | 90.1 | 89.1 | 98.0 |

TABLE 13

| Experimental example | Core portion Composition | x | Coating portion Composition | y | Electrically conductive portion | Fibrous carbon portion Average length (nm) | Average diameter (nm) | Proportion of C (wt %) | Proportion of Fe (wt %) | M1 | Proportion of M1 (at %) | Cycle maintenance factor (%) | Initial efficiency (%) | Load maintenance factor (%) |
|---|---|---|---|---|---|---|---|---|---|---|---|---|---|---|
| 8-121 | $SiO_x$ | 0.1 | $SiO_y$ | 1.2 | Fe | 10 | 200 | 8 | — | Li | 1 | 88.1 | 88.3 | 98.0 |
| 8-122 | | | | | | | | | | | 5 | 88.6 | 88.8 | 98.0 |
| 8-123 | | | | | | | | | | | 10 | 88.6 | 89.1 | 98.0 |
| 8-124 | | | | | | | | | | | 20 | 88.9 | 89.3 | 98.0 |
| 8-125 | | | | | | | | | | | 40 | 89.1 | 90.0 | 98.0 |
| 8-126 | $SiO_x$ | 0.1 | $SiO_y$ | 1.2 | Fe | 10 | 200 | 8 | 0.05 | Li | 10 | 90.3 | 89.5 | 98.0 |

In the case where the coating portion contained M1 (Ni or the like), the cycle maintenance factor, the initial efficiency, and the load maintenance factor further increased. In this case, when the proportion of M1 was 20 atomic percent or less, reduction in battery capacity was suppressed. In addition, when the coating portion contained M1 together with Fe, the cycle maintenance factor, the initial efficiency, and the load maintenance factor still further increased.

Experimental Examples 9-1 to 9-6

As shown in Table 14, the layered structure and the state of the coating portion were changed and various characteristics of the secondary battery were examined. In this case, the coating portion was made to be multilayer by performing the formation process in two steps and, in addition, the state in the coating portion was controlled by adjusting the base temperature in formation of the coating portion. The term "SiNiO+Ni" or "$SiO_y$+Ni" represents that a compound of Si (SiNiO or $SiO_y$) is formed in the coating portion and, in addition, isolated (simple substance) Ni is present.

increased. This tendency was obtained likewise in the case where the coating portion contained M1 (Ni). When the compound (SiNiO) was formed in the coating portion, more favorable results were obtained.

Experimental Examples 10-1 to 10-11

As shown in Table 15, the composition (atomic ratio x) and the type of the core portion were changed and various characteristics of the secondary battery were examined. In this case, the atomic ratio x was controlled by adjusting the amount of introduction of oxygen in melt-solidification of the raw material (Si).

TABLE 14

| Experimental example | Core portion Composition | x | Coating portion Composition | y | Electrically conductive portion | Fibrous carbon portion Average length (nm) | Average diameter (nm) | Proportion of C (wt %) | M1 | Proportion of M1 (at %) | Layer structure | State | Cycle maintenance factor (%) | Initial efficiency (%) | Load maintenance factor (%) |
|---|---|---|---|---|---|---|---|---|---|---|---|---|---|---|---|
| 9-1 | $SiO_x$ | 0.1 | $SiO_y$ | 1.2 | Fe | 10 | 200 | 8 | — | — | none | — | 88.0 | 86.0 | 98.0 |
| 9-2 | | | | | | | | | | | multilayer | — | 88.2 | 86.5 | 98.0 |
| 9-3 | $SiO_x$ | 0.1 | $SiO_y$ | 1.2 | Fe | 10 | 200 | 8 | Ni | 10 | none | SiNiO + Ni | 88.2 | 86.3 | 98.0 |
| 9-4 | | | | | | | | | | | none | $SiO_y$ + Ni | 88.3 | 86.4 | 98.0 |
| 9-5 | | | | | | | | | | | multilayer | SiNiO + Ni | 88.1 | 86.2 | 98.0 |
| 9-6 | | | | | | | | | | | multilayer | SiNiO + Ni/ $SiO_y$ + Ni | 88.3 | 86.1 | 98.0 |

In the case where the coating portion was multilayer, the cycle maintenance factor and the initial efficiency further

TABLE 15

| Experimental example | Core portion Composition | x | Coating portion Composition | y | Electrically conductive portion | Fibrous carbon portion Average length (nm) | Average diameter (nm) | Proportion of C (wt %) | Cycle maintenance factor (%) | Initial efficiency (%) | Load maintenance factor (%) |
|---|---|---|---|---|---|---|---|---|---|---|---|
| 10-1 | $SiO_x$ | 0 | $SiO_y$ | 1.2 | Fe | 10 | 200 | 8 | 85.0 | 87.0 | 98.0 |
| 10-2 | | 0.05 | | | | | | | 86.0 | 86.5 | 98.0 |
| 10-3 | | 0.3 | | | | | | | 88.1 | 84.5 | 98.0 |
| 10-4 | | 0.5 | | | | | | | 88.3 | 84.2 | 98.0 |
| 10-5 | | 0.7 | | | | | | | 88.5 | 82.9 | 98.0 |

TABLE 15-continued

| Experimental example | Core portion Composition | x | Coating portion Composition | y | Electrically conductive portion | Fibrous carbon portion Average length (nm) | Average diameter (nm) | Proportion of C (wt %) | Cycle maintenance factor (%) | Initial efficiency (%) | Load maintenance factor (%) |
|---|---|---|---|---|---|---|---|---|---|---|---|
| 10-6 | $SiO_x$ | 1.2 | — | — | — | — | — | — | 81.0 | 68.0 | 95.0 |
| 10-7 | | | — | — | Fe | 200 | 200 | 8 | 82.0 | 69.0 | 96.0 |
| 10-8 | | | — | — | Fe | 500 | 200 | 8 | 82.0 | 69.0 | 96.0 |
| 10-9 | SnCo | | $SiO_y$ | 1.2 | Fe | 10 | 200 | 8 | 85.0 | 84.0 | 98.0 |
| 10-10 | SnCoTi | | | | | | | | 85.2 | 84.2 | 98.0 |
| 10-11 | SnFeCo | | | | | | | | 85.4 | 84.3 | 98.0 |

Even in the case where the composition (atomic ratio x) and the type of the core portion were changed, a high cycle maintenance factor and a high initial efficiency were obtained. In this case, when the atomic ratio x satisfied $0 \leq x < 0.5$, the cycle maintenance factor and the initial efficiency further increased.

Experimental Examples 11-1 to 11-20

As shown in Table 16, M2 (Al or the like) was contained in the core portion and various characteristics of the secondary battery were examined. In this case, the core portion was obtained by a gas atomizing method through the use of a $SiO_x$ powder and a metal powder M2 as the raw materials and, in addition, the proportion of M2 (M2 proportion) was controlled by changing the amount of input of the metal powder.

In the case where M2 (Al or the like) was contained in the core portion, the cycle maintenance factor and the initial efficiency further increased. In this case, when the proportion of M2 was 0.01 atomic percent to 50 atomic percent, reduction in battery capacity was suppressed.

Experimental Examples 12-1 to 12-63

As shown in Table 17 to Table 19, M3 (Cr or the like) or M4 (B or the like) was contained in the core portion and various characteristics of the secondary battery were examined. In this case, the core portion was obtained by a gas atomizing method through the use of a $SiO_x$ powder and a metal powder M3 (Cr or the like) or the like as the raw materials and, in addition, the proportion of M3 or M4 was controlled by changing the amount of input of the metal powder.

TABLE 16

| Experimental example | Core portion Composition | x | M2 | Proportion of M2 (at %) | Coating portion Composition | y | Electrically conductive portion | Fibrous carbon portion Average length (nm) | Average diameter (nm) | Proportion of C (wt %) | Proportion of Fe (at %) | M1 | Proportion of M1 (at %) | Cycle maintenance factor (%) | Initial efficiency (%) | Load maintenance factor (%) |
|---|---|---|---|---|---|---|---|---|---|---|---|---|---|---|---|---|
| 11-1 | $SiO_x$ | 0.1 | Al | 0.01 | $SiO_y$ | 1.2 | Fe | 10 | 200 | 8 | — | — | — | 88.2 | 86.0 | 98.0 |
| 11-2 | | | | 0.1 | | | | | | | | | | 88.4 | 86.2 | 98.0 |
| 11-3 | | | | 1 | | | | | | | | | | 88.6 | 86.2 | 98.0 |
| 11-4 | | | | 10 | | | | | | | | | | 88.6 | 86.4 | 98.0 |
| 11-5 | | | | 30 | | | | | | | | | | 88.7 | 86.6 | 98.0 |
| 11-6 | | | | 50 | | | | | | | | | | 88.9 | 86.7 | 98.0 |
| 11-7 | | | | 60 | | | | | | | | | | 90.0 | 86.9 | 98.0 |
| 11-8 | $SiO_x$ | 0.1 | Al | 1 | $SiO_y$ | 1.2 | Fe | 10 | 200 | 8 | — | Ni | 10 | 90.1 | 87.0 | 98.0 |
| 11-9 | | | | 10 | | | | | | | | | | 90.2 | 87.0 | 98.0 |
| 11-10 | $SiO_x$ | 0.1 | Al | 10 | $SiO_y$ | 1.2 | Fe | 10 | 200 | 8 | 0.05 | Ni | 10 | 90.5 | 87.6 | 98.0 |
| 11-11 | $SiO_x$ | 0.1 | Fe | 0.01 | $SiO_y$ | 1.2 | Fe | 10 | 200 | 8 | — | — | — | 88.4 | 86.2 | 98.0 |
| 11-12 | | | | 0.1 | | | | | | | | | | 88.5 | 86.3 | 98.0 |
| 11-13 | | | | 1 | | | | | | | | | | 88.6 | 86.4 | 98.0 |
| 11-14 | | | | 10 | | | | | | | | | | 88.8 | 86.4 | 98.0 |
| 11-15 | | | | 30 | | | | | | | | | | 88.8 | 86.6 | 98.0 |
| 11-16 | | | | 50 | | | | | | | | | | 88.9 | 86.8 | 98.0 |
| 11-17 | | | | 60 | | | | | | | | | | 89.1 | 86.9 | 98.0 |
| 11-18 | $SiO_x$ | 0.1 | Al | 1 | $SiO_y$ | 1.2 | Fe | 10 | 200 | 8 | — | Ni | 10 | 90.2 | 87.1 | 98.0 |
| 11-19 | | | | 10 | | | | | | | | | | 90.3 | 87.2 | 98.0 |
| 11-20 | $SiO_x$ | 0.1 | Al | 10 | $SiO_y$ | 1.2 | Fe | 10 | 200 | 8 | 0.05 | Ni | 10 | 90.7 | 87.8 | 98.0 |

TABLE 17

| Experimental example | Core portion (M3, M4) | Coating portion Composition | y | Electrically conductive portion | Fibrous carbon portion Average length (nm) | Average diameter (nm) | Proportion of C (wt %) | Cycle maintenance factor (%) | Initial efficiency (%) | Load maintenance factor (%) |
|---|---|---|---|---|---|---|---|---|---|---|
| 12-1 | $Si_{50}Al_{49}Cr_1$ | $SiO_y$ | 1.2 | Fe | 10 | 200 | 8 | 88.5 | 86.5 | 98.0 |
| 12-2 | $Si_{50}Al_{49}Ni_1$ | | | | | | | 88.4 | 86.4 | 98.0 |
| 12-3 | $Si_{50}Al_{49}Fe_1$ | | | | | | | 88.6 | 86.2 | 98.0 |
| 12-4 | $Si_{40}Al_{41}Cr_{19}$ | | | | | | | 88.7 | 86.2 | 98.0 |
| 12-5 | $Si_{40}Al_{41}Ni_{19}$ | | | | | | | 88.6 | 86.3 | 98.0 |
| 12-6 | $Si_{40}Al_{41}Fe_{19}$ | | | | | | | 88.8 | 86.2 | 98.0 |
| 12-7 | $Si_{35}Al_{46}Cr_{19}$ | | | | | | | 88.7 | 86.2 | 98.0 |
| 12-8 | $Si_{35}Al_{46}Ni_{19}$ | | | | | | | 88.6 | 86.2 | 98.0 |
| 12-9 | $Si_{35}Al_{46}Fe_{19}$ | | | | | | | 88.6 | 86.1 | 98.0 |
| 12-10 | $Si_{30}Al_{20}Cr_{50}$ | | | | | | | 88.5 | 86.1 | 98.0 |
| 12-11 | $Si_{30}Al_{20}Ni_{50}$ | | | | | | | 88.8 | 86.0 | 98.0 |
| 12-12 | $Si_{30}Al_{20}Fe_{50}$ | | | | | | | 88.6 | 86.2 | 98.0 |
| 12-13 | $Si_{30}Al_{21}Cr_{56}$ | | | | | | | 88.5 | 86.3 | 98.0 |
| 12-14 | $Si_{30}Al_{21}Ni_{56}$ | | | | | | | 88.4 | 86.2 | 98.0 |
| 12-15 | $Si_{30}Al_{21}Fe_{56}$ | | | | | | | 88.6 | 86.2 | 98.0 |
| 12-16 | $Si_{30}Al_{47.5}Cr_{22.49}Cu_{0.01}$ | | | | | | | 88.7 | 86.2 | 98.0 |
| 12-17 | $Si_{30}Al_{47.5}Ni_{22.49}Cu_{0.01}$ | | | | | | | 88.6 | 86.4 | 98.0 |
| 12-18 | $Si_{30}Al_{47.5}Fe_{22.49}Cu_{0.01}$ | | | | | | | 88.8 | 86.2 | 98.0 |
| 12-19 | $Si_{30}Al_{47.5}Cr_{12.5}Cu_{10}$ | | | | | | | 88.7 | 86.2 | 98.0 |
| 12-20 | $Si_{30}Al_{47.5}Ni_{12.5}Cu_{10}$ | | | | | | | 88.6 | 86.3 | 98.0 |
| 12-21 | $Si_{30}Al_{47.5}Fe_{12.5}Cu_{10}$ | | | | | | | 88.6 | 86.2 | 98.0 |
| 12-22 | $Si_{30}Al_{25}Cr_{25}Cu_{20}$ | | | | | | | 88.6 | 86.2 | 98.0 |
| 12-23 | $Si_{30}Al_{25}Ni_{25}Cu_{20}$ | | | | | | | 88.5 | 86.2 | 98.0 |
| 12-24 | $Si_{30}Al_{25}Fe_{25}Cu_{20}$ | | | | | | | 88.8 | 86.1 | 98.0 |
| 12-25 | $Si_{30}Al_{20}Cr_{30}Cu_{20}$ | | | | | | | 88.6 | 86.1 | 98.0 |
| 12-26 | $Si_{30}Al_{20}Ni_{30}Cu_{20}$ | | | | | | | 88.5 | 86.0 | 98.0 |
| 12-27 | $Si_{30}Al_{20}Fe_{30}Cu_{20}$ | | | | | | | 88.4 | 86.2 | 98.0 |

TABLE 18

| Experimental example | Core portion (M3, M4) | Coating portion Composition | y | Electrically conductive portion | Fibrous carbon portion Average length (nm) | Average diameter (nm) | Proportion of C (wt %) | Cycle maintenance factor (%) | Initial efficiency (%) | Load maintenance factor (%) |
|---|---|---|---|---|---|---|---|---|---|---|
| 12-28 | $Si_{30}Al_{27.5}Cr_{12.5}Cu_{30}$ | $SiO_y$ | 1.2 | Fe | 10 | 200 | 8 | 88.6 | 86.2 | 98.0 |
| 12-29 | $Si_{30}Al_{27.5}Ni_{12.5}Cu_{30}$ | | | | | | | 88.7 | 86.1 | 98.0 |
| 12-30 | $Si_{30}Al_{27.5}Fe_{12.5}Cu_{30}$ | | | | | | | 88.6 | 86.1 | 98.0 |
| 12-31 | $Si_{30}Al_{20}Cr_{12.5}Cu_{37.5}$ | | | | | | | 88.7 | 86.0 | 98.0 |
| 12-32 | $Si_{30}Al_{20}Ni_{12.5}Cu_{37.5}$ | | | | | | | 88.6 | 86.2 | 98.0 |
| 12-33 | $Si_{30}Al_{20}Fe_{12.5}Cu_{37.5}$ | | | | | | | 88.8 | 86.3 | 98.0 |
| 12-34 | $Si_{30}Al_{47.5}Cr_{12.5}B_{10}$ | | | | | | | 88.7 | 86.2 | 98.0 |
| 12-35 | $Si_{30}Al_{47.5}Cr_{12.5}Mg_{10}$ | | | | | | | 88.6 | 86.2 | 98.0 |
| 12-36 | $Si_{30}Al_{47.5}Cr_{12.5}Ca_{10}$ | | | | | | | 88.6 | 86.2 | 98.0 |
| 12-37 | $Si_{30}Al_{47.5}Cr_{12.5}Ti_{10}$ | | | | | | | 88.6 | 86.4 | 98.0 |
| 12-38 | $Si_{30}Al_{47.5}Cr_{12.5}V_{10}$ | | | | | | | 88.8 | 86.2 | 98.0 |
| 12-39 | $Si_{30}Al_{47.5}Cr_{12.5}Mn_{10}$ | | | | | | | 88.6 | 86.2 | 98.0 |
| 12-40 | $Si_{30}Al_{47.5}Cr_{12.5}Co_{10}$ | | | | | | | 88.5 | 86.3 | 98.0 |
| 12-41 | $Si_{30}Al_{47.5}Cr_{12.5}Ge_{10}$ | | | | | | | 88.4 | 86.2 | 98.0 |
| 12-42 | $Si_{30}Al_{47.5}Cr_{12.5}Y_{10}$ | | | | | | | 88.6 | 86.2 | 98.0 |
| 12-43 | $Si_{30}Al_{47.5}Cr_{12.5}Zr_{10}$ | | | | | | | 88.7 | 86.1 | 98.0 |
| 12-44 | $Si_{30}Al_{47.5}Cr_{12.5}Mo_{10}$ | | | | | | | 88.6 | 86.1 | 98.0 |
| 12-45 | $Si_{30}Al_{47.5}Cr_{12.5}Ag_{10}$ | | | | | | | 88.7 | 86.0 | 98.0 |
| 12-46 | $Si_{30}Al_{47.5}Cr_{12.5}In_{10}$ | | | | | | | 88.8 | 86.2 | 98.0 |
| 12-47 | $Si_{30}Al_{47.5}Cr_{12.5}Sn_{10}$ | | | | | | | 88.7 | 86.2 | 98.0 |
| 12-48 | $Si_{30}Al_{47.5}Cr_{12.5}Sb_{10}$ | | | | | | | 88.6 | 86.1 | 98.0 |
| 12-49 | $Si_{30}Al_{47.5}Cr_{12.5}Ta_{10}$ | | | | | | | 88.6 | 86.1 | 98.0 |
| 12-50 | $Si_{30}Al_{47.5}Cr_{12.5}W_{10}$ | | | | | | | 88.6 | 86.0 | 98.0 |
| 12-51 | $Si_{30}Al_{47.5}Cr_{12.5}Pb_{10}$ | | | | | | | 88.8 | 86.2 | 98.0 |
| 12-52 | $Si_{30}Al_{47.5}Cr_{12.5}La_{10}$ | | | | | | | 88.6 | 86.2 | 98.0 |
| 12-53 | $Si_{30}Al_{47.5}Cr_{12.5}Ce_{10}$ | | | | | | | 88.5 | 86.2 | 98.0 |
| 12-54 | $Si_{30}Al_{47.5}Cr_{12.5}Pr_{10}$ | | | | | | | 88.8 | 86.4 | 98.0 |

TABLE 19

| Experimental example | Core portion (M3, M4) | Coating portion Composition | y | Electrically conductive portion | Fibrous carbon portion Average length (nm) | Average diameter (nm) | Proportion of C (wt %) | Cycle maintenance factor (%) | Initial efficiency (%) | Load maintenance factor (%) |
|---|---|---|---|---|---|---|---|---|---|---|
| 12-55 | $Si_{30}Al_{47.5}Cr_{12.5}Nd_{10}$ | $SiO_y$ | 1.2 | Fe | 10 | 200 | 8 | 88.6 | 86.2 | 98.0 |
| 12-56 | $Si_{10}Al_{47.5}Cr_{12.5}Cu_{30}$ | | | | | | | 88.8 | 86.2 | 98.0 |
| 12-57 | $Si_{20}Al_{47.5}Cr_{7.5}Cu_5$ | | | | | | | 88.6 | 86.3 | 98.0 |
| 12-58 | $Si_{80}Al_{10}Cr_5Cu_5$ | | | | | | | 88.5 | 86.2 | 98.0 |
| 12-59 | $Si_{85}Al_5Cr_5Cu_5$ | | | | | | | 88.4 | 86.0 | 98.0 |
| 12-60 | $Si_{30}Al_{47.5}Cr_{12.5}Cu_{10}$ | | | | | | | 88.6 | 86.0 | 98.0 |
| 12-61 | $Si_{30}Al_{47.5}Cr_{12.5}Cu_{10}$ | | | | | | | 88.7 | 86.2 | 98.0 |
| 12-62 | $Si_{30}Al_{47.5}Cr_{12.5}Cu_{10}$ | | | | | | | 88.6 | 86.2 | 98.0 |
| 12-63 | $Si_{30}Al_{47.5}Cr_{12.5}Cu_{10}$ | | | | | | | 88.7 | 86.1 | 98.0 |

In the case where M3 or M4 was contained in the core portion, the cycle maintenance factor and the initial efficiency further increased. In this case, when the proportion of M3 was 1 atomic percent to 50 atomic percent or the proportion of M4 was 0.01 atomic percent to 30 atomic percent, reduction in battery capacity was suppressed.

Experimental Examples 13-1 to 13-6

As shown in Table 20, the median diameter of the core portion was changed and various characteristics of the secondary battery were examined. In this case, core portions having desired median diameters were selected appropriately from the core portions obtained by the atomizing method.

TABLE 20

| Experimental example | Core portion Composition | x | Median diameter (μm) | Coating portion Composition | y | Electrically conductive portion | Fibrous carbon portion Average length (nm) | Average diameter (nm) | Proportion of C (wt %) | Cycle maintenance factor (%) | Initial efficiency (%) | Load maintenance factor (%) |
|---|---|---|---|---|---|---|---|---|---|---|---|---|
| 13-1 | $SiO_x$ | 0.1 | 0.1 | $SiO_y$ | 1.2 | Fe | 10 | 200 | 8 | 88.6 | 81.2 | 98.0 |
| 13-2 | | | 0.3 | | | | | | | 89.0 | 83.5 | 98.0 |
| 13-3 | | | 1 | | | | | | | 89.3 | 85.3 | 98.0 |
| 13-4 | | | 10 | | | | | | | 88.0 | 87.5 | 98.0 |
| 13-5 | | | 20 | | | | | | | 87.0 | 86.0 | 98.0 |
| 13-6 | | | 30 | | | | | | | 76.0 | 79.0 | 98.0 |

In the case where the median diameter was 0.3 μm to 20 μm, the cycle maintenance factor and the initial efficiency further increased.

Experimental Examples 14-1 to 14-8

As shown in Table 21, the additional electrically conductive portion (C: graphite) was formed on the surface of the coating portion and various characteristics of the secondary battery were examined. In this case, the electrically conductive portion was formed in the same procedure as that for formation of the coating portion. The average thickness and the average coverage of the additional electrically conductive portion are as shown in Table 21.

TABLE 21

| Experimental example | Core portion Composition | x | Coating portion Composition | y | Electrically conductive portion | Fibrous carbon portion Average length (nm) | Average diameter (nm) | Proportion of C (wt %) | Low-resistance layer Type | Average thickness (nm) | Average coverage (%) | Cycle maintenance factor (%) | Initial efficiency (%) | Load maintenance factor (%) |
|---|---|---|---|---|---|---|---|---|---|---|---|---|---|---|
| 14-1 | $SiO_x$ | 0.1 | $SiO_y$ | 1.2 | Fe | 10 | 200 | 8 | C | 100 | 5 | 88.2 | 86.1 | 98.0 |
| 14-2 | | | | | | | | | | | 10 | 88.4 | 86.2 | 98.0 |
| 14-3 | | | | | | | | | | | 15 | 88.6 | 86.4 | 98.0 |
| 14-4 | | | | | | | | | | | 30 | 88.7 | 86.6 | 98.0 |
| 14-5 | | | | | | | | | | | 50 | 88.9 | 86.8 | 98.0 |

TABLE 21-continued

| | | | Fibrous carbon portion | | | | Low-resistance layer | | Cycle | Initial | Load |
| --- | --- | --- | --- | --- | --- | --- | --- | --- | --- | --- | --- |
| | Core portion | Coating portion | Electrically | Average | Average | Proportion | | Average | maintenance | effi- | maintenance |
| Experimental example | Composition x | Composition y | conductive portion | length (nm) | diameter (nm) | of C (wt %) | Type | thickness (nm) | coverage (%) | factor (%) | ciency (%) | factor (%) |
| 14-6 | | | | | | | | | 70 | 89.0 | 87.1 | 98.0 |
| 14-7 | | | | | | | | | 90 | 90.2 | 87.2 | 98.0 |
| 14-8 | | | | | | | | | 99 | 90.7 | 87.3 | 98.0 |

In the case where the additional electrically conductive portion was formed, the cycle maintenance factor and the initial efficiency further increased.

Experimental Examples 15-1 to 15-21

As shown in Table 22, the type of the negative electrode binder was changed and various characteristics of the secondary battery were examined. In this case, as for the negative electrode binder, polyimide (PI), polyvinylidene fluoride (PVDF), polyamide (PA), polyacrylic acid (PAA), lithium polyacrylate (PAAL), or carbonized polyimide (carbonized PI) was used. In this regard, in the case where PAA or PAAL was used, a negative electrode mix slurry was prepared by using a 17 percent by volume aqueous solution in which PAA or PAAL was dissolved and, in addition, the negative electrode active material layer 54B was formed without firing after hot press.

TABLE 22

| | | | Fibrous carbon portion | | | | | | | Cycle | Initial | Load |
| --- | --- | --- | --- | --- | --- | --- | --- | --- | --- | --- | --- | --- |
| | Core portion | | Coating portion | | Electrically | Average | Average | Proportion | | Proportion | | maintenance | effi- | maintenance |
| Experimental example | Composition | x | Composition | y | conductive portion | length (nm) | diameter (nm) | of C (wt %) | M1 | of M1 (at %) | Negative electrode binder | factor (%) | ciency (%) | factor (%) |
| 15-1 | $SiO_x$ | 0.1 | $SiO_y$ | 1.2 | Fe | 10 | 200 | 8 | Ni | 10 | PI | 87.1 | 85.1 | 98.0 |
| 15-2 | | | | | | | | | | 20 | | 87.6 | 86.8 | 98.0 |
| 15-3 | | | | | | | | | | 50 | | 87.9 | 86.8 | 98.0 |
| 15-4 | $SiO_x$ | 0.1 | $SiO_y$ | 1.2 | Fe | 10 | 200 | 8 | Ni | 10 | PVDF | 86.2 | 84.2 | 98.0 |
| 15-5 | | | | | | | | | | 20 | | 86.7 | 86.0 | 98.0 |
| 15-6 | | | | | | | | | | 50 | | 87.0 | 86.0 | 98.0 |
| 15-7 | $SiO_x$ | 0.1 | $SiO_y$ | 1.2 | Fe | 10 | 200 | 8 | Ni | 10 | PA | 86.2 | 84.3 | 98.0 |
| 15-8 | | | | | | | | | | 20 | | 86.7 | 86.1 | 98.0 |
| 15-9 | | | | | | | | | | 50 | | 87.0 | 86.1 | 98.0 |
| 15-10 | $SiO_x$ | 0.1 | $SiO_y$ | 1.2 | Fe | 10 | 200 | 8 | Ni | 10 | PAA | 86.2 | 84.2 | 98.0 |
| 15-11 | | | | | | | | | | 20 | | 86.7 | 86.0 | 98.0 |
| 15-12 | | | | | | | | | | 50 | | 87.0 | 86.0 | 98.0 |
| 15-13 | $SiO_x$ | 0.1 | $SiO_y$ | 1.2 | Fe | 10 | 200 | 8 | Ni | 10 | PAAL | 86.7 | 84.7 | 98.0 |
| 15-14 | | | | | | | | | | 20 | | 87.2 | 86.4 | 98.0 |
| 15-15 | | | | | | | | | | 50 | | 87.5 | 86.4 | 98.0 |
| 15-16 | $SiO_x$ | 0.1 | $SiO_y$ | 1.2 | Fe | 10 | 200 | 8 | Ni | 10 | carbonized PI | 86.9 | 84.9 | 98.0 |
| 15-17 | | | | | | | | | | 20 | | 87.4 | 86.6 | 98.0 |
| 15-18 | | | | | | | | | | 50 | | 87.7 | 86.6 | 98.0 |
| 15-19 | $SiO_x$ | 0.1 | $SiO_y$ | 1.2 | — | — | — | — | Ni | 10 | PI | 64.0 | 42.0 | 75.0 |
| 15-20 | | | | | | | | | | 20 | PVDF | 63.4 | 41.6 | 75.0 |
| 15-21 | | | | | | | | | | 50 | PAAL | 63.5 | 41.8 | 74.0 |

Even when the type of the negative electrode binder was changed, a high cycle maintenance factor, a high initial efficiency, and a high load maintenance factor were obtained.

Experimental Examples 16-1 to 16-12

As shown in Table 23, the type of the positive electrode binder was changed and various characteristics of the secondary battery were examined.

TABLE 23

| Experimental example | Core portion Composition | x | Coating portion Composition | y | Electrically conductive portion | Fibrous carbon portion Average length (nm) | Fibrous carbon portion Average diameter (nm) | Proportion of C (wt %) | Positive electrode active material | Cycle maintenance factor (%) | Initial efficiency (%) | Load maintenance factor (%) |
|---|---|---|---|---|---|---|---|---|---|---|---|---|
| 16-1 | $SiO_x$ | 0.1 | $SiO_y$ | 1.2 | Fe | 10 | 200 | 8 | $LiNi_{0.70}Co_{0.25}Al_{0.05}O$ | 88.1 | 86.5 | 98.0 |
| 16-2 | | | | | | | | | $LiNi_{0.79}Co_{0.14}Al_{0.07}O$ | 88.0 | 86.6 | 98.0 |
| 16-3 | | | | | | | | | $LiNi_{0.70}Co_{0.25}Mg_{0.05}O$ | 88.2 | 86.7 | 98.0 |
| 16-4 | | | | | | | | | $LiNi_{0.70}Co_{0.25}Fe_{0.05}O$ | 88.1 | 86.6 | 98.0 |
| 16-5 | | | | | | | | | $LiNiO_2$ | 88.1 | 86.7 | 98.0 |
| 16-6 | | | | | | | | | $LiNi_{0.33}Co_{0.33}Mn_{0.33}O_2$ | 88.2 | 86.6 | 98.0 |
| 16-7 | | | | | | | | | $LiNi_{0.13}Co_{0.60}Mn_{0.27}O_2$ | 88.1 | 86.7 | 98.0 |
| 16-8 | | | | | | | | | $Li_{1.13}[Ni_{0.22}Co_{0.18}Mn_{0.60}]_{0.87}O_2$ | 88.2 | 86.5 | 98.0 |
| 16-9 | | | | | | | | | $Li_{1.13}[Ni_{0.20}Co_{0.20}Mn_{0.60}]_{0.87}O_2$ | 88.0 | 86.6 | 98.0 |
| 16-10 | | | | | | | | | $Li_{1.13}[Ni_{0.18}Co_{0.22}Mn_{0.60}]_{0.87}O_2$ | 88.2 | 86.6 | 98.0 |
| 16-11 | | | | | | | | | $Li_{1.13}[Ni_{0.25}Co_{0.25}Mn_{0.50}]_{0.87}O_2$ | 88.2 | 86.5 | 98.0 |
| 16-12 | | | | | | | | | $Li_2Ni_{0.40}Cu_{0.60}O_2$ | 88.1 | 86.7 | 98.0 |

Even when the type of the positive electrode binder was changed, a high cycle maintenance factor, a high initial efficiency, and a high load maintenance factor were obtained.

As is clear from the results shown in Table 1 to Table 23, in the case where the negative electrode active material includes the core portion, the coating portion, and the fibrous carbon portion and the atomic ratio y of the coating portion containing Si and O as constituent elements satisfies $0.5 \leq y \leq 1.8$, high cycle characteristics, high initial charge and discharge characteristics, and high load characteristics are obtained.

Up to this point, the present disclosure have been explained with reference to the embodiments and the examples. However, the present disclosure is not limited to those described above, and various modifications can be made. For example, the case where the capacity of the negative electrode is represented by occlusion and release of lithium ions has been explained, although not limited to this. The present disclosure can also be applied to the case where the capacity of the negative electrode includes the capacity on the basis of occlusion and release of lithium ions and the capacity on the basis of deposition and dissolution of the Li metal and is represented by the sum of those capacities. In this case, a negative electrode material capable of occluding and releasing lithium ions is used as the negative electrode active material and, in addition, the chargeable capacity of the negative electrode material is specified to be smaller than the discharge capacity of the positive electrode.

Furthermore, the case where the battery structure is a prism type, a cylinder type, or a laminate film type and, in addition, the battery element has a rolling structure has been explained, although not limited to this. The present disclosure can also be applied to the case where the battery structure is a prism type, a button type, or the like, or the case where the battery element has a layered structure or the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A lithium ion secondary battery comprising:
 a positive electrode;
 a negative electrode containing an active material; and
 an electrolytic solution,
 wherein the active material includes:
  a core portion capable of occluding and releasing lithium ions;
  an amorphous or low-crystalline $SiO_y$ coating portion disposed on at least a part of a surface of the core portion; and
  a fibrous carbon portion disposed on at least a part of a surface of the $SiO_y$ coating portion,
 wherein y is an atomic ratio of O relative to Si (O/Si) and satisfies $0.5 \leq y \leq 1.8$, and
 wherein an average length of the fibrous carbon portion is 50 nm to 50,000 nm.

2. The lithium ion secondary battery according to claim 1, wherein an average diameter of the fibrous carbon portion is 5 nm to 500 nm.

3. The lithium ion secondary battery according to claim 1, wherein a proportion (fibrous carbon portion/(core portion+coating portion)) of the fibrous carbon portion relative to a sum of the core portion and the coating portion is 1 percent by weight to 20 percent by weight.

4. The lithium ion secondary battery according to claim 1,
 wherein the coating portion contains at least one type of element M1 selected from the group consisting of Li, C, Mg, Al, Ca, Ti, Cr, Mn, Fe, Co, Ni, Cu, Ge, Zr, Mo, Ag, Sn, Ba, W, Ta, Na, and K as a constituent element,
 a proportion (M1/(Si+O)) of M1 relative to a sum of Si and O is 20 atomic percent or less, and
 the fibrous carbon portion is grown from M1 in the coating portion.

5. The lithium ion secondary battery according to claim 1,
 wherein the coating portion contains Fe as a constituent element, and
 a proportion (Fe/coating portion) of Fe relative to the coating portion is 0.005 percent by weight to 0.5 percent by weight.

6. The lithium ion secondary battery according to claim 1, wherein an average coverage of the core portion with the coating portion is 30% to 100%, and
an average thickness of the coating portion is 1 nm to 10,000 nm.

7. The lithium ion secondary battery according to claim 1, wherein the coating portion has a multilayer structure.

8. The lithium ion secondary battery according to claim 1, wherein the low-crystalline coating portion includes an amorphous region and a crystal region comprising crystal grains, and
the crystal grains are interspersed in the amorphous region.

9. The lithium ion secondary battery according to claim 1, wherein the core portion contains at least one of Si and Sn as a constituent element.

10. The lithium ion secondary battery according to claim 1, wherein the core portion contains $SiO_x$, and
wherein x is an atomic ratio of O relative to Si (O/Si) and satisfies $0 \leq x < 0.5$.

11. The lithium ion secondary battery according to claim 1, wherein a median diameter of the core portion is 0.3 µm to 20 µm.

12. The lithium ion secondary battery according to claim 1, wherein the core portion contains at least one element M2 selected from the group consisting of Fe and Al as a constituent element, and a proportion (M2/(Si+O)) of M2 relative to a sum of Si and O is 0.01 atomic percent to 50 atomic percent,
the core portion contains at least one element M3 selected from the group consisting of Cr and Ni as a constituent element, and a proportion (M3/(Si+O)) of M3 relative to a sum of Si and O is 1 atomic percent to 50 atomic percent, or
the core portion contains at least one type of element M4 selected from the group consisting of B, Mg, Ca, Ti, V, Mn, Co, Cu, Ge, Y, Zr, Mo, Ag, In, Sn, Sb, Ta, W, Pb, La, Ce, Pr, and Nd as a constituent element, and a proportion (M4/(Si+O)) of M4 relative to a sum of Si and O is 0.01 atomic percent to 30 atomic percent.

13. The lithium ion secondary battery according to claim 1, wherein the negative electrode active material includes an electrically conductive portion formed between the coating portion and the fibrous carbon portion and having an electrical resistance lower than those of the core portion and the coating portion.

14. A lithium ion secondary battery negative electrode comprising an active material,
wherein the active material comprises:
a core portion capable of occluding and releasing lithium ions;
an amorphous or low-crystalline $SiO_y$ coating portion disposed on at least a part of a surface of the core portion; and
a fibrous carbon portion disposed on at least a part of a surface of the $SiO_y$ coating portion,
wherein y is an atomic ratio of O relative to Si (O/Si) and satisfies $0.5 \leq y \leq 1.8$, and
wherein an average length of the fibrous carbon portion is 50 nm to 50,000 nm.

15. A battery pack comprising:
the lithium ion secondary battery according to claim 1;
a control portion to control a usage state of the lithium ion secondary battery; and
a switch portion to switch the usage state of the lithium ion secondary battery in response to an instruction from the control portion.

16. An electric vehicle comprising:
the lithium ion secondary battery according to claim 1;
a conversion portion to convert an electric power supplied from the lithium ion secondary battery to a driving force;
a driving portion to drive in accordance with the driving force; and
a control portion to control a usage state of the lithium ion secondary battery.

17. An electricity storage system comprising:
the lithium ion secondary battery according to claim 1;
at least one electric apparatus; and
a control portion to control supply of an electric power from the lithium ion secondary battery to the at least one electric apparatus.

18. A power tool comprising:
the lithium ion secondary battery according to claim 1; and
a movable portion supplied with an electric power from the lithium ion secondary battery.

19. An electronic apparatus comprising the lithium ion secondary battery according to claim 1,
wherein the electronic apparatus is supplied with an electric power from the lithium ion secondary battery.

20. The lithium ion secondary battery according to claim 1, wherein either the coating portion comprises at least one type of element M1 selected from the group consisting of Li, C, Mg, Al, Ca, Ti, Cr, Mn, Fe, Co, Ni, Cu, Ge, Zr, Mo, Ag, Sn, Ba, W, Ta, Na, and K as a constituent element from which the fibrous carbon portion is grown, or the active material comprises an electrically conductive portion formed between the coating portion and the fibrous carbon portion.

21. The lithium ion secondary battery according to claim 1, wherein the coating portion comprises at least one type of element M1 selected from the group consisting of Li, C, Mg, Al, Ca, Ti, Cr, Mn, Fe, Co, Ni, Cu, Ge, Zr, Mo, Ag, Sn, Ba, W, Ta, Na, and K as a constituent element from which the fibrous carbon portion is grown, and the active material comprises an electrically conductive portion formed between the coating portion and the fibrous carbon portion.

22. The lithium ion secondary battery according to claim 20, wherein the fibrous carbon portion is grown from the electrically conductive portion, and the electrically conductive portion contains at least one type selected from the group consisting of Cu, Fe, Co, and Ni as a constituent element.

23. The lithium ion secondary battery according to claim 1, wherein the fibrous carbon portion comprises a carbon nanowire.

* * * * *